(12) United States Patent
Marchiorello

(10) Patent No.: US 12,519,759 B2
(45) Date of Patent: Jan. 6, 2026

(54) DATA MANAGEMENT AND CONTROL IN EXTENDED REALITY EXPERIENCES

(71) Applicant: VSN VISION INC., New York, NY (US)

(72) Inventor: Edoardo Marchiorello, New York, NY (US)

(73) Assignee: VSN VISION INC., New York, NY (US)

( * ) Notice: Subject to any disclaimer, the term of this patent is extended or adjusted under 35 U.S.C. 154(b) by 67 days.

(21) Appl. No.: 18/401,693

(22) Filed: Jan. 1, 2024

(65) Prior Publication Data

US 2024/0223542 A1 Jul. 4, 2024

Related U.S. Application Data

(60) Provisional application No. 63/436,547, filed on Dec. 31, 2022.

(51) Int. Cl.
| | |
|---|---|
| *G06T 19/00* | (2011.01) |
| *G06Q 30/0601* | (2023.01) |
| *G06V 40/16* | (2022.01) |
| *G06V 40/20* | (2022.01) |
| *H04L 9/40* | (2022.01) |

(52) U.S. Cl.
CPC ..... *H04L 63/0428* (2013.01); *G06Q 30/0601* (2013.01); *G06T 19/006* (2013.01); *G06V 40/176* (2022.01); *G06V 40/28* (2022.01)

(58) Field of Classification Search
CPC ... H04L 63/0428; G06T 19/00; G06T 19/006; G06Q 30/0601; G06V 40/16; G06V 40/20

USPC .......................................................... 713/168
See application file for complete search history.

(56) References Cited

U.S. PATENT DOCUMENTS

| | | | | |
|---|---|---|---|---|
| 11,030,440 | B2* | 6/2021 | Barnett | G06V 40/172 |
| 11,443,049 | B2* | 9/2022 | Tyagi | G06F 21/53 |
| 11,670,055 | B1* | 6/2023 | Miranda | G06T 19/006 |
| | | | | 382/190 |
| 11,782,669 | B2* | 10/2023 | Pahud | G06F 3/011 |
| | | | | 345/2.2 |
| 2021/0110058 | A1* | 4/2021 | Glazberg | G06T 11/00 |

(Continued)

*Primary Examiner* — Sargon N Nano
(74) *Attorney, Agent, or Firm* — BECKMAN LAW P.C.; Christopher Beckman

(57) ABSTRACT

New techniques for creating compelling extended reality (XR) environments are provided. In some embodiments, an augmented reality (AR) system controls specialized hardware including sensor(s), display(s) and/or actuator(s) to produce an AR environment with compelling display features, new data-sharing techniques, and privacy protection options for users. For example, in some embodiments, the system creates new forms of private data sharing packets, based on user behavior (e.g., during gameplay) and transfers the packets in accordance with user preference settings based on inferences from such user behavior. For example, in some embodiments, the system infers relationship statuses, interests and emotive information based on a user's gaze or other attention on an activity, environment or another user.
The data sharing packets may include anonymized, abstracted components of private data.
In some embodiments, a marketplace is included, in which users elect to sell private data sharing packets for a monetary credit.

16 Claims, 23 Drawing Sheets

(56) References Cited

U.S. PATENT DOCUMENTS

2021/0327149 A1* 10/2021 de Keyser .............. G06T 19/20
2022/0343814 A1* 10/2022 Guillama ............. H04B 10/116
2024/0419520 A1* 12/2024 Munagekar ......... G06F 9/44505

* cited by examiner

DATA MANAGEMENT AND CONTROL IN EXTENDED REALITY EXPERIENCES

CROSS-REFERENCE TO RELATED APPLICATION

This application claims the benefit of U.S. Provisional Patent Application No. 63/436,547, filed Dec. 31, 2022, the entire contents of which are incorporated by reference in their entirety into the present application, as if fully set forth herein.

TECHNICAL FIELD

The present invention relates to the technical fields of computer-generated experiences, or "extended reality," including virtual reality, augmented reality and mixed reality, and, more particularly, to devices, systems and methods for presenting graphical and other user interfaces and three-dimensional ("3D") user interfaces to users of extended reality technology.

BACKGROUND

Extended reality ("XR") refers to techniques for creating any form of computer-created or -enhanced environment, including virtual reality ("VR"), augmented reality ("AR") and mixed reality ("MR") environments. VR refers to technical systems creating a 3-dimensional ("3D") simulated environment, with which a user can interact (a "VR environment"). AR refers to systems placing and overlaying aspects of such a VR environment onto part of a real-world environment to enhance it, allowing a user of such a system to continue seeing aspects of the existing or natural environment with simulated enhancements (an "AR environment"). MR refers generally to mixed virtual and real environments in a single experience, with some interaction between virtual and real-world environments. Thus, AR and MR are largely synonymous. This application will use the term "MR with 2-way interaction" to refer to an AR or MR system where both virtual objects and real-world objects can physically alter each other. Similarly, this application will use the term "MR with 1-way interaction" to refer to refer to an AR or MR system where: 1) a virtual object can physically alter a real-world object, in a real world environment, or 2) a real-world object can physically alter a virtual object, in a virtual environment, but not both 1 and 2, and not referring to optional capability for 1 or 2 (i.e., not referring to "selectable 1-way interaction").

A variety of VR and AR interfaces and display technologies have been developed, beginning at least in the 1960's, with Morton Heilig's SENSORAMA system. The SENSORAMA created a 3D scene, as well as other sensory perceptions, such as sound and scents, using a floor-mounted display/user interface unit.

In the ensuing decades, VR and, more recently, AR, displays have become more sophisticated, as well as lighter-weight and portable. The improvement and miniaturization of computer systems has enabled the development of VR and AR headsets, glasses and body sensors, allowing users to "walk around" and change their viewing angle, interacting with a VR or AR environment. Other specialized VR and AR hardware such as hand controls have been developed, further enhancing users' ability to interact with a VR or AR environment.

Generally, VR and AR systems have been available for quite some time. However, as with 3D display systems in general, XR systems, including VR, AR and MR systems, have been notoriously slow to catch on, perhaps for a variety of reasons that are not well understood. There is still a need for more compelling XR, VR, AR, and MR systems.

It should be noted that some of the disclosures set forth as background, such as, but not limited to, the above language under the heading "Background," do not relate exclusively to prior art and the state of the art in the field(s) of the invention, and should not be construed as an admission with respect thereto.

SUMMARY

Systems, devices and methods for creating compelling new XR environments, including compelling new AR and VR experiences, are provided. In some embodiments, an AR and/or VR system, including a computer hardware- and software-based control system, controls specialized hardware including sensor(s), display(s) and/or actuator(s) to produce an AR and/or VR environment with compelling VR and/or AR display features, new data-sharing techniques, and privacy protection options for users.

For example, in some embodiments, such a system in accordance with the present application creates new forms of personal or other private data sharing packets, and transfers those packets in accordance with user preference settings. In some such embodiments, such private data includes both directly recorded data and inferred information, based on additional factors observed by the system.

In some embodiments, information sharing settings are created based on user behavior (e.g., gameplay, through a game managed by the control system). In some embodiments, the system infers relationship statuses and/or interests of a user based on a user's gaze or other attention on an activity, environment or another user.

In some embodiments, the specialized hardware captures data related to emotive interactions by the user, such as emotion-indicating actions, body language, gestures, and expressions of the user when interacting with a VR or AR environment. In some embodiments, the system infers other information based on such emotive interactions by a user. Such emotive interactions may include actions, body language, gestures, and expressions of the user indicating empathy, and/or a degree of empathy, with other users of the VR and/or AR system and/or an environment.

In some embodiments, the VR or AR system aids a user in controlling a level of access to data related to her, his or their emotive interactions. In some embodiments, the VR or AR system aids a user in controlling a level of access to other data relevant to the user and/or her, his or their interactions with the VR or AR system.

In some embodiments, a marketplace is managed by the system, in which users may elect to sell such private data sharing packets, in accordance with such user preference settings, in exchange for a monetary credit. Some embodiments of data sharing packets include anonymized, abstracted components of such private data. In some embodiments, the system obtains a commission comprising a fraction of such a monetary credit, at least in part, for managing the marketplace.

The system may include a wide variety of hardware, in accordance with various embodiments. For example, in some embodiments, such hardware includes a headset, which creates options for the user in the form of a selectable menu, which options may relate to levels of data access and other permissions granted to other users, who themselves may have similar headsets. In some embodiments, a plurality of data access and permission levels, of escalating degrees, may be granted by one user to another user. In some such embodiments, one user's VR or AR experience related to another user is modified aesthetically, or otherwise, depending on such levels granted by another user, and other factors. In some embodiments, an environmental enhancement object (such as a portable fob) may also, or alternatively, be provided, with visual, haptic and/or other user communications hardware, and may be comprised within, and/or controlled by, the control system.

In some embodiments, levels of data access and other permissions granted between particular users are altered based upon assessed similarities or other relevant factors between those particular users. In some such embodiments, a control system carrying out aspects of the present invention may determine such similarities or other relevant factors between the particular users based on an algorithm. In some embodiments, such an algorithm may consider the particular users' common interests, related (e.g., complementary) interests, or similarities in their personal information, behavior or interaction with the control system and a VR and/or AR environment created by the control system, each as represented by data stored by the control system. In some embodiments, such a VR and/or AR environment may include a computer-managed game, in which points are awarded and stored for the quantity and quality of gameplay. In some embodiments, such points are referred to as "Stars." In some embodiments, points are awarded and stored for sharing of personal information by users, in particular forms accepted by the control system. In some embodiments, such points are referred to as "Coins." In some embodiments, a user may use such Coins to purchase Stars, or to Purchase an opportunity to obtain Stars (e.g., time or instances of unlocked gameplay.)

In some embodiments, specialized computer hardware in the form of hand controls may be provided, which are connected to and able to communicate with the control system, and provide input to the control system (such as by making selections of options presented on a GUI). In some such embodiments, the hand controls include sensors, or sensory regions, which the user may touch and activate (for example, to make selections with software run by the control system). In some embodiments, such sensors or sensory regions, when touched, issue commands related to selectable menu items of a displayed graphical user interface ("GUI") within the VR or AR environment (e.g., by a VR or AR headset with a display). For example, in some embodiments, any of the displayed, selectable menu items relate to the levels of data access and permission discussed above. As another example, in some embodiments, the displayed, selectable menu items relate to any other set of options presented on a projected VR or AR display, any of which may correspond to any of the sensors or regions of the hand controls. In some such embodiments, controls for a user's right hand relate to selectable options related to an environmental camera, as discussed in greater detail below while controls for a user's left hand relate to selectable options related to an VR and AR display projector, as also discussed in greater detail below. Such a camera may be located on the right-hand side of the specialized headset, while such an VR and AR display projector may be located on the left-hand side of such a specialized headset, in some embodiments. In some embodiments, hand controls are provided in the form of a set of user-wearable gloves, to be donned over a user's hands. In some embodiments, controls for a user's right hand facilitate practical selections and actions executable by the user, while controls for a user's left hand facilitate more creative selections and actions executable by the user. For example, in some embodiments, controls for a user's right hand facilitate the selection of various content presented by the control system. As another example, in some embodiments, the playing of games is considered a creative activity, and games presented by the control system are facilitated by controls for a user's left hand. As another example, a more creative selection by a user, such as a selection of a symbol to represent his or her energy (discussed in greater detail below), is facilitated by controls for a user's left hand, in some embodiments. As yet another example, other more creative selections by a user, such as a selection of a tool, such as a floater tool for use with a floater, and a user's creation of content using a floater (each of which is discussed in greater detail below) is facilitated by controls for a user's left hand, in some embodiments. In some embodiments, a user may execute unique hand gestures, or other gestures, which are recognized by a control system of which the hand controls are a part, which may signify particular user selections, in some embodiments. In some such embodiments, some of such gestures also are body language, as discussed elsewhere in this application, and the control system may infer emotional or other information based on such gestures, or other interactions within an AR environment using the hand controls.

In some embodiments, other body-actuated controls, with sensors or sensory regions of other tools controlled by the control system, and adapted for use by other parts of a user's body, may be provided. In some embodiments, such body-actuated controls also deliver haptic and other feedback to enhance a 3D environment augmented or simulated by a control system connected for communications with and controlling such body-actuated controls. For example, as discussed in greater detail below, a body suit with embedded or mounted sensors or sensory regions may be provided in some embodiments. In some such embodiments, such a body suit also comprises actuators, such as haptic feedback actuators. In some embodiments, body-fitting bands or attachments, with such sensors or sensory regions, or other various specialized sensors and actuators, may be provided. It should be noted that, in some embodiments, complex, specialized forms of input (such as GUI options selections, interactions with other users, and multi-variable transformations of a VR or AR environment), may be accomplished by simultaneous input from more than one sensor or sensory region, which, as discussed above, may be from multiple such controls. For example, if a user gestures with his or her left index finger, by curling it to a particular degree, while simultaneously curling one of his or her toes to a particular degree, the combination of those two gestures may be read and understood by the control system as having a particular, different significance for selecting GUI options and creating VR or AR environments, than if the gestures were performed individually and at separate times. Such complex, simultaneous input, and different significance, yield nearly infinitely variable types and degrees of input which may be provided by a user, in some embodiments. For example, in some embodiments, such a greater degree of curling or other gestures and actions may indicate a deeper, more remote selection (such as a user setting) in some embodiments. As another example, in some embodiments, body poses, such as those practiced in yoga, may be recognized and interpreted through pattern matching by the control system, as input, along with hand gestures by the user (e.g., Mudra), and the combination of such different poses and gestures may be sensed and interpreted by the control system as multi-variable input, generating a virtually infinite variety of combined input, and facilitating creative interaction with the control system.

According to some aspects of the invention, a head-mounted apparatus (such as the "specialized headset" mentioned above, and discussed in greater detail below) is provided for enhancing a user's VR or AR environment. In some embodiments, such a specialized headset includes a set of at least two eyepieces, one for each of a user's eyes, an environmental camera, on one side of the specialized headset, and a display projector, on another side of the specialized headset (for generating a display viewable on at least one of the eyepieces). A control system may also be provided, and connected for communications with the specialized headset, which may include communications connections with the environmental camera and the display projector. In some embodiments, the environmental camera and control system 3-dimensionally scans an environment surrounding the user, including real-world objects, and the visual data and/or three-dimensional data regarding that environment is stored and accessed by the control system. The control system, in turn, may process that visual and/or three-dimensional data, and make determinations regarding that environment, and alter the user's VR or AR environment, and an experience of such objects, based on those determinations. In some embodiments, the display projector may enhance or otherwise alter the appearance of a real world object recognized, tracked and/or displayed by the control system. For example, another user's body may be recognized as a real world object by the control system, and may be overlaid with a visible avatar or marker, in some embodiments. As a more specific example, a 3D symbol, or an avatar, may be presented over the head of another user's body, with particular attributes identifying that user, or aspects of that user, such as markers of that user's state (e.g., biometrics and body language, indicating mood, attraction or receptiveness), in some embodiments. As another example, the 3D symbol may indicate the level of access or permissions granted to and/or by one user, by and to another user, in some embodiments. Thus, the control system may cause users to perceive one another differently, depending on the level of data access and other permissions granted to one another, in some embodiments. As mentioned above, such levels of access or permissions may be created by 1) actively selections by a user through a GUI or 2) determinations by the control system, based indirectly on similarities or activities related to two or more users, tracked by the control system, in some embodiments. In some embodiments, the number and type of permissions granted to a user, as well as biometrics, and other data related to a user's historical and present use of the control system, may impact a score related to the user maintained by the control system (a.k.a., a "V-Score"). In some embodiments, some such data includes a user's goals in using the system, which impact such a V-Score. In some such embodiments the user's goals are weighted positively in an algorithm creating a V-Score for the user if they are in common with goals shared by other users (and more other users) of the control system (a.k.a., the user shares "common goals"). The V-Score, in turn, may be reported, or otherwise impact data and indicators provided to other users regarding the user. In some embodiments, such a V-Score, or another, similar score based at least in part on gameplay by the user using the control system, may alter levels of access or permissions between two users. In some embodiments, users' appearance to one another may be altered, based on such a V-score or other, similar score. In some embodiments, the biometrics referred to above may include vital signs, such as the user's blood pressure, heart rate, body temperature, perspiration, breathing rate, and depth of breathing, among other possibilities discussed in greater detail below.

In some embodiments, body tracking and haptic feedback hardware are provided. That body tracking and haptic feedback hardware may include scanned or tracked locations (e.g., using sensors) for tracking a user's movements, biometrics (such as vital signs, as mentioned above), body language and other markers of a user's state, which may then be translated into input to the control system, and lead to output to other users. In some embodiments, biometrics such as a user's temperature, blood pressure, heart rate, and/or any other vital signs, may be monitored by the body tracking and haptic feedback hardware. In some such embodiments, vital signs may be taken by sensors within a wrist-band, head-band, arm-band or other body-fitting band or attachment, worn by the user. If so, such a body-fitting band or attachment may comprise communications connection hardware, connecting it for communications and management by the control system. Preferably, such a body-fitting band or attachment may be adjusted in size, to custom-fit a particular user's dimensions and comfort, in some embodiments. Also preferably, in some embodiments, such a body-fitting band or attachment and/or the control system is calibrated to a particular user's resting heart rate, ordinary body temperature(s) at particular times of the day, depth of breathing, or other particular unique and/or baseline data markers or attributes of the user, to provide more accurate data concerning a user's changing vitals, and how such changing biometrics (such as vital signs) might reflect different levels or excitement or engagement of the user in using the control system, at different times. In some embodiments, such changing biometrics, or indicia related to such changing biometrics or determinations based, at least in part, on such changing biometrics, may be reported to other users, and/or otherwise impact virtual objects or other aspects provided to users through the control system, as will be discussed in greater detail below. In some embodiments, any user-specific factors, such as the biometrics discussed above, which are measured and recorded by the system are calibrated to a user, e.g., by taking a baseline measurement, upon the user's first use of control system hardware. In such embodiments, changes from any such measurements and recordings of such factors, after calibration, are also recorded, and virtual objects or augmentations of objects created by the VR or AR system are made or altered, based on, and indicating, those changes.

In some embodiments, haptic feedback may be provided to the user to indicate actual and VR or AR environmental factors. For example, when another user with a particular level of data access or other permissions is nearby, or within view, a particular vibration or level of heat or other haptic feedback may be delivered to indicate that level to the first user. In some embodiments, if such another user has a particular V-Score, or range of V-Scores, or other, similar scores, a particular kind of haptic feedback may be provided to the first user. In other embodiments, if other relevant factors of the first user are determined to be similar to another user's, a specialized form of feedback may be provided to one or both users to indicate that similarity and the location of each user to the other. In still other embodiments, if other factors of the first user are otherwise relevant to another user, a specialized form of feedback may be provided to one or both users to indicate that relevance and the location of each user to the other.

In some embodiments, the invention is implemented as a comprehensive, all-inclusive control system, managing the entire VR or AR environment and user experience, and all hardware running it, as well as software directly interfacing with a user and that hardware. However, some embodiments allow for separate VR and AR environment and user experience management by multiple, distributed, variably and/or intermittently connected control systems.

These and other aspects of the invention will be set forth in greater detail, below, with reference to the particular figures.

BRIEF DESCRIPTION OF THE DRAWINGS

The features and advantages of the example embodiments of the invention presented herein will become more apparent from the detailed description set forth below when taken in conjunction with the following drawings.

DETAILED DESCRIPTION

The example embodiments of the invention presented herein are directed to devices, systems, methods and computer program products for creating compelling VR and AR environments and tools and, more generally, for users to experience, create and share information and experiences. As mentioned above, in some embodiments, a VR and AR system, including at least one computer hardware and software-based control system, controls a specialized headset, hand controls, and an array of sensors and actuators to produce compelling VR and AR environmental features and options for users.

This description is not intended to limit the application of the example embodiments presented herein. In fact, after reading the following description, it will be apparent to one skilled in the relevant art(s) how to implement the following example embodiments in alternative embodiments (e.g., involving any system producing or augmenting a 3D environment with wide array of different display, scanning or actuation technologies).

Figure 1:
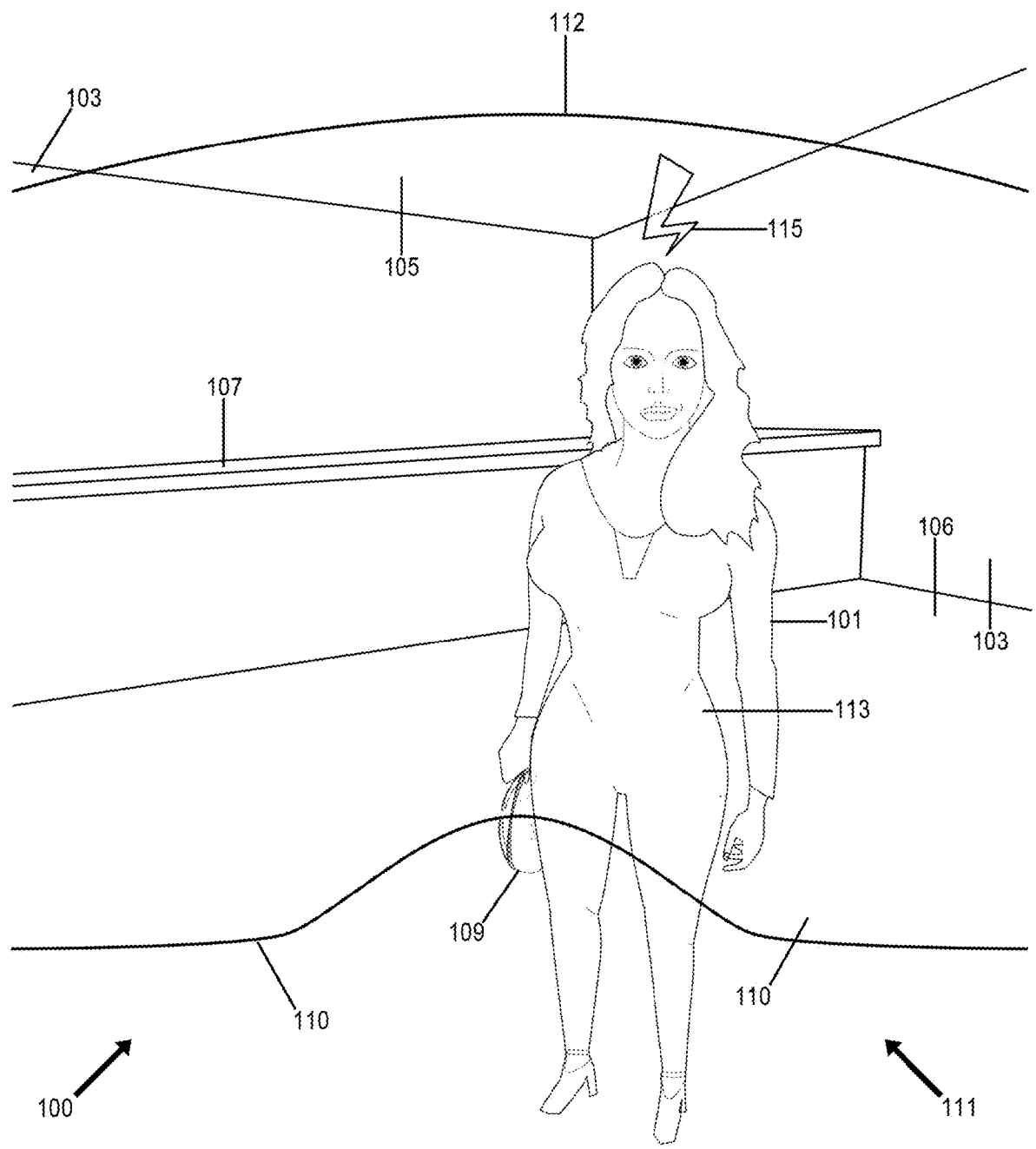
FIG. 1 depicts an example implementation environment, including, but not limited to, parts of an example computer hardware system carrying out example VR and AR techniques according to some embodiments of the present invention.

FIG. 1 depicts an example implementation environment 100, including, but not limited to, parts of an example computer hardware and software system (the "AR system") carrying out example VR and AR techniques according to some embodiments of the present invention. Implementation environment 100 includes various real world objects, such as a girl 101, walls 103, ceiling 105, floor 106, and a bar 107. As mentioned above, in some embodiments, at least one specialized headset, such as the example set of glasses 109 or 110, is provided for enhancing a user's VR or AR environment. The perspective of the figure corresponds with the view of a user (not pictured) wearing example set of glasses 110, and viewing environment 100.

As mentioned above, FIG. 1 depicts the 3D view of environment 100 that a user of the AR system may have, in an example embodiment. A scene 111 may be taking place within environment 100, including various actions recognized, enhanced and implemented by the AR system. The user may have donned his set of glasses 110, causing his view to be overlaid with a partially transparent display screen 112, in some embodiments. As will be explained in greater detail below, VR or AR images may be displayed on partially transparent display screen 112 (for example, using an eye-tracker and projector, as will be discussed in greater detail, below), to create an VR or AR experience for the user.

In scene 111, girl 101 has come within the vicinity of the user. In some embodiments, when an object, such as girl 101, has come within view of the user, in front of glasses 110, the AR system 3-dimensionally scans the object, e.g., using an environmental camera within glasses 110 (as will be discussed in greater detail below). For example, in some embodiments, visual data is taken in from such a camera over time, and objects and actions are recognized via object- and action-recognition software running on a computer within the AR system. In some embodiments, the identity of an object may be recognized by the AR system. For example, in some such embodiments, the face of a person within the user's view (such as girl 101) may be recognized by the AR system via facial recognition and feature matching software running on a computer within the AR system (e.g., within a artificial intelligence sub-module of the AR system, configured to match pixels or other image features of the current camera view and stored images of the subject face). In other embodiments, girl 101 may be another, second user of the AR system, and identification data related to her (as well as any other user, such as the first user, discussed above, whose perspective is shown in the figure) may be stored on computer hardware within the AR system. Because girl 101 also possesses hardware of the AR system, or in communication with and controlled by the AR system—such as her own set of glasses 109 and a body suit 113, which may comprise particular identified and tracked computer hardware, sensors and actuators, as discussed in greater detail below—the AR system may track her location (e.g., using geolocation hardware, such as G.P.S. hardware). For example, girl 101's location, as well as the first user's location, in space may be determined, and the relative proximity and orientation of each particular user of the AR system may be determined, in some embodiments. In any event, based on that visual-based recognition software, or based on proximity data, the AR system has determined that girl 101 is within view of the first user, in the example implementation environment 100.

Based on that proximity data, the AR system has placed an AR display aspect, projected onto partially transparent display screen 112, on a location on screen 112 that corresponds to the apparent location of girl 101. In some embodiments, such an aspect is a virtual object, such as 3D symbol 115, may be generated by a 3D display within the AR system, such as partially transparent display screen 112. As girl 101 moves, because her position and orientation are tracked by the AR system, such a 3D display may maintain the location of 3D symbol 115, above girl 101's head, as she moves about environment 100 in scene 111. In some embodiments, symbol 115 may indicate additional data about the object enhanced by it (such as girl 101) to a user. For example, in some embodiments, symbol 115 is, or contains, an indicator of the levels of data access and other permissions that the user has granted to girl 101. In some embodiments, symbol 115 indicates the level of data access and other permissions girl 101 has granted to the user. In some embodiments, symbol 115 indicates the level of data access and other permissions girl 101 and the user have granted to one another. Aspects related to granting of various levels data access and other permissions through the AR system will be discussed in greater detail, below.

In some embodiments, a wide variety of other data concerning each user may be stored and used to enhance the appearance and experience of each user of the system, as will be discussed in greater detail, below. For example, in some embodiments, body suit 113, and the AR system generally, may scan girl 101, or any other user, for biometrics, such as heart rate, blood pressure, sweat, body heat changes and other indications of excitement, arousal, familiarity or interest. In other embodiments, body suit 113 and the AR system generally may scan girl 101, or any other user, for body language, and other indicators of state, such as attitude and interpersonal attributes, through pattern matching algorithms for body movements, postures and other expressions. In any event, the AR system may create symbols, virtual objects, or any other AR sensations based on any data controlled by the AR system, such as that biometric data or indicators of state, in some embodiments.

In other embodiments, a unique combination of user-related data (e.g., any of the factors discussed in this application), such as biometric data, with other information and indicators, may be processed by a control system according to a unique algorithm, generating a unique number, such as a V-Score, as set forth in greater detail elsewhere in this application, in accordance with aspects of the present invention. In some embodiments, symbol 115 may reflect such a V-Score related to the user, or a second user, such as girl 101. For example, in some embodiments, symbol 115 may appear to glow a particular color or intensity of light, or take on a particular form or pattern, depending on the state of that data and other information.

In some embodiments, symbol 115 may be placed directly over an object, such as girl 101's body or body suit 113. For example, in some embodiments, symbol 115 is a particular shape, color or other enhancement, overlaid directly onto an object, such as girl 101's body, indicating any data relayed by symbolic VR or AR virtual objects set forth in this application.

In some embodiments, haptic feedback is provided to a user, such as particular vibrations, indicating or reflecting any of the data and other information forth in this application for virtual objects. While the example of haptic feedback provided through hand controls and body-mounted hardware has been provided, it should also be noted that, in some embodiments, an AR implementation environment is mediated by a more conventional portable computer hardware, such as a smartphone. In some such embodiments, such a smartphone includes a touchscreen, and such a touchscreen carries out haptic feedback (such as any of the haptic feedback set forth in this application) and/or creates virtual objects, instead of, or in addition to such haptic feedback and virtual objects created by other hardware.

Figure 2:
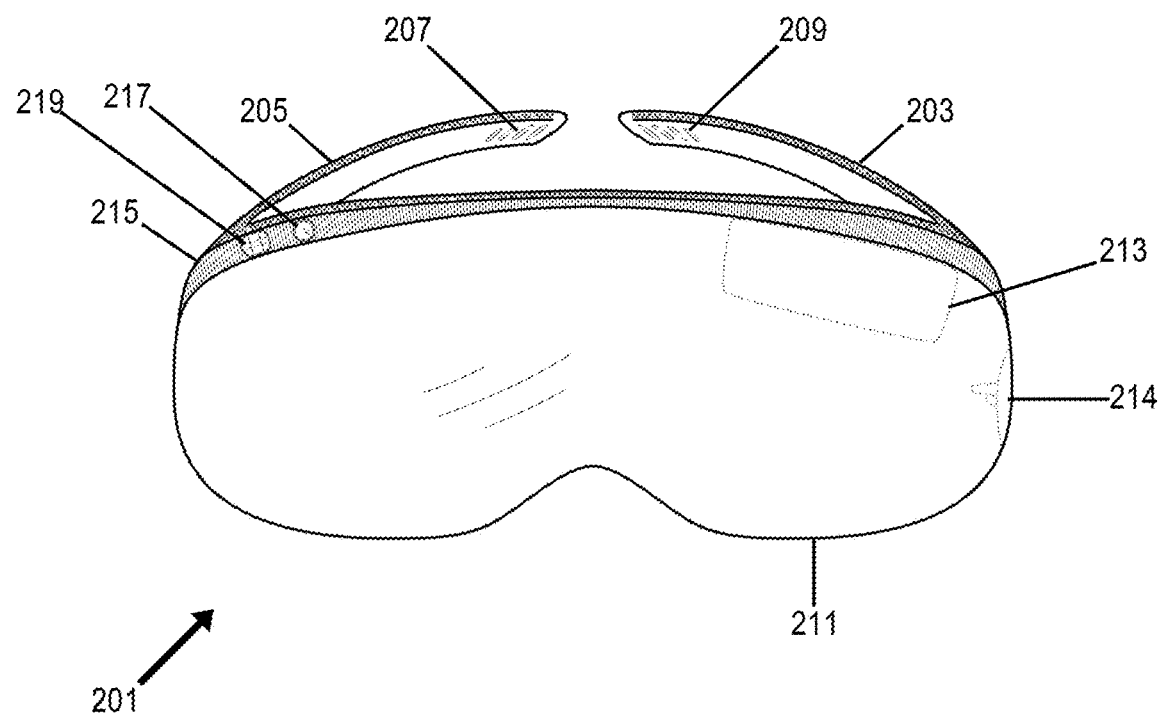
FIG. 2 is a perspective view of an example display and sensory apparatus of an VR and AR system, according to some embodiments of the present invention.

FIG. 2 is a perspective view of an example display and sensory apparatus—namely, an example headset in the form of glasses 201—of an AR system, according to some embodiments of the present invention. As with other forms of glasses for human users, glasses 201 may be placed on a user's head and over her or his eyes. Earpieces, such as left earpiece 203 and right earpiece 205, aid in supporting glasses 201 and maintaining their position on the user's head. In some embodiments, earpieces 203 and 205 include additional hardware for broadcasting and gathering sound, such as a microphone 207 and an earphone/speaker 209. Glasses 201 include an at least partially transparent display screen 211, through which a user may view both a real-world environment and aspects of an VR or AR environment, created by the AR system. More particularly, in some embodiments, glasses 201 includes a display projector 213, configured to project virtual objects onto a visible surface of display screen 211. To aid in tracking a user's eye position and orientation, after donning glasses 201, eye-tracking hardware 214 is also included, in some embodiments.

Glasses 201 also includes a structural bridge 215, in some embodiments, for connecting and supporting various other hardware onto glasses 201. For example, shown mounted on the front-facing panel of bridge 215 are an environmental camera 217 and a flash or other light-generating device 219.

In some embodiments, additional hardware is included within glasses 201. For example, in some embodiments, a laser is included (not pictured), for projecting physical markers onto other users or objects. In such embodiments, such a laser may be actuated by the AR system, and may be directable toward the location of any object within view of a user, and selected by the user. In some such embodiments, a game of "laser tag" or other such games implementing lasers, may be conducted using the AR system. In such games run on software and hardware of the AR system, a user may hit another user with a laser beam projected by the laser onto the other user's body, and vice versa, which hit may be recorded and associated with points recorded by the AR system—a certain number of points reached by a user being recorded as a victory in the game.

Glasses 201 may be connected and able to carry out communications with a control system, such as the control system set forth below in reference to FIG. 7, via any method for creating and maintaining connections and communications known in the art. For example, in some embodiments, wired connections and communications may be included. In other embodiments, wireless connections may be maintained, such as WiFi or Bluetooth, by a local control unit held within glasses 201, which is equipped for communications with other control systems (e.g., with a communications antenna). In any event, a control system is able to send and receive communications, such as data and commands, in accordance with aspects of the invention set forth in this application.

Figure 3:
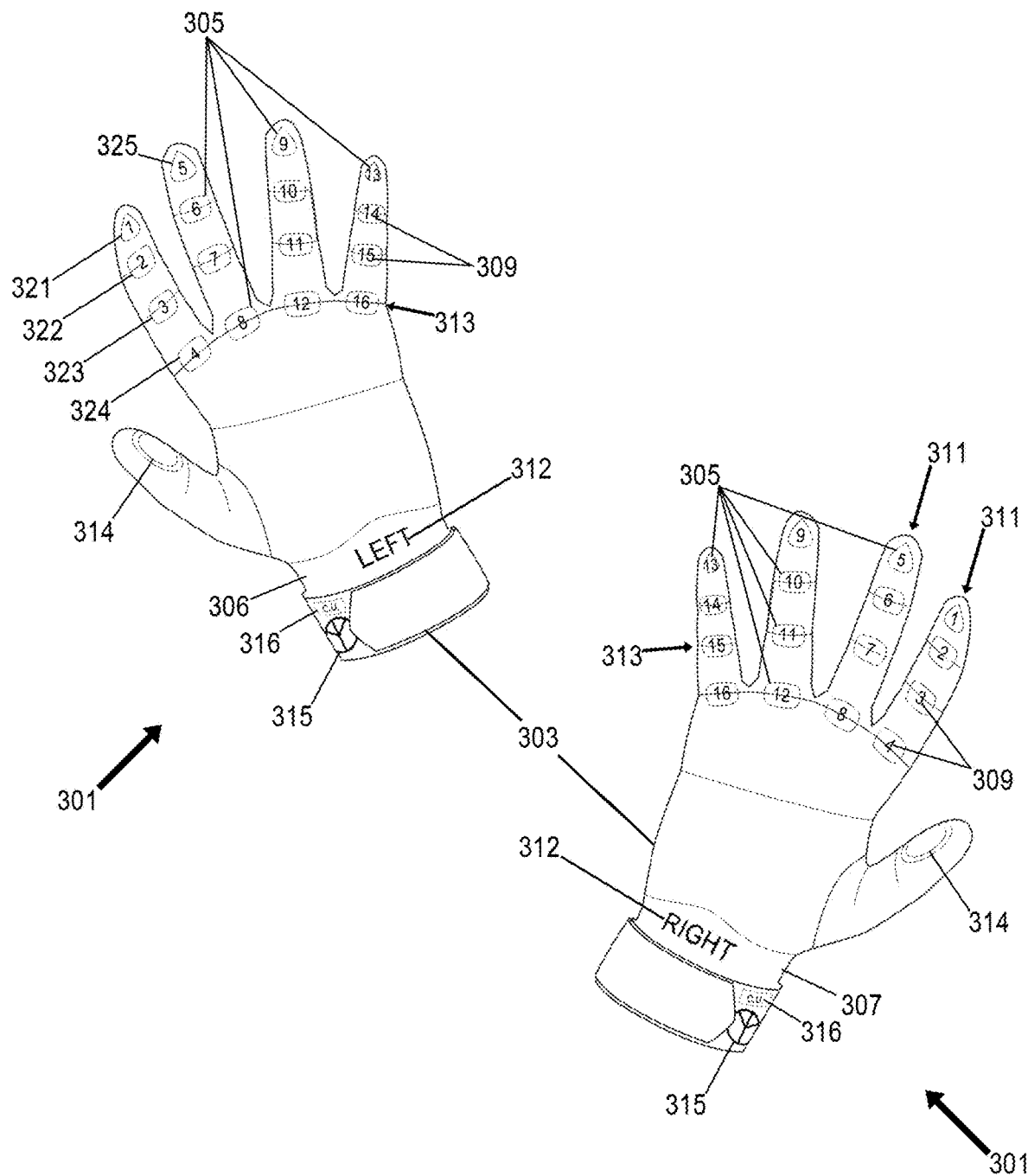
FIG. 3 is a perspective view of example hand controls of an VR and AR system, according to some embodiments of the present invention.

FIG. 3 is a perspective view of example hand controls 301 of a VR and AR system, according to some embodiments of the present invention. In particular, hand controls 301 include a pair of gloves 303, with a shape complementary to, and able to be placed onto, a user's hands (not pictured), in some embodiments. In some embodiments, gloves 303 include a left-hand glove 306, and a right-hand glove 307, each of which may include sensors or sensory regions, such as the example sensory regions shown as 305. In some embodiments, a local control unit (which may also be a control system such as that set forth below, in reference to FIG. 7) is separately connected to each of the sensory regions 305 and receives data indicating if a particular sensory region is touched at the outer surface by a user. In this way, each of the sensory regions 305 may signify a different action (e.g., a software selection) by the user. In some embodiments, each of the sensory regions 305 is labeled with a distinct visual identifier, such as the example numerical identifiers 309, ("1" through "16"), shown on or near the palm-side, along each of the fingers, such as the examples shown as 311, of gloves 303. Furthermore, left-hand glove 306 and right-hand glove 307 may each comprise a side indicator 312, indicating whether it is for the user's left or right hand. Furthermore, in some embodiments, pressing or touching one of the particular sensory regions 305 leads to particular determinations and actions by the control system, and by the AR system generally.

It should be noted that sensory regions 305 are placed at locations along fingers 311 that provide ample special separation between one another, reducing inadvertent touching or other actuation of the sensory regions 305. It should also be noted that each of the sensory regions 305 is placed either on the tip of one of the fingers, such as 311, or along one of the flexible joints, such as example joints, such as example joint 313, of those fingers. Flexible joints 313 correspond in location to joints present on a human hand, to which gloves 303 fit. In some embodiments, sensory regions 305 located at or about the tip or another outer, more distal portion of the hand controls, can deactivated (or turned of) at least during steps when those regions are being used to activate other sensory regions 305.

In some embodiments, a user of the AR system may separately actuate any of the sensory regions, such as those shown as example sensory regions 305. Preferably, in some embodiments, a user may so separately actuate any of those sensory regions by touching them with directable thumb pads 314. In still other embodiments, the AR system may associate each sensory region with a separate command, and, in implementing particular software of the AR system (some of which is discussed in greater detail below) select different options available to the user.

Gloves 303 may be connected to, and able to carry out communications with, a control system of the AR system, such as the control system set forth below in reference to FIG. 7, via any method for creating and maintaining connections and communications known in the art. For example, in some embodiments, wired connections and communications may be included, and managed and powered by a local control unit, such as the example shown as 316, that includes, is a part of, or is in communication with, such a control system. In other embodiments, wireless connections to such a control system may be maintained, such as Wi-Fi or Bluetooth, for example, via a wireless communications antennae 315, which may be connected with control unit 316. In any event, such a control system of the AR system is able to send and receive communications, such as data and commands derived from a user's actuation of sensory regions, such as 305, in accordance with aspects of the invention set forth in this application.

Figure 4:
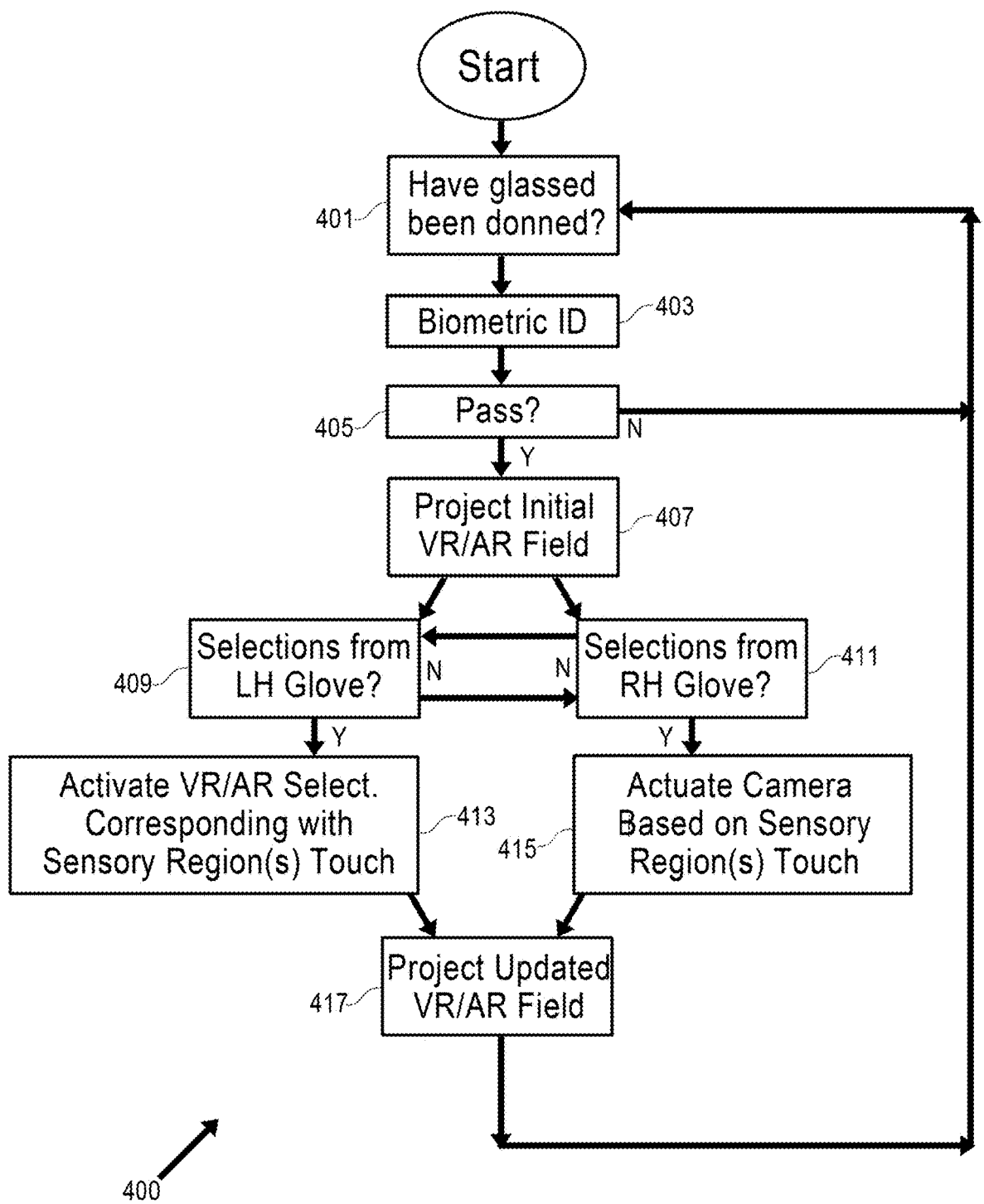
FIG. 4 is a process flow diagram, setting forth several example steps that may be undertaken by a control system (such as the example control system set forth below, in reference to FIG. 7) according to some embodiments of the present invention.

FIG. 4 is a process flow diagram, setting forth several example steps 400 that may be undertaken by a control system within an AR system (such as the example control system set forth below, in reference to FIG. 7) according to some embodiments of the present invention.

Beginning with step 401, the control system may start and determine (for example, with a user-actuable sensor within glasses 201) whether a user has donned particular necessary hardware for the AR system to operate (such as example glasses 201). If the user has donned such hardware, such as glasses 201, the control system may proceed to step 403, and carry out an authentication routine (a.k.a. a "challenge") for the person attempting to use the AR system (e.g., a person donning glasses 201). For example, in some embodiments, the control system scans the person's iris or other features of the person biometrically, and attempts to match it with identifying data of an authorized user of the AR system. The control system may then determine, based on that challenge whether the person has passed, and is an authorized user of the AR system, in step 405. If not, the control system may issue a warning to the person that he or she is not authorized, and the process restarts. If the person does pass the challenge, the control system proceeds to step 407, in some embodiments, in which it causes a display of the AR system to display an initial VR or AR environment for the user. For example, in some embodiments, an initial set of virtual objects, such as menu items and 3D symbols, or other visual and sensory enhancements that are a part of the VR or AR experience, are presented to the user as part of the VR or AR environment.

Proceeding to steps 409 and 411, in some embodiments, the control system next receives any selections or commands indicated by the user's actuation of any control device or hardware of the AR system. For example, in step 409, a user may issue selections or commands by touching any of the sensory regions of left-hand glove 306, which is connected to, and a part of, the control system and AR system in some embodiments. Similarly, in step 411, a user may issue selections or commands by touching any of the sensory regions of right-hand glove 307, in some embodiments, in which right-hand glove 307 is included in the control system and AR system. Of course, in some other embodiments, hardware other than gloves 306 and 307 for a user to enter selections, or no hardware, may be included in the control system. As discussed elsewhere in this application, any sensory, display, or input-generating hardware recited in the present application may be included alone, or in combination with other input hardware within the control system and AR system, in various embodiments of the present invention.

The functions of different control sources, such as left-hand glove 306 and right-hand glove 307, are isolated and associated with particular functions of the AR system, in some embodiments. For example, in some embodiments, a user makes selections indicated on a GUI with his left-hand, using left-hand glove 306, in step 409. To carry the example further, if such a GUI displays five items for potential selection by a user, sensory regions 305 of left-hand glove 306, numbered 1 through 5, namely, sensory regions 321, 322, 323, 324 and 325, may correspond to each of those selections, respectively, in step 413. In other words, touching or otherwise actuating the sensory region at the tip of the index finger of the left-hand glove 306 may cause the AR system to select the first selectable menu item on a GUI, in step 413. Or, selecting the next most distal sensory region of the index finger of the left-hand glove 306 may cause the AR system to select the next menu item, and so on, in step 413.

In step 415, in some embodiments, a user may actuate particular hardware of the AR system, such as the environmental camera, to direct it toward objects of interest or to record a scene, for example, using the various separate sensory regions of the right-hand glove 307. In some embodiments, other hardware, such as a light for scene illumination, or a laser, may similarly be actuated by a user using right-hand glove 307. As with left-hand glove 306, the different sensory regions of right-hand glove 307 may correspond with different hardware actions commanded by the user. A discussion of the various functions that may be controlled by actuating different sensory regions of such right- and left-hand glove input controls are discussed elsewhere in this application.

Finally, in step 417, the control system updates the VR or AR environment, in accordance with the actions selected by the user in steps 409 through 415, and the process restarts, in some embodiments.

Figure 5:
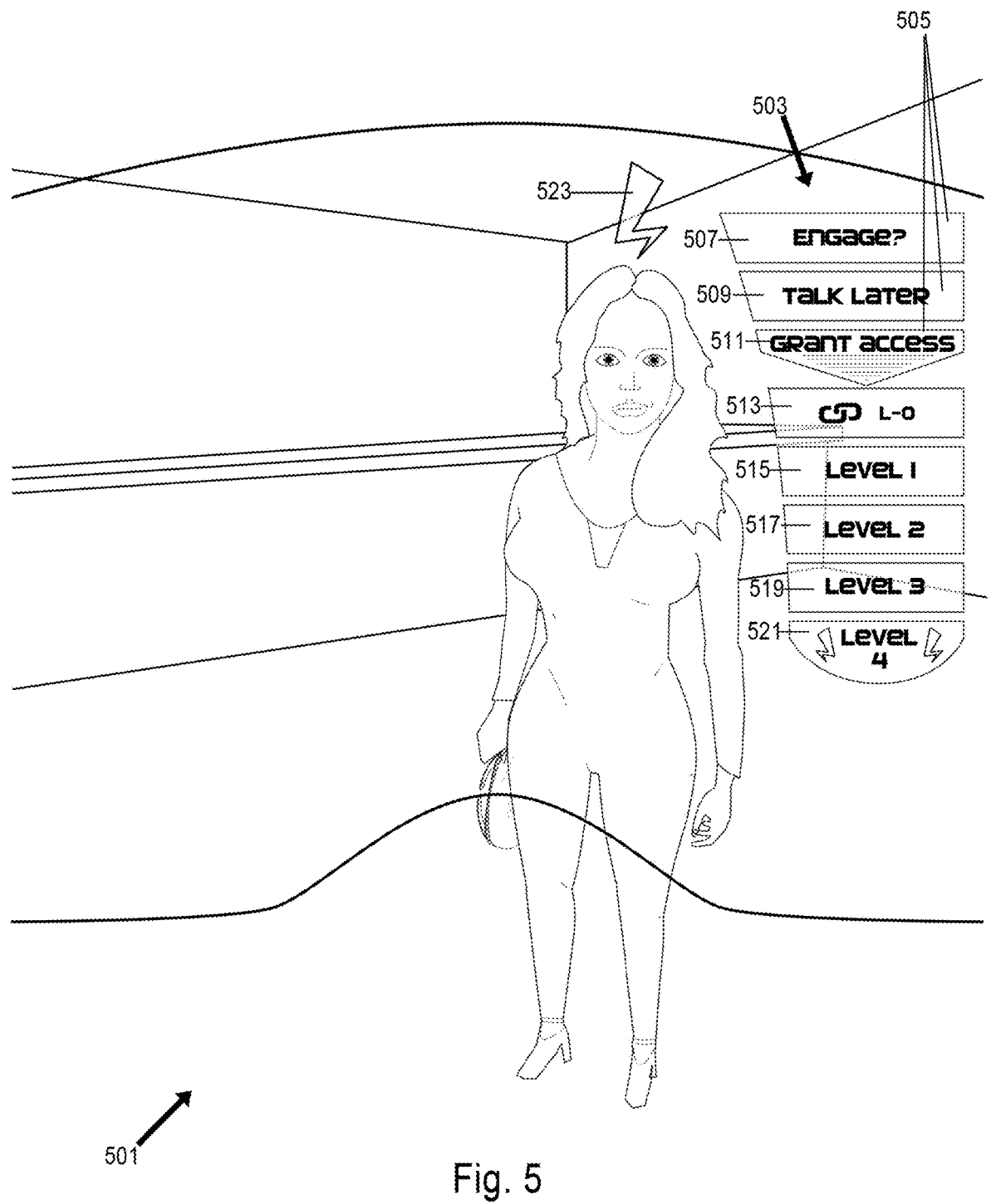
FIG. 5 depicts a similar example implementation environment as that set forth in FIG. 1, above, along with additional GUI aspects, according to some embodiments of the present invention.

FIG. 5 depicts an example implementation environment 501, similar to the environment set forth in FIG. 1, above, along with additional GUI aspects, according to some embodiments of the present invention. More particularly, a new GUI tool, which will be referred to as a floater, and which is discussed in greater detail below, controls the placement of a floating menu 503, which is a virtual object created by a display of the AR system, as pictured. A floater is a location in 3D space (such as a virtual 3D space) designated and controlled by a control system (such as the control system set forth above, in FIG. 7) and by a user's eye movements, as tracked by the control system, and at which location the user and/or the control system may take particular actions to manipulate the 3D space. In some embodiments, a floater is provided, which is located at a point focused on by the user's eyes. In other embodiments, a floater is provided which changes its location based on a user's tracked eye position and viewing direction(s) (i.e., the direction an eye is "pointing"). In some such embodiments, a floater is located based on an average direction in which the user's eye(s) are pointing. In some embodiments, a floater is one point in 3D space. In some embodiments, a floater is an area or 3D volume located in 3D space. In some embodiments, a virtual object, such as a 3D object, may be placed by the user and control system at the location of a floater. In some embodiments, the virtual object may be a user interface tool, facilitating the user's interaction with the 3D environment, in which case it may be referred to as a "floater tool." In some embodiments, such a floater or virtual object placed by a control system at the location of a floater is altered by other factors, such as any of the factors set forth in this application. For example, in some embodiments, open body postures may signify the user's command to increase the size of a floater and virtual object placed at the location of the floater. In some embodiments, such a virtual object may take on a size, form or actions based on the user's state of mind, such as the user's emotional feelings, as tracked and determined by the control system (e.g., if a user has selected his or her energy type, as discussed in greater detail elsewhere in this application). In some embodiments, a floater, and a virtual object positioned in 3D space based on the location of a floater, are controlled by an algorithm, combining several factors, such as any of the factors set forth in this application. For example, in some embodiments, such factors include eye tracking techniques set forth above and body movements, postures and gestures tracked by sensors in communication with the control system. In some such embodiments, such factors include biometrics, such as the user's heartbeat, and hand movements and gestures. In some such embodiments, different types of such factors differently impact such a virtual object. For example, the color, shape or vibration of a virtual object each may be altered by a different factor, in some embodiments. In some embodiments, as discussed elsewhere in this application, a virtual object may be altered by the passage of time, or exceeding a threshold of time, as tracked by the control system. For example, in some embodiments, a floater tool, or other virtual object, may begin to fade away (be presented with less intensity) after such a passage of time, or exceeding a threshold, has occurred. One example of a floater tool is provided as floating menu 503, discussed in greater detail herein. In some embodiments, the function of a virtual tool is altered by the size and shape of the floater tool, and other factors, as may be selected by a user. For example, in some embodiments, in which painting application software is included in the control system, a user may create art in the 3D space at different rates, and in greater areas, by selecting a larger paint brush floater tool.

As an example of some actions that may be taken at the location of a floater tool, Floating menu 503 is a graphical menu including several user selectable options, such as the examples shown as 505. As discussed above, by using a hand control, such as by touching any of the sensory regions 305 of gloves 303, discussed above, a user may select any of the options shown, such as exemplary options 505, to carry out aspects of the AR system.

In some embodiments, floating menu 503, and the floater that defines its location by the AR system, is a moving menu, meaning that its location on display screen 112 follows a user's eye movements. For example, if the user shifts his eyes to the right, to better view girl 101, floating menu 503 would also move, in the same degree and direction, to maintain its position within the user's field of vision. The exact nature, position, shape and configuration shown, however, for floating menu 503, is only an example of the many different possible positions, shapes, configurations, options and other features of GUI menus that are possible, as will be readily understood to those of ordinary skill in the art.

As one example of a floating menu function, the floating menu shown as 503 indicates several actions with respect to data access and other permissions which may be provided by the user to girl 101. The top-most menu item, namely, option 507, indicates whether the user will attempt to engage at all with girl 101 using the AR system. If selected, the user may at least attempt to begin a dialogue or other exchange with girl 101, assuming that girl 101 likewise selects an engagement option using the AR system. If girl 101 does not, a message may be sent to the user, in some embodiments, indicating that she has not engaged, is too busy at that moment, or is otherwise unavailable to engage. As a second option, the user may select not to engage with girl 101, using option 509. If option 509 is instead selected and actuated by the user, for example, by touching one of sensory regions 305 associated with that selection by software run on a control system of the AR system (such as the second sensory region 322, located on the first joint of the index finger of right glove), a message or indication may be sent to girl 101 that the user is busy, or otherwise unavailable to engage at that moment. In some embodiments, such a message or indication may only be given if girl 101 attempts to engage with the user at or before that time.

Proceeding to a third selectable menu item, if the user actuates floating menu option 511, for example, by touching or otherwise actuating one of sensory regions 305 associated with software run by the control system of the AR system with actuating floating menu option 511 (e.g., sensory region 323) the user grants at least some access to his or her data, held by the AR system (e.g., as personal and/or account-related data) or at least some permissions, to girl 101. Furthermore, the user can specify exactly what levels of such data access or other permissions will be granted to girl 101 by selecting one or more additional options presented within floating menu 503, as follows:

The first additional option, namely option 513, signifies a lower level of data access or other permissions that the user may grant girl 101, labeled with a link indicator and/or "L-0" or "Level 0" indicator. For example, in some embodiments, by selecting option 513 (e.g., by actuating one of sensory regions 305 associated with software run by the control system of the AR system with actuating option 513), the user may establish a simple link or connection with girl 101 managed by the control system, such that girl 101 and the user may see one another on a list of connections maintained by the AR system. In some embodiments, the user and girl 101 may locate one another and attempt other interactions with one another (such as through a dialogue facility maintained by the AR system). In some embodiments, such links may be mutual, in the sense that both girl 101 and the user must select an option in order for a Level 0 connection to be maintained. In other embodiments, such links may be "one-way," in the sense that either girl 101 or the user maintain a link to the other, while the other may or may not. In some embodiments, whether users have gained such links or other levels of access from a particular number of users may be indicated to other users of the system as one of several possible user status indicators. In some embodiments, such user status indicators, such as the number of "links given" to the user may be represented as a virtual object known as a "badge," which may be shown as an enhancement of the user's body or appearance to other users of the AR system viewing the user. By viewing such badges, users may instantly assess the level of trust provided to the user, which information may inform other users interactions with the user. In some embodiments, such badges may only be shown to other users if those other users have been granted a particular level of access to the user's data or other permissions. In some embodiments, the number of others who have granted the user other, higher levels of data access or other permissions may similarly be assessed and indicated to other users of the AR system, for example, in the form of other virtual objects or badges, according to similar rules. Conversely, the number of links or other levels of data access or other permissions that a user has granted may be reported to other users of the AR system, in some embodiments. In some embodiments, users may elect to show such badges or other indicators to all other users, e.g., by selecting a "public" setting for such indicators, rather than restricting viewers of such data, e.g., in a "private" setting of the AR system software. Similarly, any other user data maintained by the system, such as the user's written biography maintained on the AR system, or other works of writing, videography or other recording (a.k.a., "stories") may be published to all using a "public" setting, or restricted to those with particular levels of access granted by the user, using a "private" setting.

Generally speaking, in some embodiments, the AR system maintains users' data according to various levels of sensitivity or privacy. By escalating the level of access to his or her data and other permissions granted to another user of the AR system, such as girl 101, a user indicates a level of trust that may be used by the AR system as a basis for other actions, such creating and presenting badges, or granting access to particular virtual objects or whole simulated environments of the AR system.

The second additional option of floating menu 503, namely, option 515, signifies the next higher level of data access or other permissions that the user may grant girl 101, labeled "Level 1" in some embodiments, as pictured. By selecting option 515 (e.g., by actuating one of sensory regions 305 associated with software run by the control system of the AR system with actuating option 515), the user may share additional data or other permissions with girl 101. For example, in some embodiments, the user will thereby share his or her user profile, maintained by the AR system. The user profile may be any group of descriptive data about the user, such as a biography or other personal statement of the user, a resume of the user, a mantra or message defining the user, or badges (as discussed above), in various embodiments. In some embodiments, girl 101 may view a personal statement by the user, once the user has selected option 513, such as a short biographical statement ("bio"), and other, more basic information about the user and the application.

The next additional option of floating menu 503, namely, option 517, signifies the next higher level of data access or other permissions that the user may grant girl 101, labeled "Level 2" in some embodiments, as pictured. By selecting option 517 (e.g., by actuating one of sensory regions 305 associated with software run by the control system of the AR system with actuating option 517), the user may share additional data or other permissions with girl 101. For example, in some embodiments, the user will thereby share his or her social media data, from any number of additional social media systems, other than the AR system, such as the social media applications maintained by FACEBOOK, Inc. or LINKEDIN Corporation. In some embodiments, the control system will grant girl 101 access to view the user's energy type(s) and energy level(s), as discussed in this application.

The next additional option of floating menu 503, namely, option 519, signifies the next higher level of data access or other permissions that the user may grant girl 101, labeled "Level 3" in some embodiments, as pictured. By selecting option 519 (e.g., by actuating one of sensory regions 305 associated with software run by the control system of the AR system with actuating option 519), the user may share additional data or other permissions with girl 101. For example, in some embodiments, the user will thereby share "personal setups," of the user, as maintained by the AR system. Personal setups may include data and other permissions granted to other users of the system, in some embodiments. In some embodiments, the control system may provide girl 101 with access to biometric data and markers, as set forth elsewhere in this application, if the user selects option 519.

The next additional option of floating menu 503, namely, option 521, signifies the next, highest level of data access or other permissions that the user may grant girl 101, labeled "Level 4" in some embodiments, as pictured. By selecting option 521 (e.g., by actuating one of sensory regions 305 associated with software run by the control system of the AR system with actuating option 521), the user may share all of his or her data or other permissions available on through the AR system with girl 101, in some embodiments. In this sense, option 521 represents the ultimate, or 100 percent, trust in girl 101 that is possible through the AR system, in such embodiments. For example, in some embodiments, the user will thereby share all of the data set forth above, for other levels of data access and other permissions, as well as any and all other of his or her data or permissions available through the AR system. In some embodiments, such permissions may include the right to actuate the user's sensors or actuators on the user's body suit, to cause vibrations or the sensation of touch by the girl actuating her own body suit or gloves, for example. In other embodiments, any and all of the user's data related to his experience controlled by the control system may be shared with girl 101, if the user has selected option 521, and continuously so, at all times going forward.

As mentioned above, various statuses of other users, such as girl 101, may be indicated by a virtual object, now shown as indicator 523. As shown, indicator 523 indicates that girl 101 has been granted the ultimate level of access, "Level 4," signified by a lightning bolt patterned avatar or other virtual object.

In some embodiments, the user may also remove any of the data access or other permissions, through another GUI menu, at his or her discretion. In some such embodiments, a certain number of other users to so remove data access or permissions for a user may be used by the AR system to "flag," "ban," or otherwise penalize the user. In some embodiments, once a particular level of data access and permissions have been granted by a user to another user, as discussed above, the control system will not permit a removal of certain of those levels of data access and permissions. In other words, in some embodiments, the level of access and permissions granted from one user to another user is permanently maintained by the control system. In some embodiments, however, a user may end the level of access and permissions granted to another user at any time. In still other embodiments, a user may not selectively remove certain of the levels of access and permissions granted to another user, while maintaining the levels of access and permissions granted to another user. In such embodiments, a user may be required to either maintain all levels of access and permissions granted to another user, or remove all of them (e.g., by "banning" another user completely, selecting a GUI option cutting off all interaction with that other user through the control system.)

Figure 6:
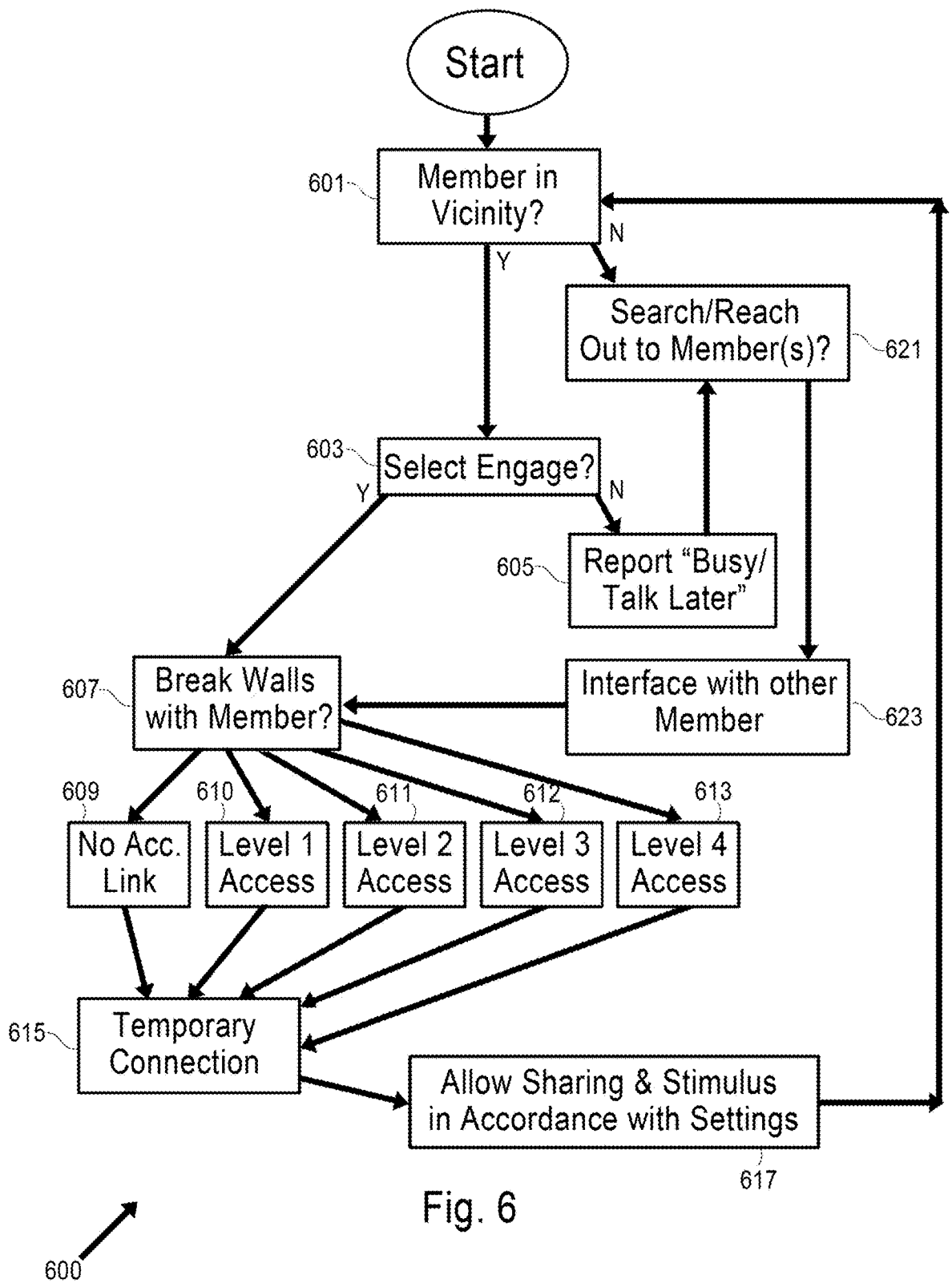
FIG. 6 is a process flow diagram, setting forth several example steps that may be undertaken by a control system (such as the example control system set forth below, in reference to FIG. 7) according to some embodiments of the present invention.

FIG. 6 is a process flow diagram, setting forth several example steps 600 that may be undertaken by a control system within an AR system (such as the example control system set forth below, in reference to FIG. 7) according to some embodiments of the present invention.

Beginning with step 601, the control system may start and determine whether another user of the AR system, such as girl 101, is within the user's view (and therefore, among other things, available and able to be augmented with virtual objects). If so, the control system proceeds to step 603, in which it determines whether the user has selected option 507, as discussed above, indicating to the AR system that the user seeks to engage with that other user, such as girl 101. If not, as discussed above, the control system may indicate to that other user that the user is busy or otherwise unavailable to interface at present, in step 605. If, by contrast, the user has indicated to the AR system that he or she seeks to engage the other user, further options are presented, in steps 607 et seq.

In step 607, the control system determines that the user has selected a GUI option, such as floating menu option 511, discussed above, indicating that the user wishes to grant access to at least some of his or her data, or other permissions, to the other user (a.k.a. "breaking walls" between the users). The control system then proceeds, in simultaneous steps 609 through 613, to determine what level of data access and other permissions have been granted. Examples of such levels of access, and the resulting actions by the control system and/or AR system, are set forth above, in reference to FIG. 5.

In any event, if the user grants a level of access to the other user, the control system proceeds to step 615, in which it creates a temporary connection, for the duration of the meeting being held (with the user and the other user, such as girl 101, within view of one another, or otherwise in session with one another).

In step 617, the control system allows the user and the other user, such as girl 101, to share messages, data, and stimulate one another (for example, using actuators, such as sensor actuator points 903, discussed further below) in accordance with the level of access provided to one another.

If, at step 601, no other user was determined to be within the user's vicinity, the control system may present a search tool to the user, allowing him or her to search for other users of the AR system (a.k.a. "members"), in step 621. If another member is located, and determined to be available (actively using the AR system), the control system may facilitate interfacing with that other user, from a distance, using the AR system, in step 623. The control system then proceeds to steps 607 et seq., with respect to the user and the other user located through that search tool.

The process may then restart.

Figure 7:
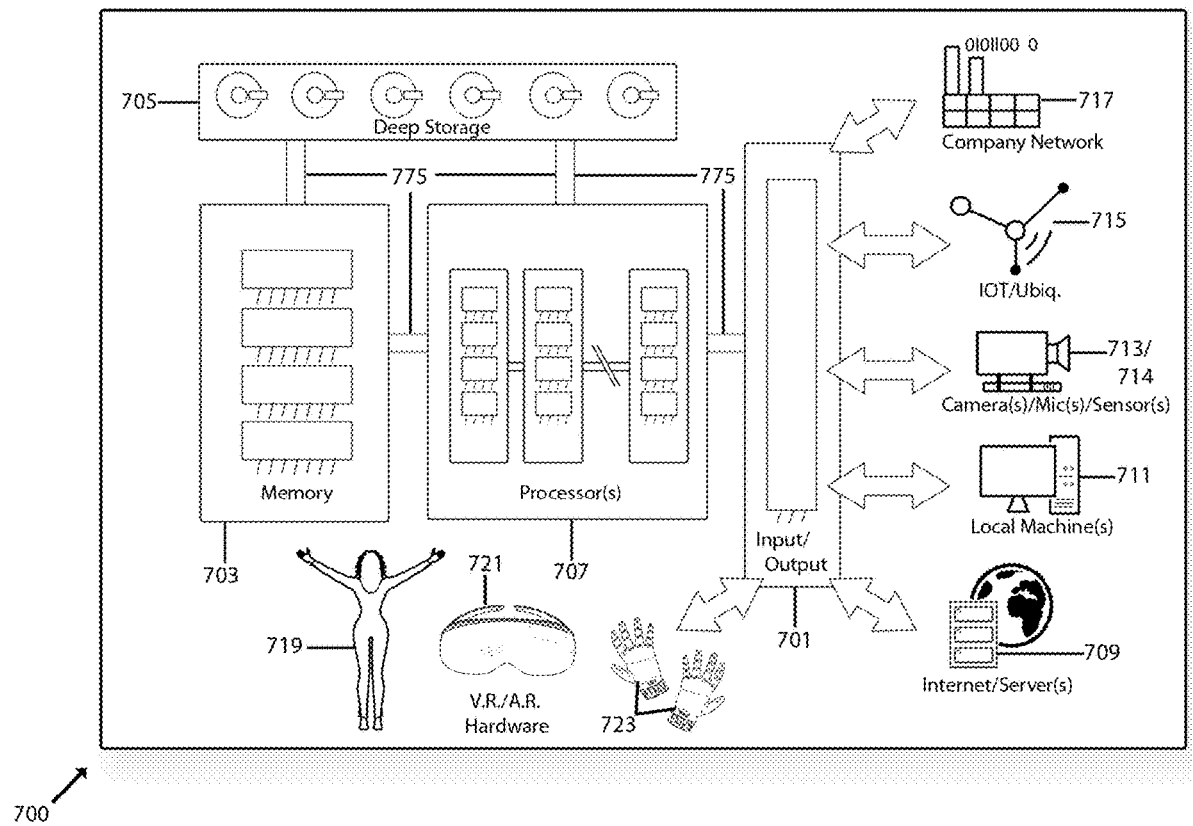
FIG. 7 is a schematic block diagram of some elements of an example control system that may be used to implement various aspects of the present invention, some of which aspects are described in reference to FIGS. 1, 2, and 4 of this application.

FIG. 7 is a schematic block diagram of some elements of a control system (hereinafter, the "system" or "control system") 700, in accordance with some example embodiments of the present invention. In some such example embodiments, the control system incorporates a non-transitory machine-readable medium storing instructions, that when executed by one or more processors, execute various aspects of the present invention described herein. The generic and other components and aspects described herein are not exhaustive of the many different systems and variations, including a number of possible hardware aspects that might be used, in accordance with the example embodiments of the invention. Rather, the control system 700 is an example embodiment.

Control system 700 includes an input/output device 701, a memory device 703, long-term data storage device 705, and processor(s) 707. The processor(s) 707 is (are) capable of receiving, interpreting, processing and manipulating signals and executing instructions for further processing and for output, pre-output and/or storage in and outside of the system. The processor(s) 707 may be general or multipurpose, single- or multi-threaded, and may have a single core or several processor cores, including microprocessors. Among other things, the processor is capable of processing signals and instructions for the input/output device 701, to cause a user interface to be provided (e.g., floating menu 503) for use by a user on hardware, such as, but not limited to, physical hand controls (e.g., with gloves 723, which may be the same gloves 303, discussed above) and/or a personal computer monitor or terminal monitor with a mouse and keyboard and presentation and input-facilitating software (as in a graphical user interface, a.k.a. a "GUI") (e.g., on local machine(s) 711, glasses 721, which may be glasses 109 and/or 201, or, for example, a smartphone running an application maintained by the control system).

For example, user interface aspects, such as graphical "windows," "buttons" and data entry fields, may present via, for example, a display, a selectable option. When the option is selected, such selection causes aspects of the control system to command other aspects of the control system to present virtual objects, generate, gather, produce and control the revelation of personal data for users, and maintain VR and/or AR environments. For example, and as explained in greater detail above, the control system may create an AR environment using a virtual object generating headset, such as glasses 110/201, connected with the control system, and using body suit 113, as set forth above. The processor(s) 707 may execute instructions stored in memory device 703 and/or long-term data storage device 705, and may communicate via system bus(ses) 775. Input/output device 701 is capable of input/output operations for the system, and may include and communicate through input and/or output hardware, and instances thereof, such as a computer mouse, scanning device or other sensors, actuator(s), communications antenna(ae), keyboard(s), smartphone(s) and/or PDA(s), networked or connected additional computer(s), camera(s) or microphone(s), a mixing board(s), real-to-real tape recorder(s), external hard disk recorder(s), additional movie and/or sound editing system(s) or gear, speaker(s), external filter(s), amp(s), preamp(s), equalizer(s), computer display screen(s), actuable body suit(s) with sensor/actuators, VR or AR hardware, such as headsets, hand controls or touch screen(s). Such input/output hardware could implement a program or user interface created, in part, by software, permitting the system and user to carry out the user settings and input discussed in this application. Input/output device 701, memory device 703, data storage device 705, and processor(s) 707 are connected and able to send and receive communications, transmissions and instructions via system bus(ses) 775. Data storage device 705 is capable of providing mass storage for the system, and may be or incorporate a computer-readable medium, may be a connected mass storage device (e.g., flash drive or other drive connected to a Universal Serial Bus (USB) port or Wi-Fi), may use back-end (with or without middle-ware) or cloud storage over a network (e.g., the Internet) as either a memory backup for an internal mass storage device or as a primary memory storage means, or may simply be an internal mass storage device, such as a computer hard drive or optical drive. Generally speaking, the system may be implemented as a client/server arrangement, where features of the system are performed on a remote server, networked to the client and made a client and server by software on both the client computer and server computer. Also generally speaking, the system may be implemented as middleware, whereby it provides output and other services to an external system, including, but not limited to, any of the example devices and auxiliary devices and/or systems, shown as internet server(s) 709 and local machine(s) 711, cameras and microphones 713, sensor(s) 714, internet of things or other ubiquitous computing devices 715, company network 717, body suit 719, glasses 721 and hand controls 723. Similarly, the control system 700 is capable of accepting input from any of those auxiliary devices and systems, and modifying stored data within them and within itself, based on any input or output sent through input/output device 701.

Input and output devices may deliver their input and receive output by any known means, including, but not limited to, any of the hardware and/or software examples shown as internet server(s) 709, local machine(s) 711, cameras and microphones 713, sensor(s) 714, internet of things or other ubiquitous computing devices 715, company network 717, body suit 719, glasses 721 and hand controls 723.

While the illustrated example of a control system 700 in accordance with the present invention may be helpful to understand the implementation of aspects of the invention, any suitable form of computer system known in the art may be used—for example, a simpler computer system containing just a processor for executing instructions from a memory or transmission source. The aspects or features set forth may be implemented with, and in any combination of, digital electronic circuitry, hardware, software, firmware, middleware or any other computing technology known in the art, any of which may be aided with external data from external hardware and software, optionally, by networked connection, such as by LAN, WAN or the many connections forming the Internet. The system can be embodied in a tangibly-stored computer program, as by a machine-readable medium and propagated signal, for execution by a programmable processor. The many possible method steps of the example embodiments presented herein may be performed by such a programmable processor, executing a program of instructions, operating on input and output, and generating output and stored data. A computer program includes instructions for a computer to carry out a particular activity to bring about a particular result, and may be written in any programming language, including compiled and uncompiled and interpreted languages and machine language, and can be deployed in any form, including a complete program, module, component, subroutine, or other suitable routine for a computer program.

Figure 8:
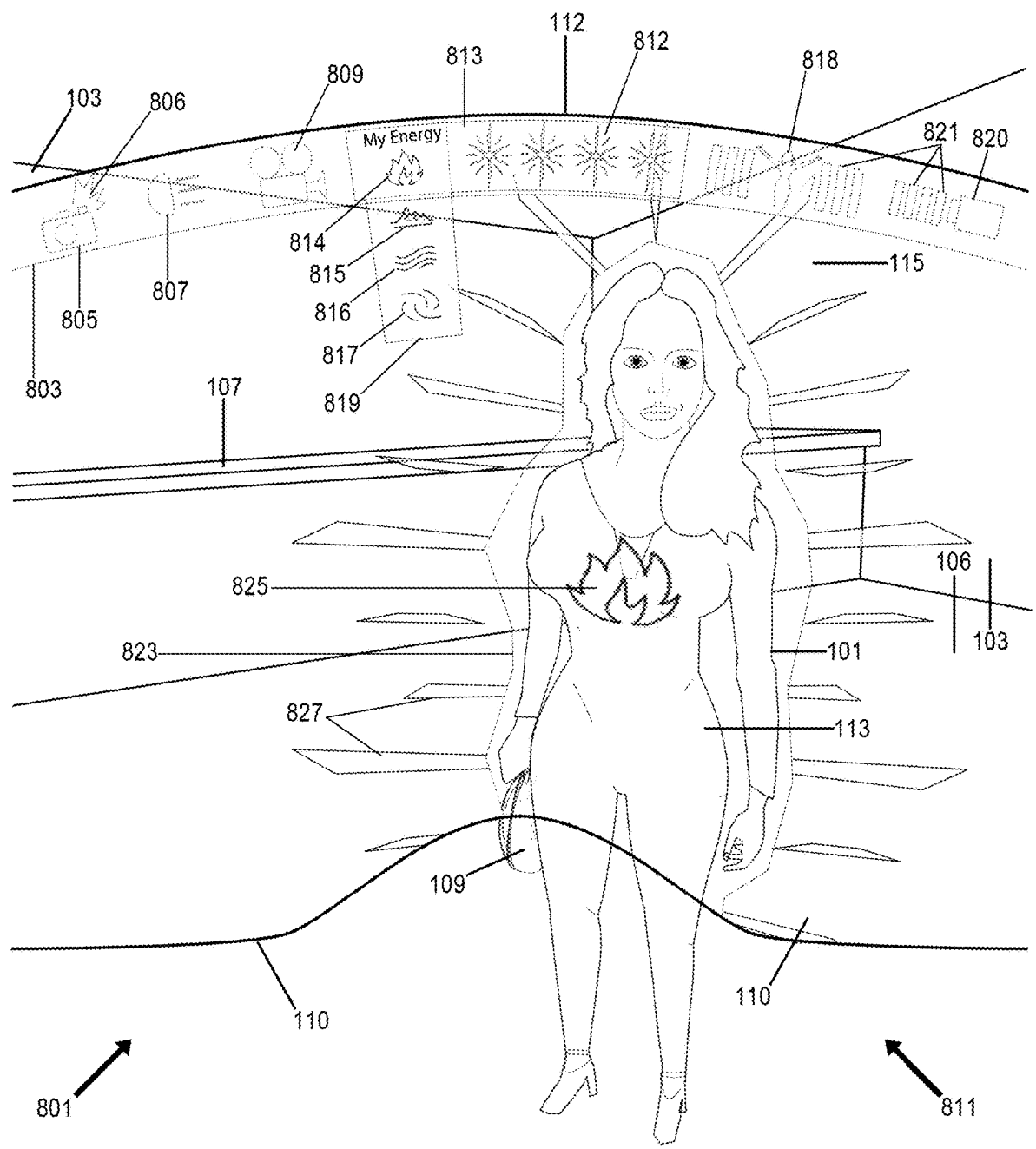
FIG. 8 depicts a similar example implementation environment as that set forth in FIGS. 1 and 5, above, along with additional GUI aspects, according to some embodiments of the present invention.

FIG. 8 depicts an example implementation environment 801, similar to the environments set forth in FIGS. 1 and 5, above, along with additional GUI aspects, according to some embodiments of the present invention. More particularly, a new GUI tool, which will be referred to as a "dashboard" 803, is pictured. Dashboard 803, as with other GUI aspects set forth in the present application, may be presented on a display screen within a set of glasses, such as glasses 110, of an AR system including a computer hardware and software control system, such as the example control system 700 set forth above in FIG. 7. Also as with other GUI aspects set forth above, dashboard 803 may display graphical information to a user, and may include various available user-selectable options (for example, using hand controls or other GUI interface hardware, according to techniques discussed in this application).

Several GUI sub-tools are presented within dashboard 803, in some embodiments. First, proceeding from left-to-right, in the perspective of the figure, dashboard 803 includes a camera status indicator 805, in some embodiments. Camera status indicator 805, when appearing, or, in some embodiments, when appearing colored or darkened, indicates that the user has activated still image recording function, as discussed in greater detail below. Furthermore, camera status indicator 805 may include a sub-feature, in some embodiments—namely, flash indicator 806. When appearing, or, in some embodiments, when appearing colored or darkened, flash indicator 806 indicates that recording of still pictures will be aided by environmental illumination—for example, via flash or other light-generating device 219.

Proceeding to the next dashboard sub-tool, lamp indicator 807, when appearing or, in some embodiments, when appearing colored or darkened, may indicate that the user has activated a light for lighting the environment 800, and scene 811.

Proceeding to the next dashboard sub-tool, video recording indicator 809, when appearing or, in some embodiments, when appearing colored or darkened, may indicate that the user has activated a video recording function, as discussed in greater detail below.

Proceeding to the next, central dashboard sub-tool, personal energy level indicator 813, when appearing or, in some embodiments, when appearing colored or darkened, may indicate the user's energy mode and energy level. In some embodiments, that energy mode and energy level may be broadcast to other users of the VR or AR control system, such as girl 101, and vice versa. In other words, girl 101, as another user of the AR system, may have her energy mode, and energy level, shared with the user in some embodiments—for example, via engaged user's energy level indicator 818. In either case, energy levels (which may be the user's emotional energy or the degree to which he or she feels the energy mode indicated) may be self-reported in some embodiments, with the user personally identifying with the characteristics of the particular energy mode, and the degree to which he or she feels that way. For example, in some embodiments, a user may select a "fire mode" indicator 814, which may indicate that he or she is feeling highly engaged and outgoing, and willing to participate in mutual work or social activities, in some embodiments. In some other embodiments, a user may select an "earth mode" indicator 815, which may indicate that he or she is not feeling particularly sociable, but willing and able to work on practical matters. As a third mode, a user may select "water mode" indicator 816, in some embodiments, which may indicate that the user is feeling very relaxed or spiritual connections with others and the world, but not in the mood for any particular practical interactions or work. Finally, a user may select a "wind mode" indicator 817, which may indicate that he or she is feeling intellectually engaged and inquisitive. In some embodiments, a user may select from any of the energy modes and energy levels indicated within personal energy level indicator 813, with the aid of a vertical energy mode option bar 819, presenting any of the energy modes that are available or selection, such as those set forth above. A user may also display different energy levels, associated with the degree to which he or she feels any of the traits set forth above for the particular energy mode selected by the user, using an energy level display 812 (e.g., a greater level of "stars" indicating a greater energy level). In some embodiments, the AR system may determine users' energy modes and energy levels as well, e.g., through pattern matching between a user's body language, postures and stored data related to such body language and postures.

An overall energy level indicator 820 may also be presented in some embodiments. Overall energy level indicator 820 may indicate whether the user is becoming tired, or has been engaged in the VR or AR system for a particular length of time, with more or less bars 821 appearing when the user is less tired, or has been engaged in the VR or AR system for a lower amount of time, in some embodiments. In some embodiments, the control system may determine a user's overall energy level, and display a corresponding level of energy with energy level indicator 820, based on the user's amount of interaction through the control system. In some embodiments, the control system may determine a user's overall energy level, and display a corresponding level of energy with energy level indicator 820, based on the recency of a user's of interaction through the control system. In some embodiments, the control system may apply an algorithm including the user's overall energy level (for example, to determine a V-Score, as discussed in greater detail below) and change an VR or AR environment based on such a V-Score.

As mentioned above, in some embodiments, virtual objects may be placed at, over or near particular environmental objects as an AR system augmentation of the user's environment 800. In particular, any of the energy levels or modes of another user, such as girl 101, may be shown, overlaying the user's view of girl 101, and other aspects of environment 800, in some embodiments. For example, girl 101 appears overlaid with an aura virtual object 823, appearing to the user to cover and surround her. In some embodiments, aura virtual object 823 may be a particular signature glowing illumination effect or color, associated with a particular energy mode she has chosen to display. In other embodiments, an icon virtual object 825 may appear to be laid over the user's clothing, to so indicate her energy mode. Similarly, an energy-indicating augmentation virtual object, such as the example shown as 827, may be included in some embodiments, with the amount and size thereof surrounding girl 101 indicating her energy level, within the particular energy mode she is displayed with.

Figure 9:
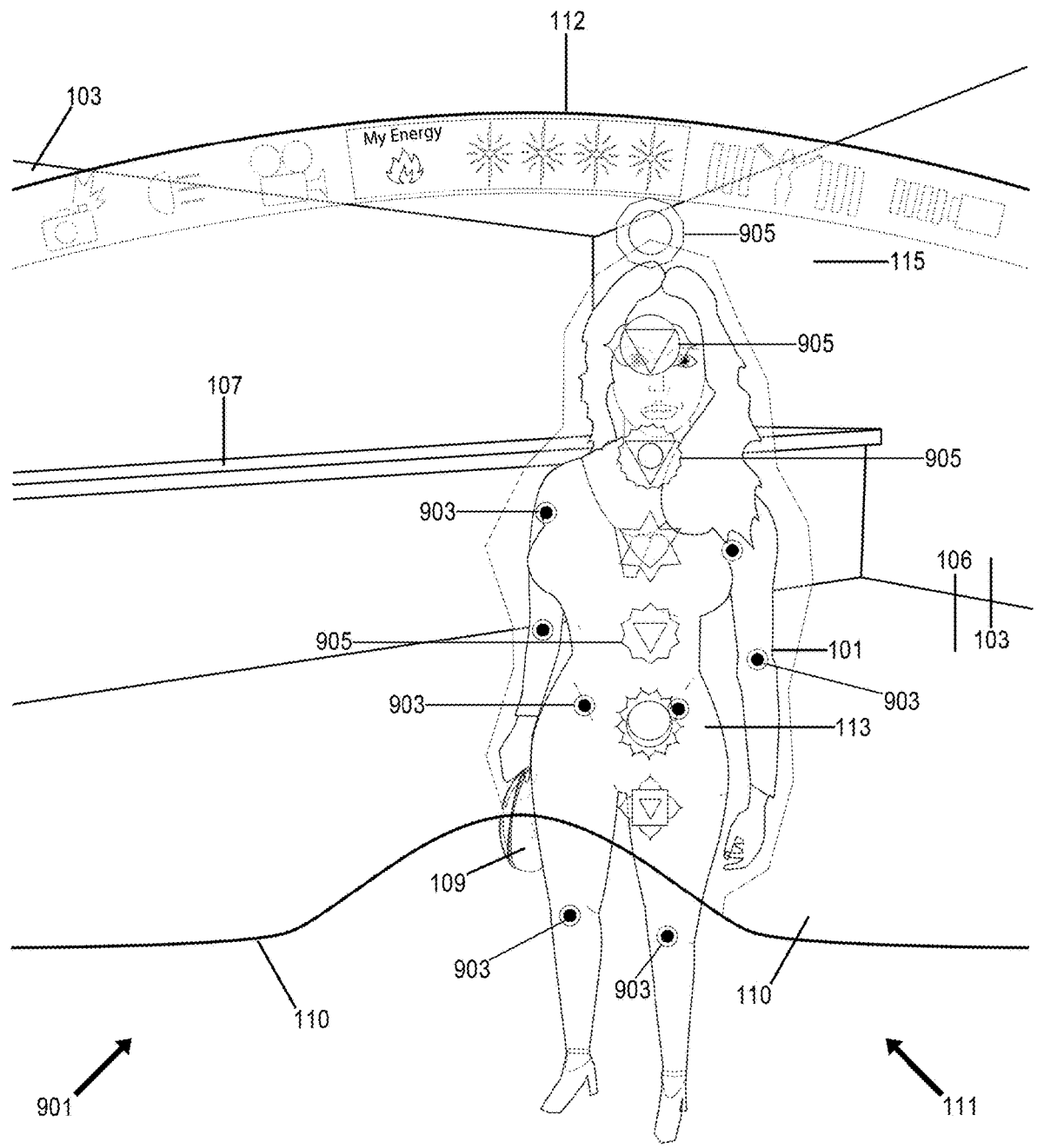
FIG. 9 depicts an example implementation environment, similar to the environments set forth in FIGS. 1, 5 and 8, above, along with additional GUI aspects, according to some embodiments of the present invention.

FIG. 9 depicts an example implementation environment 900, similar to the environments set forth in FIGS. 1, 5 and 8, above, along with additional GUI aspects, according to some embodiments of the present invention. More particularly, new sensor and actuator devices, which will be referred to as "points," such as the examples shown as 903, are pictured. Points are present at various locations of a user body suit, such as body suit 113, and, in some embodiments, are connected to, and able to send and receive information from, a computer hardware and software control system, such as the control system set forth above, in reference to FIG. 7. In some embodiments may be shown as overlaid with particular virtual objects, such that they, and their status, are more visible to a user of the system. Points 903 include haptic feedback hardware, in some embodiments, and can deliver that haptic feedback to a user's body at that location of the body suit, upon command from the control system and./or from another user who has been granted that level of access through the AR system. In some embodiments, that haptic feedback may include vibrations or other sensations. In other embodiments, the points include sensors for sensing and recording movement and biometrics at the location of the point, for use in the AR system. For example, in some embodiments, the user's body temperature, pulse, movement or other activities may be sensed and recorded by the AR system through the points 903. Preferably, points 903 are located on or near the user's joints, or at other points on the body suit associated with locations of the user's body that are known pressure points. The exact array and location of points 903 shown are example only, and a wide variety of alternate numbers and locations of points 903 may be used, in various embodiments, as will be apparent to those of ordinary skill in the art implementing the present invention.

In some embodiments, virtual objects may be displayed over a user's body at various positions, such as, but not limited to the points 903, discussed above. Those virtual objects, such as the chakra-shaped virtual objects, such as the examples shown as 905, may represent real or perceived aspects of the user sensed by points 903, body suit 113, and sensed and recorded by the AR system generally. If some of those aspects are perceived to be more prominent or intensely felt or otherwise extant, virtual objects such as 905 may become more prominent, brightly colored, or overlaid with information, to so indicate, in some embodiments. In some embodiments, the personal attributes traditionally attributed to such chakras in various religions may correspond with such an emphasis of particular virtual objects through such apparent prominence, brightness or overlaid information, as carried out through virtual objects created by the AR system.

Figure 10:
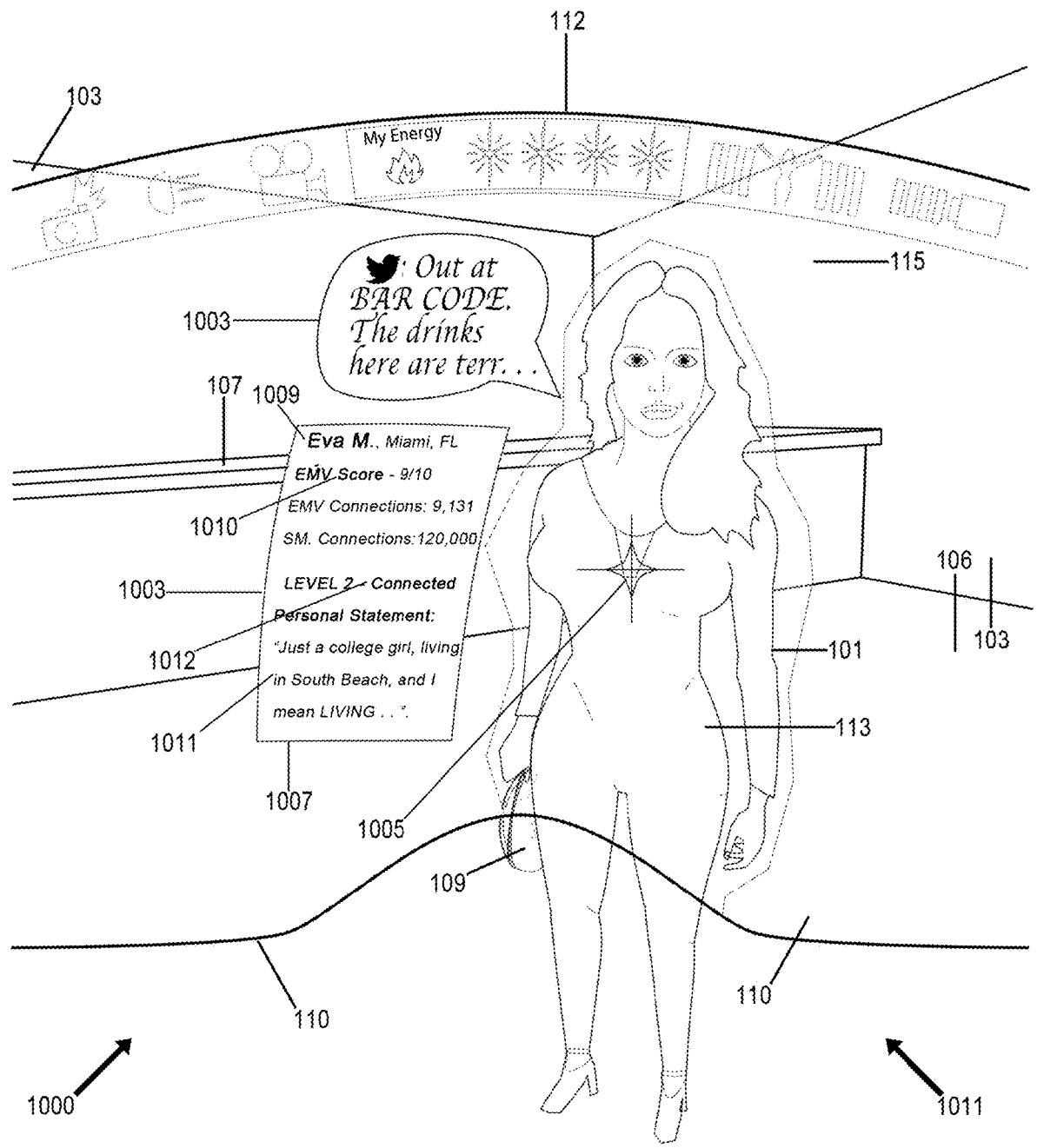
FIG. 10 depicts an example implementation environment, similar to the environments set forth in FIGS. 1, 5, 8 and 9 above, along with additional GUI aspects, according to some embodiments of the present invention.

FIG. 10 depicts an example implementation environment 1000, similar to the environments set forth in FIGS. 1, 5, 8 and 9 above, along with additional GUI aspects, according to some embodiments of the present invention. More particularly, new GUI tools, which will be referred to as a social media augmentations 1003, are pictured. In addition, a floater tool, including a location indicator 1005, is illustrated. Social media augmentations 1003 and floater tool location indicator 1005, as with other GUI aspects set forth in the present application, may be a virtual object presented on glasses, such as glasses 110, of an AR system including a computer hardware and software control system, such as the example control system 700 set forth above in FIG. 7. One form of social media augmentation, an example of which is pictured as profile 1007, is the other user's profile (such as girl 101's profile). User profile 1007 may be a combination of information relevant to the person currently being engaged with by the other user, such as girl 101. As shown in the example, profile 1007 arranges and presents certain key social media data and information shared with the user (e.g., if she has granted him a level of access to her personal and social media data allowing the sharing of that information). Such information in profile 1007 may include the other user's name or alias 1009, her V-Score 1010 (as discussed above), her personal statement or biography 1011, and the level of personal engagement and access she has granted to the user, in an engagement level indicator 1012. Another form of social media augmentation is shown as micro-blog post fragment 1013. Micro-blog post fragment 1013 may be a partial quote from a recent statement by the other user, such as girl 101. Both of the social media augmentations—namely, profile 1007 and micro-blog post fragment 1013—are shown displayed in a position next to the other user, girl 101, which may occur based on the control system recognizing girl 101 as an object, and recognizing a relationship between her and those social media augmentations. However, as mentioned above, and as will be discussed in greater detail below, a user may place virtual objects in other ways, in some embodiments. For example, using a GUI tool known as a floater, a user may use his or her eye position(s), movement(s) and orientation(s), and other control input, which are recognized by the control system, to otherwise place, manipulate and alter virtual objects.

As will be explained in greater detail below, any virtual objects, including, but not limited to, GUI tools such as social media augmentations 1003, may be displayed by an AR system according to any number of software-implemented display rules by a computer hardware and software control system, such as system 700, through glasses 201, according to particular rules for placing those virtual objects at apparent positions relative to the user's eye direction and movement, as they may impact the apparent location of a floater tool controlled by a floater, its location indicator (such as 1005), and virtual objects created and placed at locations within a 3D VR or AR environment based on the movement and actions of a floater and/or floater tool. The example floating menu 503 set forth in reference to FIG. 5, above, was one such virtual object set according to such rules. An example software process for determining the location of a floater tool, or virtual object placed according to such a floater tool, is set forth in greater detail below, in reference to FIG. 12. However, the location of such a floater and floater tool, based on the user's eye direction and movements, may be demonstrated by a virtual object in the form of reticle 1017, in some embodiments. In some embodiments, reticle 1017 is one form of floater tool location indicator 1005. In other words, as the user's eye's move about, as the user gazes at different points within 3D environment 1000, the reticle 1017 may indicate the location coinciding the directions of his or her eyes, and/or follow his or her eye movements, with its apparent location. Thus, as shown in FIG. 10, if the user gazes at girl 101, floater tool location indicator 1005 and reticle 1017 appear to be overlaid onto girl 101. In some embodiments, an intention of the user, such as the intention to engage with another user, may be inferred from the location, and recent history of locations, of a floater or floater tool. In such embodiments, if the control system determines, based on such a history (e.g., eyes directed at the other user for more than 10 seconds or 5 times in the last 5 seconds) the control system may follow steps 603 et seq., set forth in FIG. 6, for engaging with other users. The floater, and a floater tool can be used for a number of disparate functions. In some embodiments, a user can select options to engage with girl 101, or attempt to do so, including certain subsequent steps, as set forth above, once the floater and its floater location indicator 1005 is overlaid onto her, in some embodiments. A floater tool may enable the user to create, place, move and alter virtual objects selected with and/or created by the floater tool, in some embodiments. In some embodiments, such actions can also be carried out with user controls and input. For example, by actuating hand controls, or otherwise indicating when to control a virtual object, a user can also move and transform that virtual object, in some embodiments.

Figure 11:
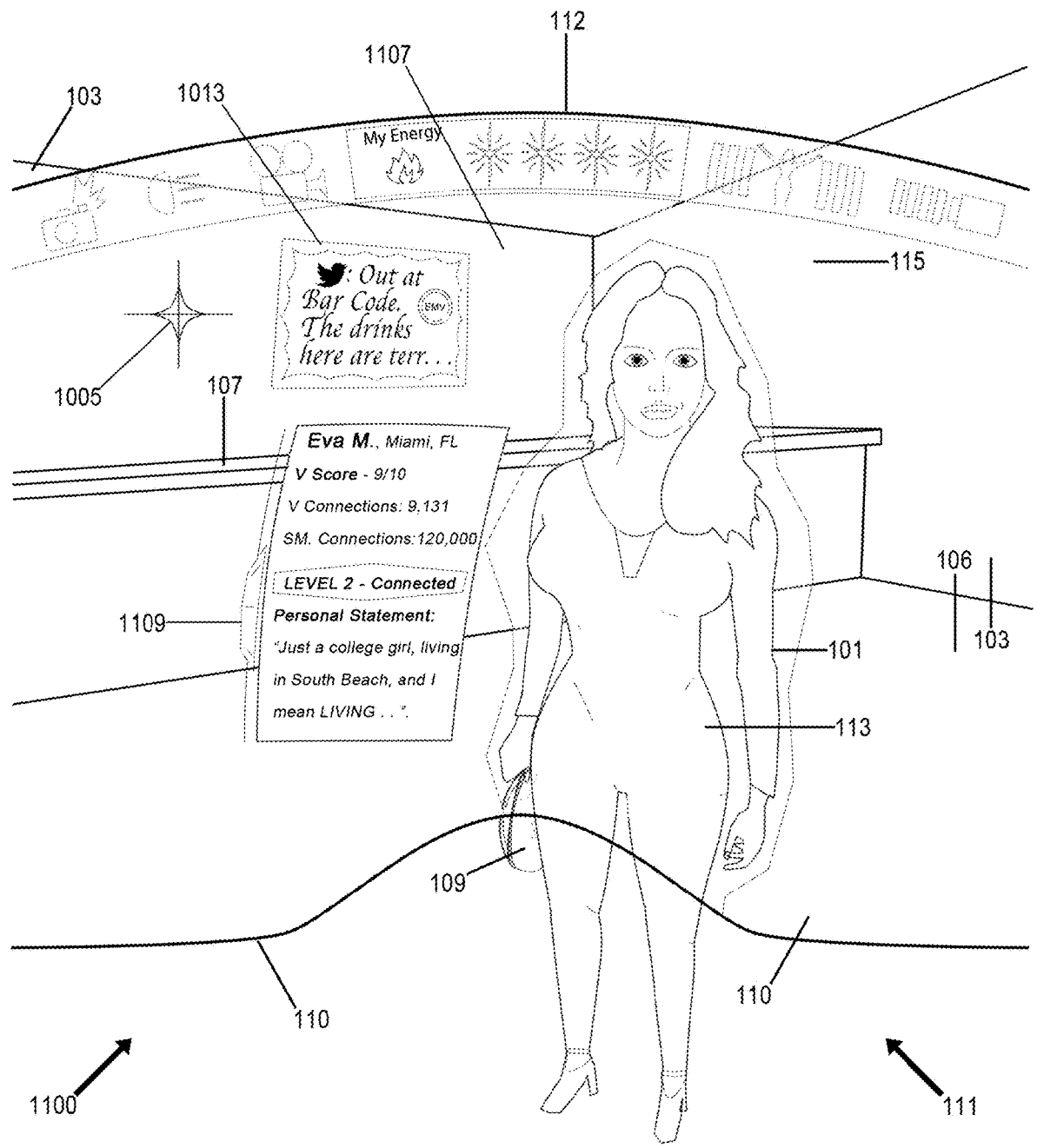
FIG. 11 depicts an example implementation environment, similar to the environments set forth in FIGS. 1, 5 and 8-10 above, along with additional GUI aspects, according to some embodiments of the present invention.

For example, as shown in FIG. 11, if the user determines that micro-blog post fragment 1013 relates to the location in which he is engaged, he may choose to alter its location and form, changing its apparent location to one of the walls 1107, as pictured. micro-blog post fragment 1013 may then appear to be in the same location, within the same perspective, as one of walls 1107, and may remain in its apparent position, regardless of how the user moves, until it is removed by the user.

As also shown in FIG. 11, the location of virtual objects may be altered by other user-actuable GUI tools, displayed by glasses such as 201, in some embodiments. For example, in some embodiments, a scroll bar 1109 may be placed next to profile 1007.

Figure 12:
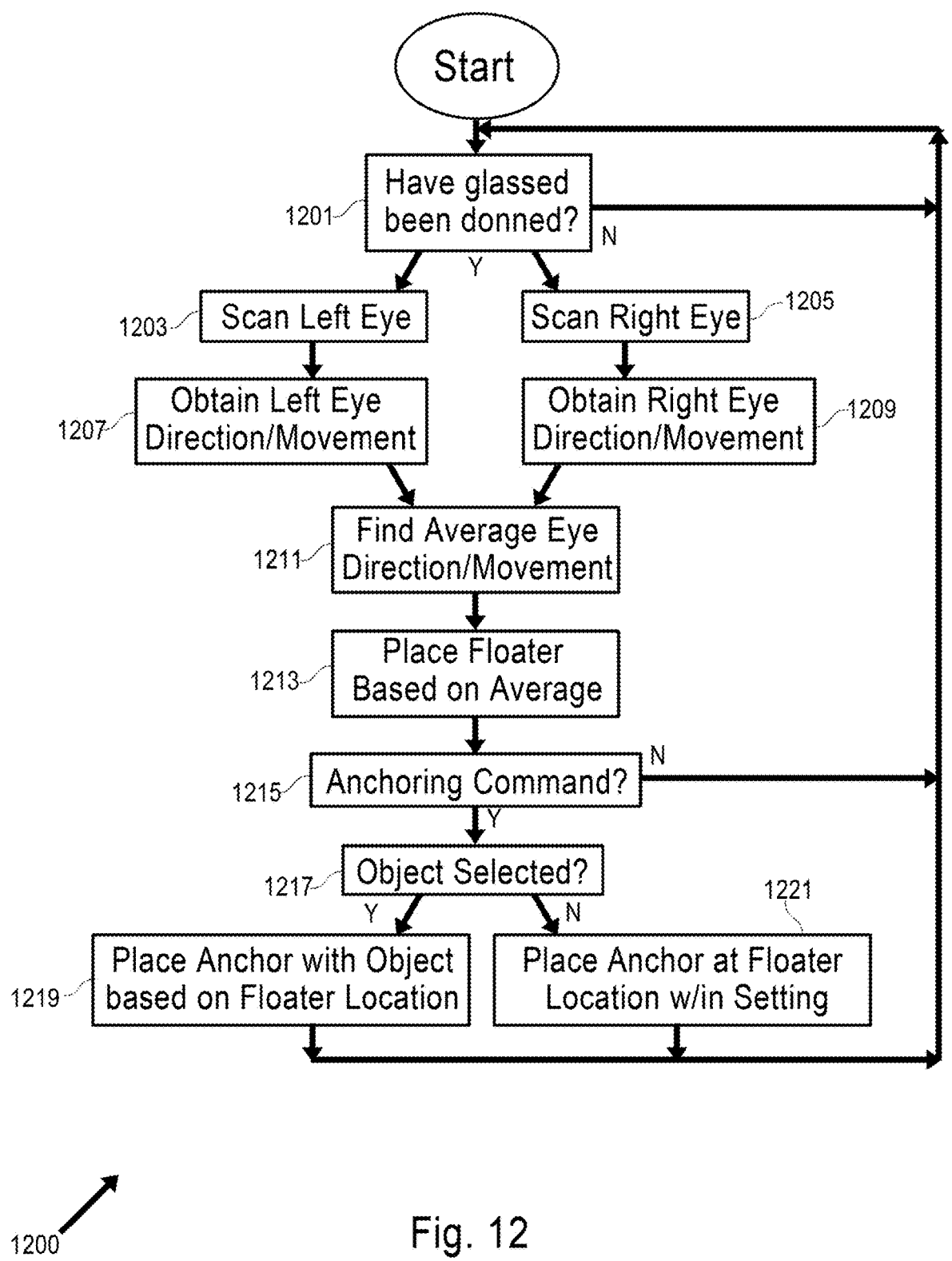
FIG. 12 is a process flow diagram, setting forth several example steps that may be undertaken by a control system (such as the example control system set forth below, in reference to FIG. 7) in relation to controlling a floater tool, according to some embodiments of the present invention.

FIG. 12 is a process flow diagram, setting forth several example steps 1200 that may be undertaken by a control system (such as the example control system set forth below, in reference to FIG. 7) in relation to moving and otherwise using a floater tool, according to some embodiments of the present invention.

Beginning with step 1201, the control system may start and determine (for example, with a user-actuable sensor within glasses 201) whether a user has donned particular necessary hardware for the AR system to operate (such as glasses 201). If the user has donned such hardware, such as glasses 201, the control system may proceed to steps 1203 and 1205, in which the control system, for example, using eye tracking hardware 214, scans each of the user's eyes, to determine their orientation and position. Based on those data, the control system proceeds, in parallel, to steps 1207 and 1209, to determine the direction in which the user's left eye is directed and moving, and to determine the direction in which the user's right eye is directed and moving. From these determinations, the control system next proceeds to determine an average of the left-eye direction and right-eye direction, and an average of the left-eye movement and the right eye movement, in step 1211.

Following this, the control system next proceeds to place a floater location indicator on a display, corresponding with that average direction and eye movement, in step 1213.

In some embodiments, a user may issue a command—for example, using hand controls such as those set forth above in this application—to position a virtual object relative to another object. The control system determines in step 1215, whether the user has issued such a command. If so, the control places that virtual object at a location relative to the other object, as commanded, in steps 1217 and 1219. If not, the control system may instead place the virtual object relative to the current location of the floater, in step 1221.

The process may then restart.

Figure 13:
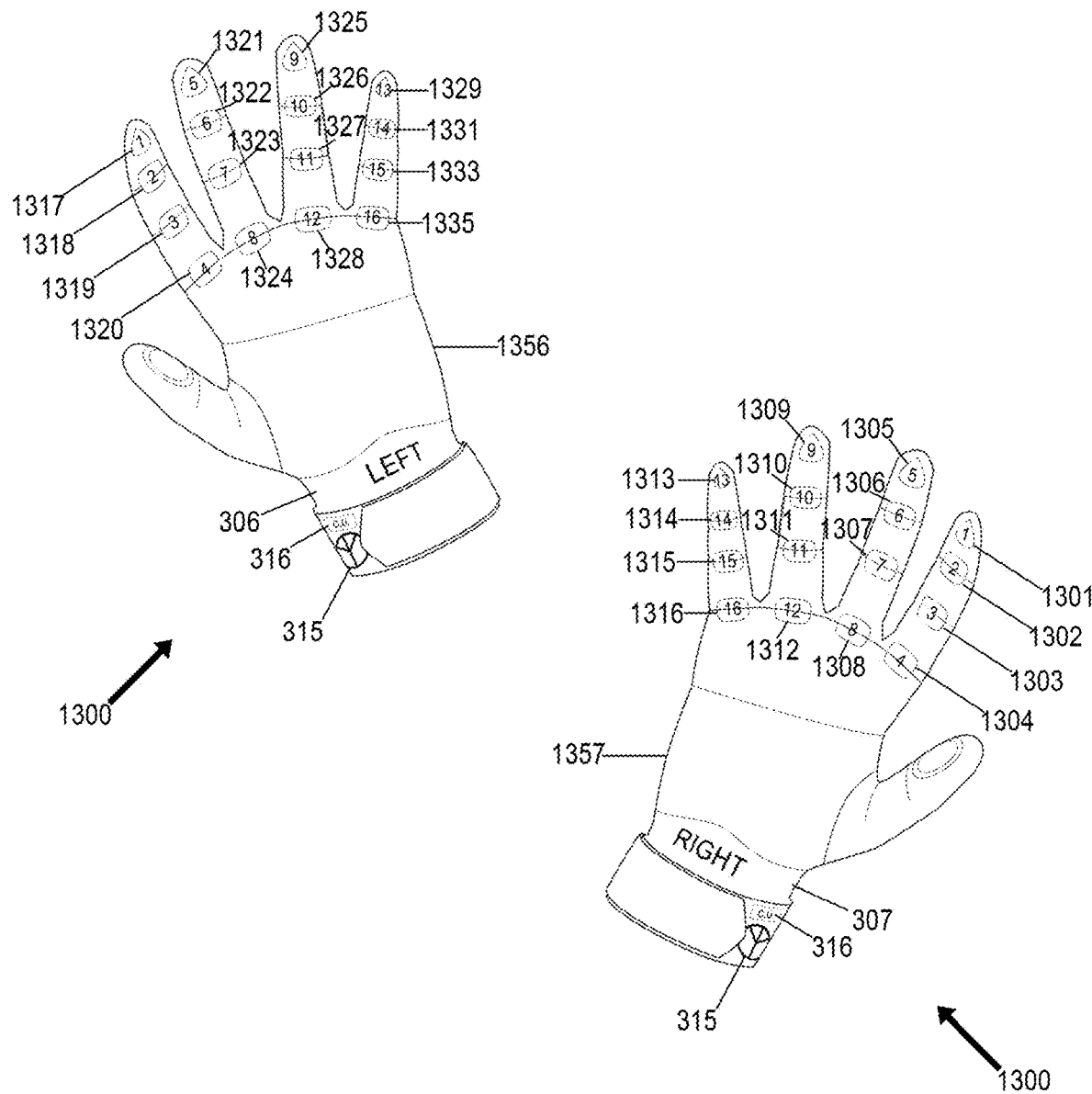
FIG. 13 is a perspective view of example hand controls of an VR and AR system, similar to the example hand controls set forth in FIG. 3, above, but labeled according to particular functions for sensors or sensory areas, according to some embodiments of the present invention.

FIG. 13 is a perspective view of example hand controls 1300 of a VR and AR system, similar to the example hand controls set forth above, in FIG. 3, but labeled according to particular functions for sensors or sensory areas, according to some embodiments of the present invention.

As with the hand controls shown previously, as 301, hand controls 1300 include a pair of gloves, now shown as 1353, with a shape complementary to, and able to be placed onto, a user's hands (not pictured). Gloves 1353 may include a left-hand glove 1356, and a right-hand glove 1357, each of which may include sensors or sensory regions, such as the example sensory regions shown as 1355.

However, the sensory regions 1355 of hand controls 1300 have been labeled, and specialized in their function, for example, by specialized hardware and software of a control system, such as the control system set forth above in reference to FIG. 7. In some embodiments, each sensory region 1355 has a different, discrete function for a user to provide data input to that control system, and manage functions of a VR and AR system, such as those described in the present application.

Beginning with sensory region 1301, at the tip of the right index finger 1361, of right-hand glove 1357, if a user actuates sensory region 1301, a music playing option of the software may be activated in some embodiments. In some such embodiments, a song selected by the user or the control system may be played from a music file maintained or accessible through the control system, and played for one or more user (e.g., by amplified sound through example earpieces 203 and 205 of example glasses 201, worn by the user.) Sensory region 1302, when touched or otherwise actuated by a user, may activate a flash or other lighting hardware device, such as the flash or other lighting hardware devices set forth above, in reference to FIG. 2 (e.g., flash or other light-generating device 219). Sensory regions 1303 and 1304, when touched or otherwise actuated by a user, may activate a zooming function for objects displayed on hardware of the control system, such as a "zoom out" and "zoom in" function, respectively, in some embodiments. For example, by actuating sensory region 1304, a user may cause display projector 213, discussed above, to project a magnified image of any virtual objects or other GUI aspects displayed on display screen 211. Conversely, by actuating sensory region 1303, a user may cause display projector 213, discussed above, to project a shrunken image of any virtual objects or other GUI aspects displayed on display screen 211. When a user touches or otherwise actuates sensory region 1305, the control system may begin recording images or videos of the surrounding environment—for example, by received image or video data from environmental camera 217. Conversely, when a user touches or otherwise actuates sensory region 1306, the control system may cease recording images or videos of the surrounding environment. A user may select whether that recording or ceasing of recording, by actuating regions 1305 and 1306, is by still images (e.g., photographs) or video (e.g., MPEG4), by touching or otherwise actuating either sensory region 1307 (selecting the video option) or sensory region 1308 (selecting the still image option). By actuating sensory region 1309, a user may activate a "filters" option, in which filters are applied to the images projected to a user's eyes. For example, various filters so applied by the control system may increase the brightness, contrast, definition, or other visible aspects of the images presented to a user through glasses 201. By actuating sensory region 1310, a user may summon and apply various VR or AR tools of the VR and AR system, such as the floater tool and its location indicator set forth as 1005, in FIG. 10, above. By actuating sensory region 1311, a user may activate a "mini movies" GUI aspect, displaying videos within a frame on display screen 211. By actuating sensory region 1312, a user may activate links to resources external to the control system, such as a website link. By using one sensory region (such as, by way of example, sensory region 1314) on the pinky finger of right-hand glove 1357, a user may activate a scrolling aspect of the VR and AR system, such as the scroll bar 1109, set forth in FIG. 11.

Similarly, each sensory region of left-hand glove 1356 may also be dedicated to activating a particular function of the VR and AR system. For example, each of the sensory regions of the index finger of left-hand glove 1356, when touched or otherwise actuated by a user, may activate an energy level indicator for a particular energy mode, such as the energy modes discussed in greater detail above, in reference to FIG. 8. For example, all of the sensory regions of the index finger may relate to the energy mode "fire," as discussed in greater detail above. By selecting the most distal sensory region of the finger (in the case of the index finger, sensory region 1317) a user may indicate that his or her energy level is at the lowest possible setting, or energy level 1, for the fire energy mode, which then may be indicated to other users, as discussed in greater detail above. By selecting sensory region 1318, a user may select the second, higher energy level, or energy level 2, for the fire energy mode, which then may be indicated to other users, as discussed in greater detail above. By selecting sensory region 1319, a user may select the third, higher energy level, or energy level 3, for the fire energy mode, which then may be indicated to other users, as discussed in greater detail above. Finally, by selecting sensory region 1320, a user may select the fourth, highest energy level, or energy level 4, for the fire energy mode, which then may be indicated to other users, as discussed in greater detail above.

As another example, in some embodiments, all of the sensory regions of the middle finger of glove 1356 may relate to the energy mode "earth," as discussed in greater detail above. By selecting the most distal sensory region of the finger (in the case of the index finger, sensory region 1321) a user may indicate that his or her energy level is at the lowest possible setting, or energy level 1, for the earth energy mode, which then may be indicated to other users, as discussed in greater detail above. By selecting sensory region 1322, a user may select the second, higher energy level, or energy level 2, for the earth energy mode, which then may be indicated to other users, as discussed in greater detail above. By selecting sensory region 1323, a user may select the third, higher energy level, or energy level 3, for the earth energy mode, which then may be indicated to other users, as discussed in greater detail above. Finally, by selecting sensory region 1324, a user may select the fourth, highest energy level, or energy level 4, for the earth energy mode, which then may be indicated to other users, as discussed in greater detail above.

As another example, in some embodiments, all of the sensory regions of the ring finger of glove 1356 may relate to the energy mode "water," as discussed in greater detail above. By selecting the most distal sensory region of the finger (in the case of the index finger, sensory region 1325) a user may indicate that his or her energy level is at the lowest possible setting, or energy level 1, for the water energy mode, which then may be indicated to other users, as discussed in greater detail above. By selecting sensory region 1326, a user may select the second, higher energy level, or energy level 2, for the water energy mode, which then may be indicated to other users, as discussed in greater detail above. By selecting sensory region 1327, a user may select the third, higher energy level, or energy level 3, for the water energy mode, which then may be indicated to other users, as discussed in greater detail above. Finally, by selecting sensory region 1328, a user may select the fourth, highest energy level, or energy level 4, for the water energy mode, which then may be indicated to other users, as discussed in greater detail above.

As another example, in some embodiments, all of the sensory regions of the ring finger of glove 1356 may relate to the energy mode "wind," as discussed in greater detail above. By selecting the most distal sensory region of the finger (in the case of the index finger, sensory region 1329) a user may indicate that his or her energy level is at the lowest possible setting, or energy level 1, for the wind energy mode, which then may be indicated to other users, as discussed in greater detail above. By selecting sensory region 1331, a user may select the second, higher energy level, or energy level 2, for the wind energy mode, which then may be indicated to other users, as discussed in greater detail above. By selecting sensory region 1333, a user may select the third, higher energy level, or energy level 3, for the wind energy mode, which then may be indicated to other users, as discussed in greater detail above. Finally, by selecting sensory region 1335, a user may select the fourth, highest energy level, or energy level 4, for the wind energy mode, which then may be indicated to other users, as discussed in greater detail above.

A user may cancel, or select different energy levels, for the various energy modes by selecting a new energy level, of any of the energy modes, in some embodiments, by actuating any of the several sensory regions set forth for left-hand glove 1356.

Figure 14:
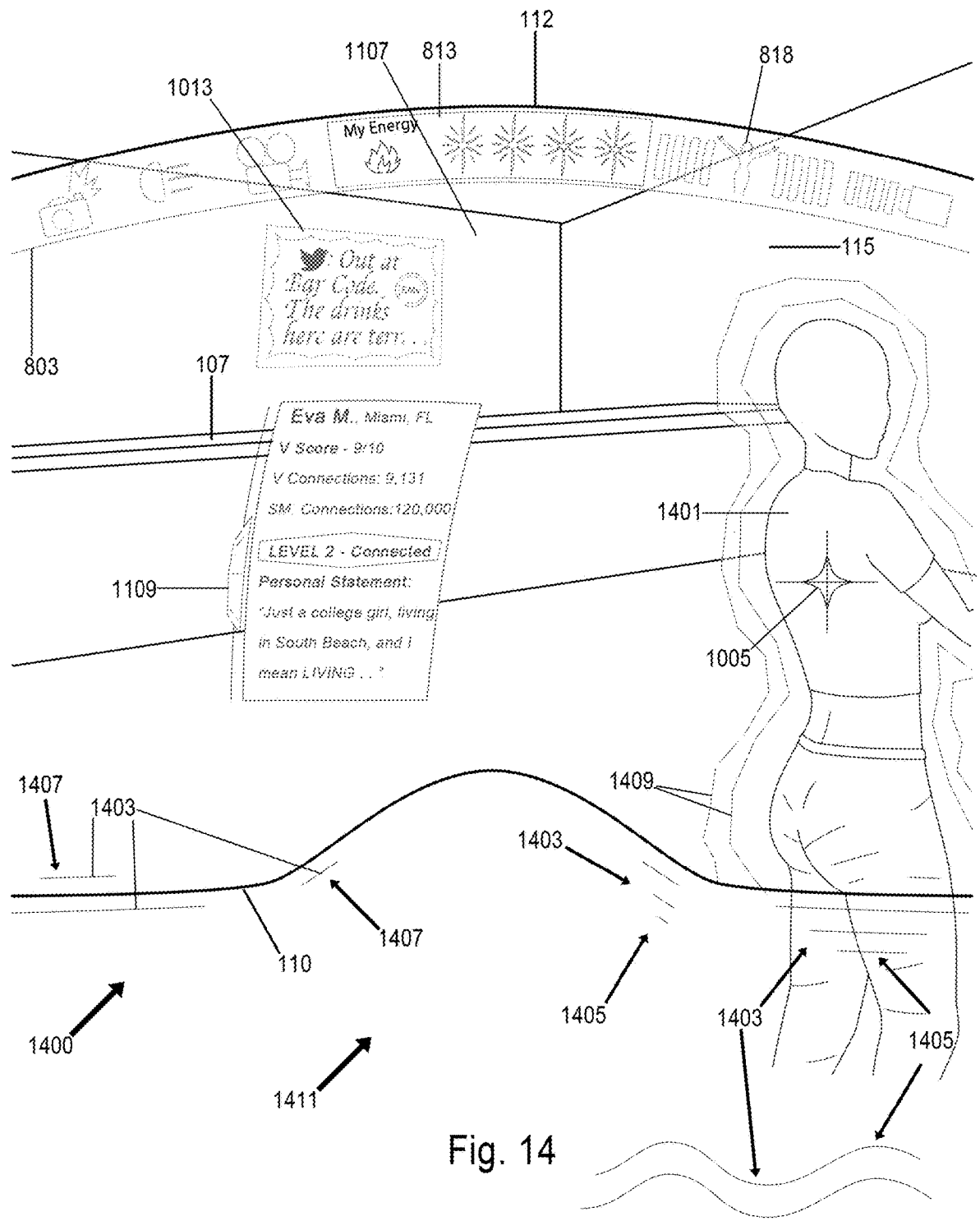
FIG. 14 depicts an example implementation environment, similar to the environments set forth in FIGS. 1, 5 and 8-11 above, along with additional GUI aspects, according to some embodiments of the present invention.

FIG. 14 depicts an example implementation environment 1400, similar to the environments set forth in FIGS. 1, 5 and 8-11 above, along with additional GUI aspects, according to some embodiments of the present invention. In environment 1400, girl 101 has recently departed, and is no longer visible to the user, or augmented with any virtual objects, by the user's glasses 110. According to some embodiments, virtual objects related to girl 101, or the user's interaction with girl 101 (such as social media augmentations 1003, profile 1007 and micro blog post fragment 1013) some of which had been placed near her, may begin to visibly fade after she has departed. In some embodiments, such a visible fading effect may begin to be applied by the AR system and its 3D display (such as glasses 110) by reducing the opacity and/or brightness of those virtual objects. In some embodiments, such a fading effect may begin to be applied by a computer hardware and software control system of the AR system after a delay—meaning that, after a time period has elapsed after girl 101 has departed from the user's view or otherwise disengaged with the user. In some embodiments, after another time threshold, which is preferably longer than that delay, the virtual objects related to girl 101 may completely disappear, meaning that the representation of them is no longer manifested by the display of the AR system at some later time, as shown in FIG. 15, discussed below.

Within environment 1400, a new girl 1401 has appeared, at the right edge of the user's field of vision, and visible partially through glasses 101. In accordance with other aspects of the invention set forth above, the user has moved floater tool location indicator 1005, such that virtual object and tool appears to the user to hover over girl 1401. For example, in some embodiments, the user may have gazed at girl 101, leading eye-tracking aspects of the invention to cause floater tool location indicator 1005 and reticle 1017 to appear to be overlaid onto girl 1401. In some embodiments, as discussed above, the user may indicate that he or she wishes to engage with girl 1401, and/or gain data access and/or other permissions from girl 1401.

As mentioned above, in some embodiments, the AR system may determine, using specialized computer hardware and software, that certain data related to girl 1401 is similar to, or otherwise relevant to data related to the user. If so, in some embodiments, such a determination may lead to specialized feedback, instantly relaying such relationships to the user. For example, in some embodiments, the AR system includes a body suit (such as the body suits discussed above) worn by the user. In some embodiments, such a body suit includes specialized actuators for generating a variety of different vibrations, or other specialized haptic feedback. In some such embodiments, those specialized actuators may be located at a variety of locations along the user's body, and, by activating some of those actuators, located closest to girl 1401, more strongly than others, the location of the other user, as well as the fact that there is related data from the other user, may be indicated to the user. Thus, as shown in the figure, vibration lines 1403 illustrate such haptic feedback for the user related to girl 1401. Some of those vibrations, which are closer to girl 1401, such as those shown by proximate vibration lines 1405, are stronger, or more numerous or otherwise more intense than others, such as more distant vibration lines 1407, in some embodiments. In some embodiments, users' proximity alter the appearance of users to one another. As mentioned above, any such haptic feedback may be of a certain kind, such as a pattern, of vibration or other characteristics uniquely indicating the relationship between the user's data and the data of girl 1401. For example, in some embodiments, such vibrations or waves may be provided as a visual virtual object and/or haptic virtual object, being experienced as vibrations in the space surrounding the user viewing the scene and AR environment, which appear, are felt, or are otherwise sensed as being received from, and emanating from, girl 1401 and the vibration lines surrounding her (or an aura surrounding her, as set forth in greater detail below). In some such embodiments, such haptic virtual object is dynamic, itself moving in waves of pressure, with particular waveforms, which are felt and experienced by the user. In some embodiments, particular characteristics of such a waveform may indicate a degree of compatibility between the user and girl 1401 (e.g., similar user settings, inferred likes and dislikes, and commonality of experiences, as recorded by the control system). For example, in some embodiments, a greater degree of compatibility may result in a higher frequency, lower periodicity, and or higher amplitude and energy, of such waveforms. In some embodiments, the V-Score of the user or V-Score of girl 1401 may affect characteristics of the haptic feedback. In other embodiments, other specialized feedback may indicate the relationship between the user's data and the data of girl 1401. For example, an enhanced aura effect 1409 is shown overlaid onto or about girl 1401, within the user's field of vision, as a virtual object created by glasses 101. In comparison to other aura virtual objects, such as 823, discussed above, aura effect 1409 is multi-layered, and/or more intense, differently colored or filtered, or otherwise altered or enhanced in a unique, infinitely variable way, indicating the unique relationship between user's data and the data of girl 1401. In some embodiments, the enhanced aura effect, or other indicators, may also indicate girl 1401's unique energy level(s), energy type(s), or other personal traits and data, as discussed above. Similarly, the tools within dashboard 803 may also relay some or all of those data. For example, engaged user's energy level indicator 818 now indicates a higher level energy for girl 1401, than was previously shown for girl 101. Of course, the user's energy type, level and the unique relationship between user's data and the data of girl 1401 may, likewise, by indicated to girl 1401, if she has chosen to share such information, for example, by granting a particular level access to the user, as discussed above. Although the example of 3D virtual objects, overlaid onto real world objects, have been provided, it should be understood that, in some embodiments, which may be in addition to or alternative to those virtual object embodiments, statistical, mathematical, or other data may be presented in more conventional formats (e.g., as a table or graph, provided within view of the user by a display.)

Figure 15:
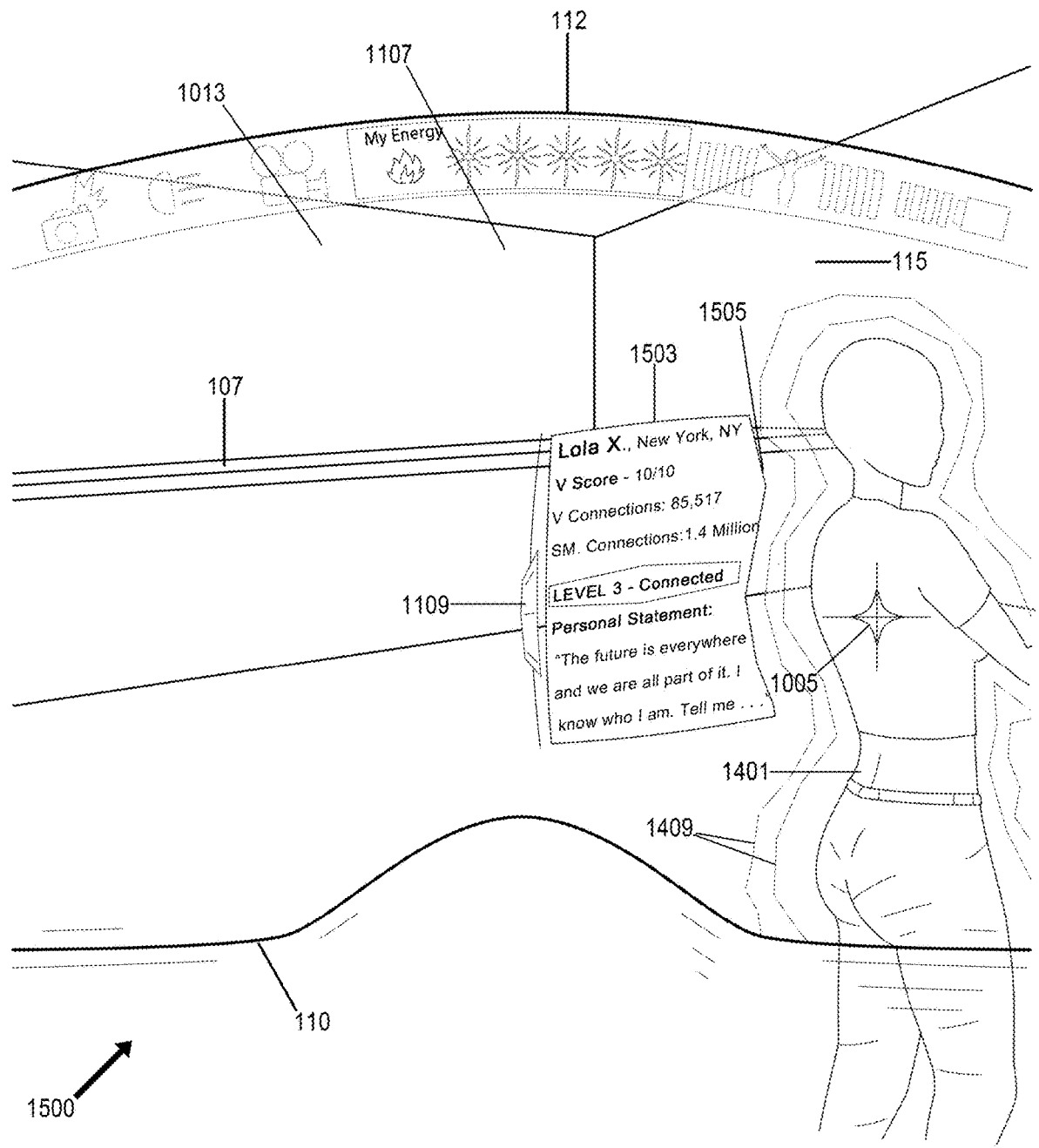
FIG. 15 depicts an example implementation environment, similar to the environment set forth in FIG. 14 above, along with additional GUI aspects, according to some embodiments of the present invention.

FIG. 15 depicts an example implementation environment 1500, similar to the environment set forth in FIG. 14 above, along with additional GUI aspects, according to some embodiments of the present invention. As with girl 101, previously, a social media augmentation 1503 related to girl 1401 has been created by the AR system and placed alongside girl 1401. Social media augmentation 1503 is a different social media augmentation than that discussed previously, which was related to girl 101. Instead, social media augmentation 1503 now depicts data related to girl 1401 which she has elected to share with the user (or, in some embodiments, with all users, or all user's of a group to which the user belongs). In some embodiments, the AR system places the social media augmentation 1503 over part of, or enhances the appearance of, girl 1401. In some embodiments, the AR system alters the appearance of the social media augmentation 1503 to conform to contours or other physical or other characteristics of girl 1401, or other virtual objects, as shown by matching conformational border 1505 of social media augmentation 1503.

Figure 16:
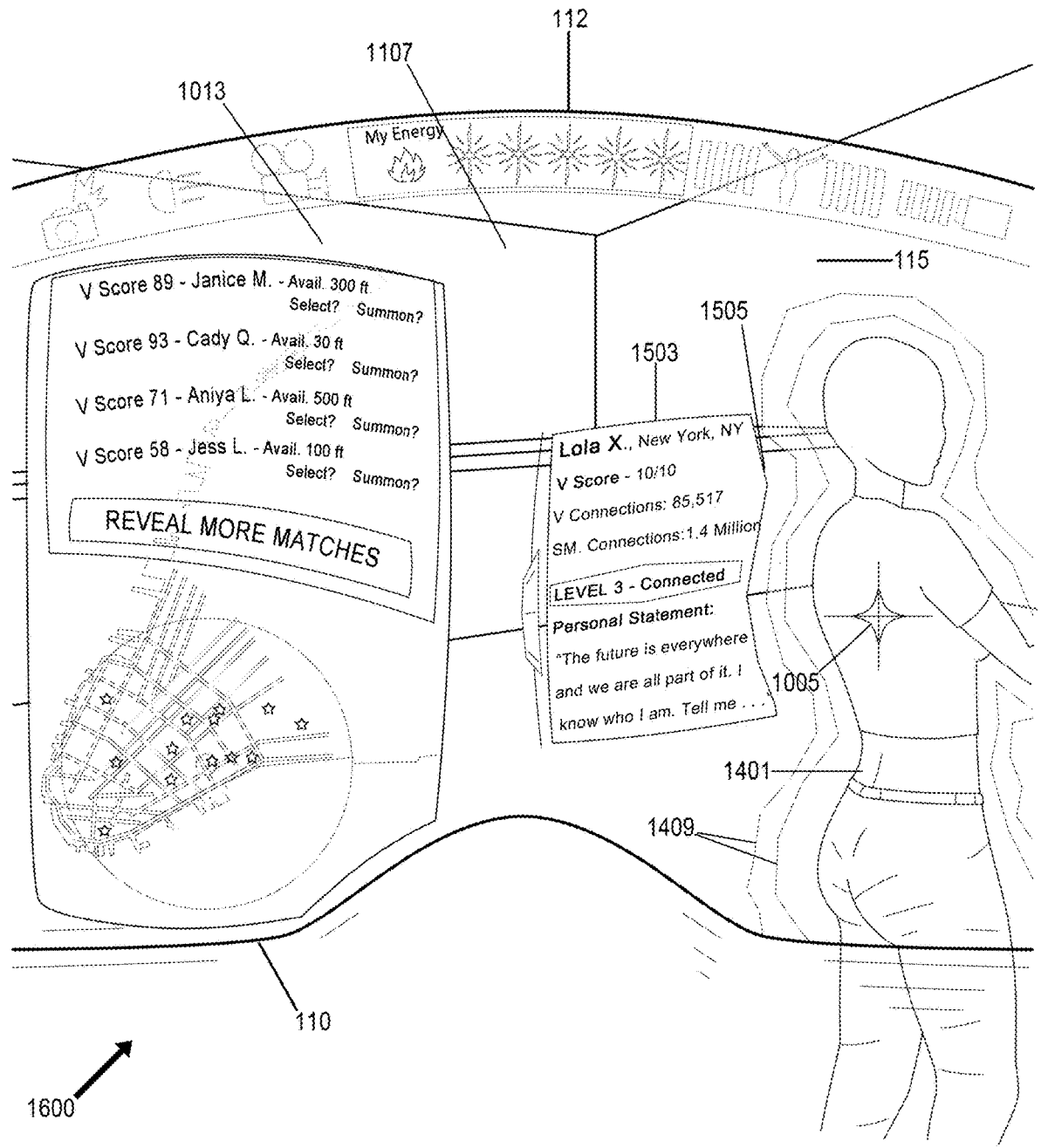
FIG. 16 depicts an example implementation environment, similar to the environment set forth in FIGS. 14 and 15 above, along with additional GUI aspects, according to some embodiments of the present invention.

FIG. 16 depicts an example implementation environment 1600, similar to the environment set forth in FIGS. 14 and 15 above, along with additional GUI aspects, according to some embodiments of the present invention. More particularly, FIG. 16 depicts a new split view display tool, featuring a takeover sub-screen 1603, which substantially blocks the user's left-hand side of his field of vision. In some embodiments, the user may cause the AR system to overlay such a sub-screen 1603, to provide views of new tools or environments. For example, in some embodiments, a map tool may be presented within sub-screen 1603 (as pictured). In such a map tool, the user may be presented with location indicators 1605 of nearby users with which the user's data is determined to be similar or otherwise compatible. In some embodiments, a list 1607 of such users, along with key data 1609 may also be presented within sub-screen 1603. In some embodiments, the user may select any of such listed other users, request to engage with them, meet with them, or even request that they come closer, using various selectable GUI options 1611.

In other embodiments, another user may share his or her view with the first user, which a user may then view through sub-screen 1603. However, in some embodiments, if a first user shares his or her view of an environment (which may be an actual environment, virtual environment, or a blend of both types of environments) with a second user, and if the second user has elected to view the shared view, the shared view may entirely take over the second user's field of vision. In some embodiments, the second user may toggle between such different views, as alternative options, using GUI controls of the AR system.

Figure 17:
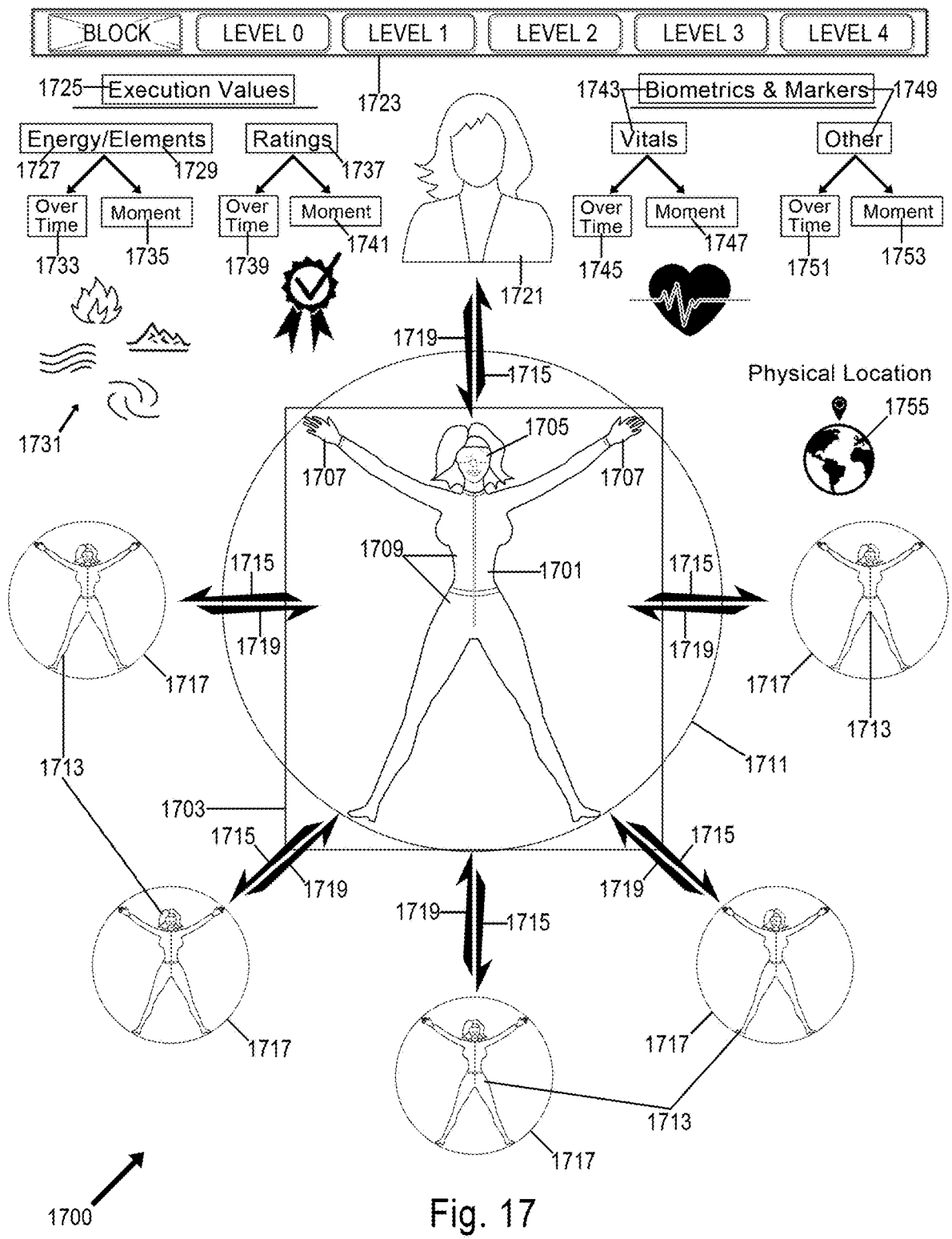
FIG. 17 is a schematic diagram of some aspects of an example implementation of the present invention within an environment, in accordance with aspects of the present invention.

FIG. 17 is a schematic diagram of some aspects of an example implementation 1700 of the present invention within an environment, in accordance with aspects of the present invention. Some of the aspects of example implementation 1700 are discussed in greater detail elsewhere in the present application. The present figure is intended to provide a higher-level overview of some example aspects of the invention, in addition to presenting some new aspects of the invention, to aid in understanding the present invention. The present figure does not, and is not intended to, limit the scope of the present invention, and does not list or include every possible aspect, or embodiment of the invention, many of which aspects or embodiments would be apparent to those of ordinary skill in the art upon reviewing the present application. In fact, after reading the description herein, it will be apparent to one skilled in the relevant art(s) how to implement aspects set forth in following example embodiments in alternative embodiments.

Implementation 1700 includes an example user 1701, wearing various peripheral hardware, which may be connected with and/or controlled by a control system 1703 (which may be a control system such as the example control system set forth above, in reference to FIG. 7), implementing aspects of the present invention. As discussed in greater detail above, such peripheral hardware may include a specialized AR and/or VR headset, such as example headset 1705 (which may be a headset such as glasses 109, 110, and 201, set forth above, in reference to FIG. 1 et seq.), hand controls, such as example hand controls 1707 (which may be any set of example hand controls set forth in this application, such as example hand controls 301/gloves 303, example hand controls 723 or example hand controls 1301/gloves 1353 set forth above, in FIGS. 3, 7 and 13), a body suit, such as example body suit 1709 (which may be any body suit discussed in this application, such as example body suit 113 or example body suit 719, set forth above in FIG. 1 et seq., above), and any other hardware set forth in this application for generating and receiving input from a user, generating and receiving feedback, and carrying out any other aspects of the invention set forth in this application.

As mentioned above, in some embodiments, a user may share his or her experience of a 3D environment, whether a real environment, virtual environment, augmented environment, or any combination thereof, with other users. The 3D environment experienced is symbolized by surrounding environment circle 1711. The act of sharing that environment with other users, such as example other users 1713, is symbolized by outward connection arrows 1715. As a result, each other user 1713 may experience the same 3D environment, as selected for such sharing by user 1701. Similar surrounding environment circles 1717, are pictured about each such other user 1713, and symbolize the 3D environment experienced by each such other user 1713 with the aid of control system 1703, which may generate a 3D simulation of the same 3D environment shared by user 1701. In some embodiments, each such other user may, similarly, share their own 3D environments, as experienced and/or stored by those other users, and as symbolized by returning connection arrows 1719. As explained in greater detail elsewhere in this application, 3D environments may be scanned and stored by the control system, and summoned and presented on specialized hardware, such as headset 1705 and body suit 1709.

As discussed in greater detail elsewhere in this application, in some embodiments, users may grant other users a plurality of data access and permission levels, of escalating degrees. As also discussed elsewhere in this application, in some embodiments, that level of access and permissions may impact a 3D experience of a user. For example, in some embodiments, a control system carrying out aspects of the present invention, such as control system 1703, alters the appearance of an avatar, such as example avatar 1721 (which may be generated for interaction with, or which may represent, user 1701), or other virtual object(s) for a user, transforming a AR or VR environment experienced by the user and/or other user(s), who can then view and interact with avatar 1721, or that other virtual object(s). In some embodiments, such a control system otherwise alters the experience of a 3D object. For example, in some such embodiments, the control system may alter the way a 3D object feels, using haptic feedback, as discussed elsewhere in this application, based on that level of access and permissions. A representation of an example set of those available levels of access and permissions is represented by array of options 1723, at the top of FIG. 17.

As also discussed elsewhere in this application, other factors determined by the control system may impact users' experiences of an AR or VR environment, in some embodiments. In some embodiments, the control system may alter the 3D environment based on particular values related to the user's voluntary interaction with the control system, which may be termed Execution Values 1725. For example, in some embodiments, as discussed above, the control system may alter the appearance of an avatar or other virtual object based on a determination of a user's emotional or physical energy level 1727. In some embodiments, as discussed above, the control system may alter the appearance of an avatar or other virtual object based on a determination of a user's type of physical or emotional energy 1729, such as any of the energy modes, discussed elsewhere in this application, which may be self-identified, or determined by the control system by tracking the users interactions, biometrics, and other factors, in various embodiments. As discussed elsewhere in this application, in some such embodiments, a user may select an icon or another expression of his or her energy type (such as an energy mode) through a GUI created by the control system. In some embodiments, a user may select an energy level (e.g., on scaled of 1 to 10, 10 being the highest possible energy level) through a GUI created by the control system. For example, in some embodiments, such icons representing energy types may be represented by elements of the Earth or Universe, as shown by example personal energy icon set 1731. In some embodiments, a user's history of such energy levels and types, recorded by the control system over time, 1733, may distinctly impact the appearance of an avatar or another virtual object generated by the control system. In some such embodiments, such an avatar or another virtual object may be associated with that user, for example, by appearing in close proximity to that user or with other user-identifying characteristics. In some embodiments, such energy levels and types in the present moment 1735, may be monitored by the control system, which distinctly impacts the appearance of an avatar or another virtual object generated by the control system. As also discussed elsewhere in this application, a control system carrying out aspects of the present invention may also alter the appearance of avatars and virtual objects based on a user's activity with the control system, and software run by the control system. For example, in some embodiments, a unique algorithm is applied to data related to a user managed by the control system. In some embodiments, these data include multiple factors related to the user, which factors are discussed in greater detail elsewhere in this application. In some embodiments, such an algorithm generates rating(s) 1737 for that user, which, when applied to multiple such factors, as discussed in this application, may be termed a "V-Score" or "V-Scores." In some embodiments, a user's V-Score may distinctly impact the appearance of an avatar or other virtual object associated with that user to reflect that rating. In some embodiments, a user's history of such ratings, factors, data and/or V-Scores, recorded by the control system over time, 1739, may distinctly impact the appearance of an avatar or another virtual object generated by the control system. In some embodiments, such ratings, factors, data and/or V-Scores in the present moment, 1741, may distinctly impact the appearance of an avatar or another virtual object generated by the control system.

As discussed elsewhere in this application, the control system may alter the 3D environment for user(s) based on data and other factors such as a user(s) biometrics and other markers of the user(s)' state 1743. For example, in some embodiments a user's vital signs are monitored and recorded by the control system, and the control system alters the appearance of an avatar or other virtual object based on those particular vital signs. In some such embodiments, a user's history of such vital signs, recorded by the control system over time, 1745, may distinctly impact the appearance of an avatar or another virtual object generated by the control system. In some embodiments, such vital signs in the present moment, 1747, may distinctly impact the appearance of an avatar or another virtual object generated by the control system. In some embodiments, a user's body language (e.g., body postures) or other markers of his or her state 1749, may be monitored and recorded by the control system as a factor, and the control system alters the appearance of an avatar or other virtual object based on that particular body language or other markers of his or her state 1749. In some such embodiments, a user's history of such body language or other markers of his or her state 1749, recorded by the control system over time, 1751, may distinctly impact the appearance of an avatar or another virtual object generated by the control system. In some embodiments, such body language or other markers of his or her state 1749 in the present moment, 1753, may distinctly impact the appearance of an avatar or another virtual object generated by the control system. More generally, in some embodiments, any data relating to a user may be a factor impacting a V-Score, in some embodiments. In some embodiments, any data relating to a user may be such a factor, and alter the appearance of a virtual object to the user and/or other users. As one more example, in some embodiments, data related to a user's connections maintained or recorded by the control system may be such a factor, and alters the user's appearance to other users. As one more example, in some embodiments, data related to a user's connections with other persons (e.g., social media connections) maintained or recorded by the control system may be such a factor, and alters a user's experience of virtual objects generated by the control system. As another example, in some embodiments, data related to the mix of different connections maintained or recorded by the control system may be such a factor, and alters the user's appearance to other users. As one more example, in some embodiments, data related to the mix of different connections maintained or recorded by the control system may be such a factor, and alters a user's experience of virtual objects generated by the control system. As another example, in some embodiments, data related to a level of permissions and data access, as discussed in greater detail above, maintained by the control system may be such a factor, and alters the user's appearance to other users. As one more example, in some embodiments, data related to a level of permissions and data access maintained by the control system may be such a factor, and alters a user's experience of virtual objects generated by the control system. In some embodiments, data related to a user's amount of interactions, and recency of interactions, facilitated by any such connections (e.g., social media activity), discussed above, may be such a factor, and alters the user's appearance to other users. In some embodiments, data related to a user's amount of interactions, and recency of interactions, facilitated by any such connections, discussed above, may be such a factor, and alters a user's experience of virtual objects generated by the control system. In some embodiments, data related to a user's amount of use of a software application, and recency of such application use, may be such a factor, and alters the user's appearance to other users. In some embodiments, data related to a user's amount of use of a software application, and recency of such application use, may be such a factor, and alters a user's experience of virtual objects generated by the control system.

As mentioned above, among other additional functions of the control system, the control system may track the physical location of users, at the present moment. For example, in some embodiments, location-tracking hardware, such as a fob or other hardware held by or about a user which includes GPS hardware, may be included in the control system, or connected for communications with, the control system. Another of other functions of the control system may be conditioned on such user location information. This location tracking function is illustrated by location tracking icon 1755.

Figure 18:
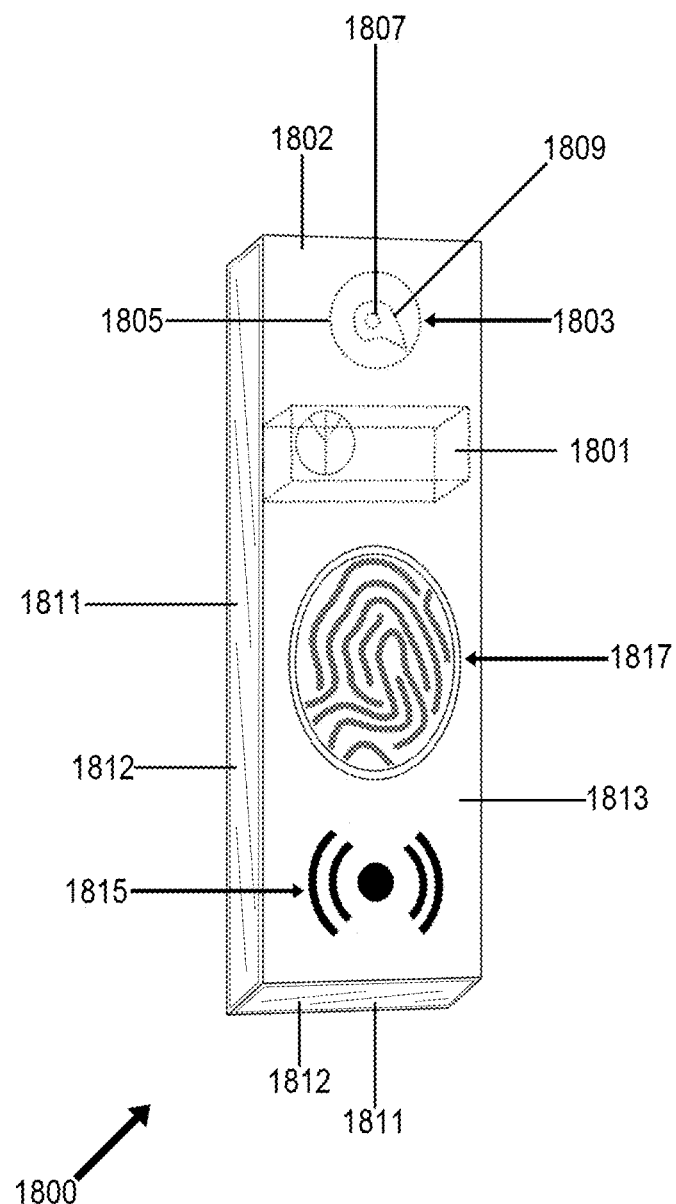
FIG. 18 depicts example visual, haptic and other user communications hardware implementing some example aspects of the present invention.

FIG. 18 depicts example visual, haptic and other user communications hardware—more specifically, a portable fob 1800—implementing some example aspects of the present invention. Among other things, fob 1800 is equipped to issue haptic and visual feedback, enhancing an environment, while communicating to users. For example, in some embodiments, fob 1800 identifies a particular user (e.g., the user carrying it, and authorized by a control system controlling fob 1800), and may issue visual and haptic feedback to the user and other users regarding relevant information related to the user identified by fob 1800. For example, in some embodiments, fob 1800 may reflect levels of access (as discussed in greater detail above) or other permissions granted to and by that user. In some embodiments, fob 1800 may reflect biometrics, body language or other data relevant to that user. In some embodiments, the user's energy level may be assessed, and reflected in feedback generated by fob 1800. For example, in some embodiments, fob 1800 may glow and/or vibrate more strongly when his or her energy level, or use of hardware and software, has been determined to be at a higher level.

As mentioned above, fob 1800 may comprise visual, haptic or other perceptible feedback-generating hardware. Any possible combination of hardware suitable for generating perceptible feedback may be used, and the particular array of such hardware pictured is an example only. It will be apparent to one skilled in the relevant art(s) how to implement the following example embodiments in alternative embodiments.

Fob 1800 is pictured as comprising a local control system 1801, which may be, or may be connected for communications with, and controlled by, a control system such as the example control system provided in reference to FIG. 7 above. In some embodiments, local control system 1801 includes password-protected data storage device(s), and encrypted databases, protecting all personal and/or sensitive data (e.g., the user's biometrics) held therein. Local control system 1801 may be connected for communications with, power and control any other hardware set forth immediately below, if present within a particular embodiment. Local control system 1801 and any of the hardware set forth below, may be provided within, on, or about a case 1802, which may provide a structural scaffold for, and protect, any and all such hardware, in some embodiments. Although not pictured separately, it should be understood that local control system 1801 may include, or may be connected with, a source of power, such as a battery, and/or a wireless power receiving device, in some embodiments.

In some embodiments, portable fob 1801 includes haptic feedback hardware 1803. Haptic feedback hardware 1803 may be an electronic actuator, comprising a rotary motor 1805, with an axel 1807 attached to an unbalanced flywheel 1809. By delivering different levels and patterns of power to haptic feedback hardware 1803, e.g., through electronic connections (not pictured, for simplicity) different types and intensities of haptic feedback can be delivered to a user. In some embodiments, particular patterns of haptic feedback may be issued by the local control system to indicate different information related to the user, as discussed above.

In some embodiments, portable fob 1801 includes visual feedback hardware, such as electric lights 1811. In some embodiments, electric lights 1811 are body panels 1812, as pictured, meaning that they form part of the structure of case 1802. In such embodiments, such panels may line, or substantially line, all of the outer surface 1813 of fob 1801. In some embodiments, body panels 1812 may each comprise a set of lights or pixels. For example, in some embodiments, body panels 1812 each comprise an array of pixels, each of which may be separately controlled by control system 1801. In such embodiments, and depending on the array of lights or pixels and patterns generated thereby, a wide array of distinctive visual feedback can be generated. By delivering different levels and patterns of power to body panels 1812, e.g., through electronic connections (not pictured, for simplicity) different types and intensities of visual feedback can be delivered to a user. In some embodiments, different colors of light may be issued by the local control system to indicate different information related to the user, as discussed above. In some embodiments, different shapes or patterns may be displayed by the local control system to indicate different information related to the user, as discussed above. In some embodiments, particular changes in patterns of visual feedback may be issued by the local control system over time to indicate different information related to the user, as discussed above. In some embodiments, some or all of a user's private or sensitive data held within databases of the local control system 1801 may, instead or in addition, be stored on a remote server computer system. For example, in some embodiments, such data is stored via a smart contract on a blockchain, recorded, at least in part, on such a remote server, networked for communications with the local control system 1801. In some embodiments, monetary credits, or a non-fiat currency or point system (e.g., a user's "stars" as defined in this application, and/or blockchain tokens) are so recorded on a remotely maintained blockchain. In such embodiments, a private key of a public/private cryptographic key pair may reside, exclusively, within such a fob, within a digital wallet maintained within the local control system.

As mentioned above, in some embodiments, portable fob 1800 may be powered wirelessly. To aid in receiving wirelessly transmitted power, and converting that wirelessly transmitted power to electrical power (to run control system 1801, and/or other hardware described above) a wireless power receiver and converter 1815 may be provided in some embodiments.

To aid in identifying the particular user about whom relevant information will be generated by portable fob 1800, a biometric scanning device, such as fingerprint reader 1817, may be included, in some embodiments. By scanning a user's finger, the local control system may generated a biometric challenge to authenticate the user which, if passed, permits generation of information related to that particular user, as discussed above, in some embodiments. In some embodiments, fob 1800 has additional features, not pictured in the figure. For example, in some embodiments, fob 1800 may indicate a user's V-Score, or some form of it, for example, on a display screen (e.g., a foldable display screen). For example, in some embodiments, a V-Score is provided as a level of "coins," with a count of a number of coins being provided to the user, or other users, as feedback. In some embodiments, a greater number of coins indicates a greater level of activity, or a greater quality of activity, on the part of the user to which the coins relate. In some embodiments, the user will begin to lose coins after some threshold time of inactivity, or after a decrease in his V-Score. In some embodiments, if the user interacts with another user with a higher number of coins, coins may be gained by the user at a higher rate than from interaction with another user with a lower amount of coins. As with measures of energy levels for users, discussed above, in some embodiments, coins will be lost over time if the user does not engage with the control system or interact in a 3D environment at a particular threshold activity level, or quality level, in some embodiments.

It should be noted that, it is within the scope of the invention that a user may use the system in a "single user" mode, in which connections and interactions with other users are not managed or facilitated by the control system, in some embodiments. In some such embodiments, virtual objects and other aspects of an VR or AR environment are created and altered by the control system based solely on the user's interactions with the control system.

It should also be noted that, generally speaking, any part or other aspect of a system for computer-generated experiences set forth in this application may be combined with any other aspect set forth in this application. Any such combination is within the scope of the present invention.

Figure 19:
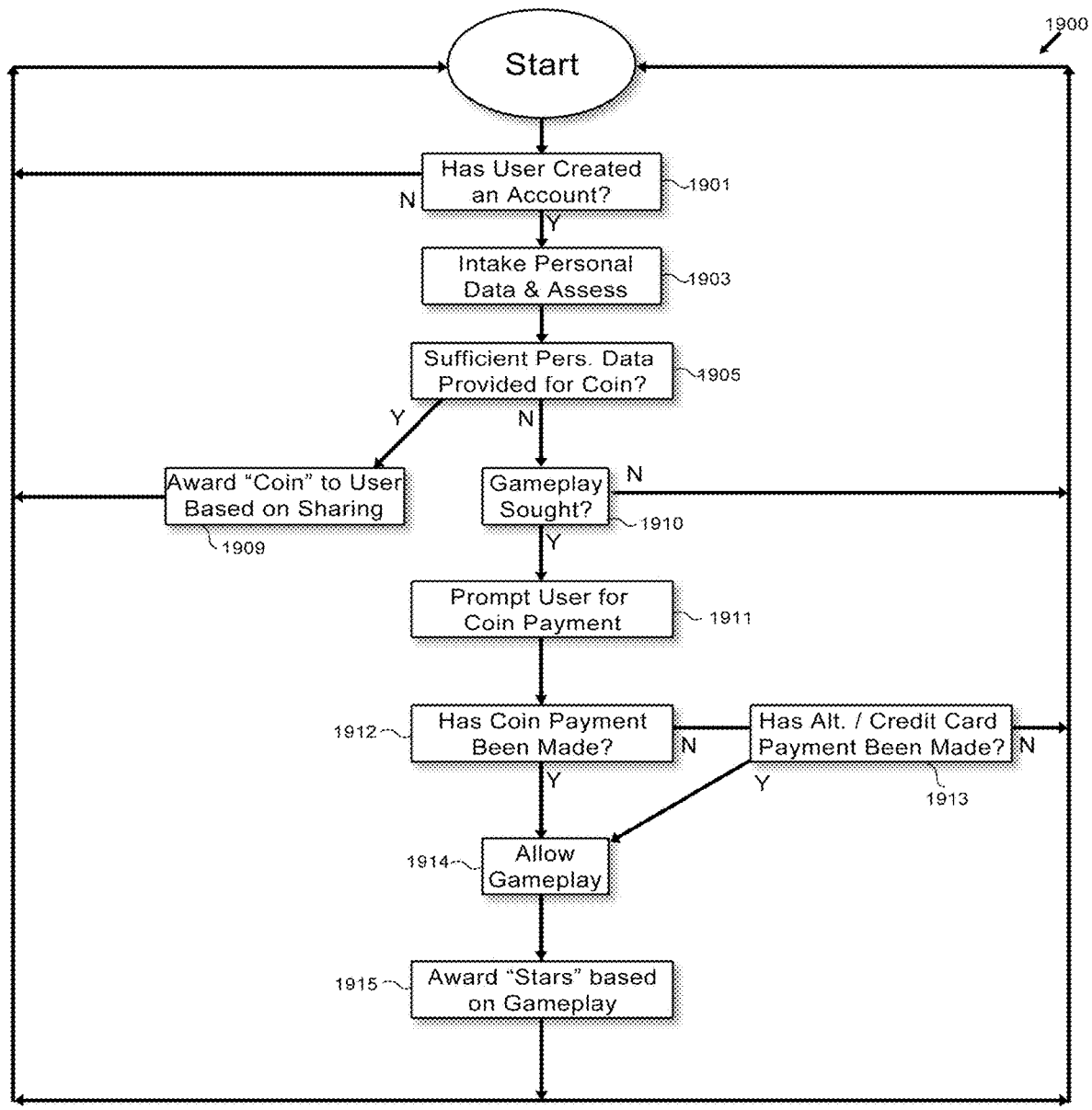
FIG. 19 is a process flow diagram, setting forth several example steps that may be undertaken by a control system (such as the example control system set forth above, in reference to FIG. 7) according to some embodiments of the present invention.

FIG. 19 is a process flow diagram, setting forth several example steps 1900 that may be undertaken by a control system (such as the example control system set forth above, in reference to FIG. 7) according to some embodiments of the present invention. Beginning with step 1901, the control system may start and determine whether a user of the AR system has created an account managed by the control system, and within the AR system. In some embodiments, as with other accounts managed by computer system managed multi-player games, and social media applications, creating and setting up this account may involve a process of creating a personal profile for the user, adopting a username and/or avatar, and providing other personal information, as discussed elsewhere in this application. In some embodiments, this process may make the providing and/or sharing of such personal information voluntary, meaning that a user may still create an account, and use some aspects of the AR system, without so providing personal information, or any particular type or amount of personal information, or sharing such personal information, or any particular type or amount of personal information with other users. However, as will be discussed in greater detail below, the control system may alter the user's access to particular features and sub-applications, in some embodiments, based on the amount and type of personal information sharing by the user. In some embodiments, the control system creates or assesses a rating (i.e., a "data sharing rating") or a ("coin rating"), based at least in part on an algorithm factoring in the amount and type of such data sharing. In some embodiments, the higher the amount, or the more personally accurate and tailored and/or useful the personal information and information type shared and stored as data by the control system, the higher the user's data sharing rating created and/or assessed by the control system, in step 1903. This creation or assessment of a data sharing rating may be standardized into units (e.g., "Coins," or another form of virtual currency) in some embodiments, which the control system allows the user to spend those units to access other facilities and aspects of the AR system. In addition, in some embodiments, such a data sharing rating, if at high enough particular levels, may lead to alterations in the appearance or other experience of the AR system, or the user's appearance or the experience of the user by other users, through the AR system.

Thus, in step 1905, the control system assesses a level or unit (e.g., "Coin") of a rating ("a coin rating"), based, at least in part, on whether the user has engaged in a sufficient amount and type of personal information sharing, with the AR system, and/or with other users, for that level or amount of Coin(s) (and, in some embodiments, an amount of time a user has spent in gameplay, which is also positively associated with awarding more or higher value Coin(s) by an algorithm implemented by the control system). If so, the control system next provides such a level of Coin(s) to the user's account in step 1909, which the user then has the ability to spend to access certain facilities and features of the AR system, in some embodiments. For example, in step 1910, the control system may next determine whether the user wishes to engage in a multiplayer game managed by the control system, and involving a specialized AR environment for gameplay. For example, in some embodiments, a user may attempt to select a GUI option to initiate such gameplay, which the control system provides, under certain pre-requisite conditions, as set forth further below. In some embodiments, an intermediate credit or score, such as the "stars" non-fiat currency, discussed in this application, is first awarded to such a user, and based on the same factors discussed above, e.g., with higher levels of personal data, leading to higher amounts of "stars" awarded. In some such embodiments, such stars may be, or are then redeemed for, such Coin(s), and, in some embodiments, at the user's election, e.g., by designating such in a user preference setting of the system.

As mentioned above, in some embodiments, a wide variety of types of personal information may be gathered by the control system, represented and stored as data by the control system, and/or shared with other users, any of which types of information may be applied by the control system to create a coin rating based thereon. For example, in some embodiments, a user ID may be created, identifying the user to other users, and identifying the users account. As another example, in some embodiments, a user profile may be created, including additional user-identifying information, such as a geographic location, residence address, marital status, occupation, family details, academic background information, work and skills information, hobbies and interests. As another example, in some embodiments, a user may provide information related to his or her other social media applications and profiles he or she manages on other social media platforms, other than the AR system (e.g., on the LINKEDIN, FACEBOOK, TINDER web or mobile social media applications). In some such embodiments, the AR system and control system comprising it, or comprised within it, manage inputs to one or more of the user's other social media accounts. As another example, in some embodiments, biometric and/or medically-related information relating to the user may be recorded (whether identifying or health and current status related). As another example, in some embodiments, a user may provide personal statements and other representative expressions related to the user's identity. As another example, in some embodiments, a user may provide culturally-related information regarding themselves. As another example, in some embodiments, a user may provide religion-related information regarding themselves. As another example, in some embodiments, a user may provide information relating to devices he or she has connected to the AR system. In some embodiments, the control system records such types of personal information (and/or in some other embodiments, other information) based on where that type of information falls on a spectrum of varying levels of some attribute of the personal information. For example, in some embodiments, such a spectrum ranges from more qualitative information, on the one hand, and more quantitative information, on the other hand. In some such embodiments, the control system determines a proportion of that type of information (e.g., by relative data storage size) that is qualitative in nature and a proportion of that type of information (e.g., by relative data storage size) that is quantitative in nature, and creates a ratio(s) based on one (or both) of those proportions to determine whether that data is more qualitative and more quantitative than other types of information, creating such a spectrum. In some embodiments, such a spectrum may be applied to any form of personal information intentionally recorded by the user (e.g., by executing selections from a GUI menu, and directly entering data. In some embodiments, such a spectrum may be applied to any other form of personal information. For example, in some embodiments, the user's interaction with the AR system, the user's behaviors relative to other users (proximate to the user in real or AR or VR environment) and other indirect or inferred personal data recording may be made during "gameplay" with the AR system, meaning as that the user is interacting with an AR game environment created by the control system, as discussed below, and elsewhere in this application.

In some embodiments, prior to allowing the user to access that game, and engage in that gameplay, the control system may accept payment and/or prompt the user for payment, in the form of Coin, in step 1911. In some embodiments, the control system may provide a GUI option for the user to select, and spend a pre-requisite amount of Coin units ("Coins") to access the game and engage in gameplay. In other embodiments, Coins may be spent by the user for gameplay "in the background," meaning that an active GUI is not presented to the user to obtain their express consent to spend Coin. Rather, in some such embodiments, a user is provided with access to the game, and may engage in gameplay, and Coin is deducted from his account based on that access and gameplay without seeking express consent.

However, in some such embodiments, an alert may be presented to the user, informing him that Coin has been deducted and, in some embodiments, the amount of gameplay that spent coin provides him with (e.g., an amount of time, a number of turns or "lives"). In any event, the control system determines whether the prerequisite amount of Coin required to access the game and/or engage in gameplay has been made in step 1912.

If the user does not have the prerequisite amount of Coin required to access the game and/or engage in gameplay, in some embodiments, or does not provide that prerequisite amount of Coin, the control system next prompts the user to provide an alternative form of payment for gameplay, in step 1913. If the user does not provide an alternative form of payment, the control system returns to the starting position.

If so, the user provides the prerequisite amount of Coin required to access the game and/or engage in gameplay, or a sufficient prerequisite alternative form of payment, the control system proceeds to step 1915, in which it provides access to the game and permits (at least some amount) of gameplay by the user.

The control system may then restart, in some embodiments.

In some embodiments, another form of rating is assigned to the user over time, based on that gameplay (a "gameplay rating"). For example, in some embodiments, the control system assigns tiered levels or other units signifying increasing levels of such a rating, based on an increased quality or amount of gameplay by the user. In some embodiments, such a rating is given in units called "Stars." In some embodiments, the name, design or other features of the game may relate to the same unit label, such as "Stars." For example, in some embodiments, the game may be referred to as "STARGATE." In some embodiments, a gameplay rating may be based on one or more qualities of gameplay by the user. For example, in some embodiments, if another user rates the user's gameplay as more positive (e.g., indicating through a GUI that she or he "likes" the user's gameplay) such a gameplay rating may be increased, and vice versa (i.e., if she or he "dislikes" the users gameplay, such a gameplay rating may be decreased). As another example, in some embodiments, at least some such qualities are determined by the control system. For example, in some embodiments, an intensity of interaction, and/or proximity of a user to another user or object, may be serve as a basis for such a quality determination.

As with other ratings and units thereof set forth in this application, gameplay ratings, such as Stars, may also serve as a prerequisite to accessing particular features of the AR system, including, but not limited to, accessing personal data or being granted other access to or permissions related to other users, or groups thereof. Also as with other ratings and units thereof set forth in this application, in some embodiments, such a gameplay rating, if at high enough particular levels, may lead to alterations in the appearance or other experience of the AR system, or the user's appearance or the experience of the user by other users, through the AR system. As also discussed above, such access, permissions, appearance and/or other experience changes may be created according to levels (e.g., any of the levels or types of access authorized between users set forth in this application, some of which may escalate in significance, privacy, sensitivity and/or amount, a.k.a. "breaking walls.") For example, in some embodiments, a user's "Avatar" or appearance to other user's as presented in the AR System improves and becomes more refined and robust over time, according to such escalating levels of access, or an increased V-Score, as set forth below. As another example, awards may be provided to users, and may be visible as unique virtual objects (i.e. "badges") appearing on or about the user's avatar, visible to other users). In some embodiments, "breaking walls" with more other users, may lead to an award of more stars, based on an algorithm implemented within the control system of the AR system. And, as mentioned previously, in some embodiments, users may redeem stars for non-fiat currency termed Coin(s), which may then be used for purchases, using the AR system (e.g., for more gameplay or gameplay options, or to purchase information, e.g., on a marketplace, through the AR system). In some embodiments, a user's "power supply" or amount of remaining gameplay available and/or other resources for gameplay, increase with the user's amount of stars or Coin(s), maintained within her or his account of such non-fiat currencies, by the AR system.

In some embodiments, a personal data rating may be a factor in establishing a V-Score, which is based at least in part on that rating, as described elsewhere in this application. In some embodiments, a gameplay rating may be a factor in establishing a V-Score, which is based at least in part on that rating, as described elsewhere in this application. In some embodiments, the V-Score may also be based on other forms of personal information stored as data by the AR system and control system, such as any of the forms of personal data set forth above. In such embodiments, a V-Score is a more general, all-inclusive rating than other ratings managed by the control system, based, at least in part, on data serving as a basis for other ratings, such as any of the other ratings set forth in this application. Any number of personal data sets, related to attributes determined by the control system to be positive or negative, may positively or negatively affect (accordingly) the users' appearance to others, levels of access to other's personal data, and experience using the AR system, in some embodiments.

In some embodiments, other categories of data may be created, and personal information may be recorded within those categories, impacting various ratings maintained by the control system (such as any of the ratings set forth in this application) accordingly. For example, in some embodiments, the control system records data related to a user based exclusively on one action or event occurring on or about that time. This type of data may be referred to as data recorded "in the moment" or "instantaneously recorded" data. In some such embodiments other data may be determined and recorded based on different data recorded based on a plurality of actions and/or events, over a longer time period (a.k.a. "data recorded over time"). For example, in some embodiments, a user's setting up a user profile or account, and imputing personal information in that process, such as her or his political or religious affiliation, is determined by the control system to be "in the moment" data, and recorded with that designation as metadata. However, as the user engages in any of the uses of an AR system set forth in this application over several hours, days, weeks and years, her or his interaction with the AR system may support other determinations by the control system related to those or other personal data, which is "data recorded over time." In some embodiments, a gameplay rating (e.g., in units such as Stars) is based on such "data recorded over time." Similarly, in some embodiments, a coin rating is based on "in the moment" data.

Although particular forms and types of personal information and data are discussed above, any number of additional forms and types of personal data may be used, while still carrying out aspects of the present invention, as will be readily apparent to those of skill in the art. For example, in some embodiments, such personal data includes or relates to any form of personal beliefs, such as religious or political beliefs and influences (whether Western or Eastern, commonly-held, or individual). As another example, in some embodiments, such personal data relates to cultural factors, such as a user's ethnicity and cultural heritage. As another example, in some embodiments, such personal data includes personal health and relationship related data, such as a user's family or personal relationships, attitudes toward others, personal growth indicators, and financial condition. As another example, in some embodiments, such personal data includes data related to the user's interactions with other users (e.g., through gestures and other "body language" tracked by the AR system). As another example, in some embodiments, such personal data includes data related to the user's interaction with other software applications, tracked by the control system.

It should be noted that the order(s) and number(s) of any of the above steps are non-limiting, and exemplary only of the wide variety of practically unlimited number(s), order(s) and arrangement(s) of method steps falling within the scope of the present invention, as will be readily apparent to those of ordinary skill in the prior art. Similarly, the recited arrangement(s), number(s), and instance(s) of any part(s), feature(s), element(s) or other aspect(s) of the invention set forth in this application are non-limiting and exemplary only of the wide variety of practically unlimited arrangement(s), number(s), and instance(s) of any part(s), feature(s), element(s) falling within the scope of the present invention, as will be readily apparent to those of ordinary skill in the prior art.

Figure 20:
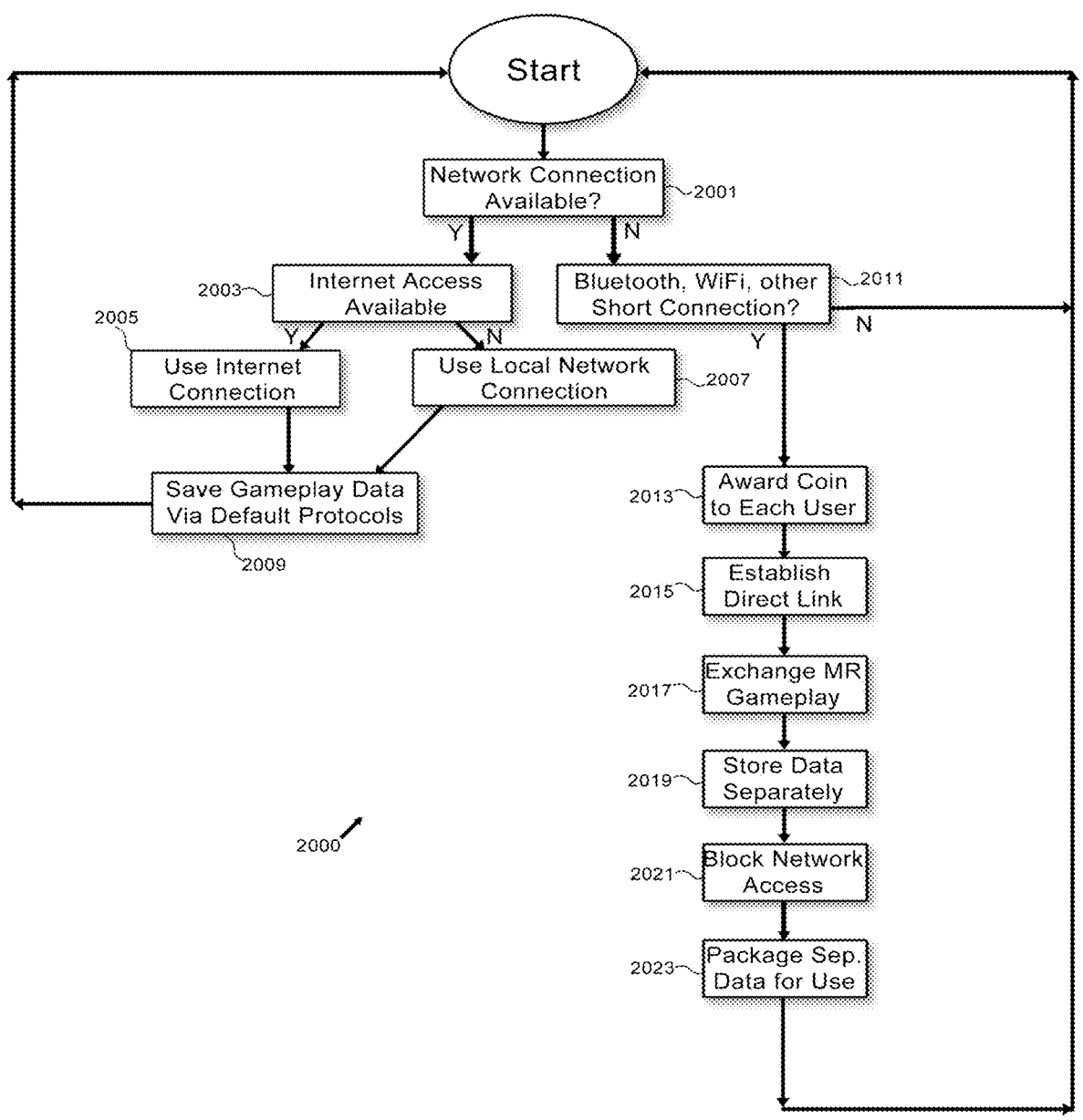
FIG. 20 is a process flow diagram, setting forth several example steps that may be undertaken by a control system (such as the example control system set forth above, in reference to FIG. 7) according to some embodiments of the present invention.

FIG. 20 is a process flow diagram, setting forth several example steps 2000 that may be undertaken by a control system (such as the example control system set forth above, in reference to FIG. 7) according to some embodiments of the present invention.

Beginning with step 2001, the control system may start and determine whether a network connection is available to computer hardware on or about the user which is delivering a VR and/or AR environment to the user, such as any of the computer hardware set forth in the present application for creating and controlling VR and/or AR environments, which may comprise, or be comprised in, the control system, in accordance with aspects of the invention set forth above. If such a network connection is available, the control system may next determine whether a direct connection to an Internet Service Provider may be established (e.g., through a DSL, cable or cellular connection(s)), to cloud-based computers serving at least some aspects of the VR and/or AR environment over the Internet, in step 2003. If so, the control system may utilize that Internet connection to store personal data related to the user, and/or the user's gameplay, onto those cloud-based computers (e.g., servers running computer hardware and software hosting all or part of the VR and/or AR environment), in step 2009. If not, however, the control system may next seek to establish an Intranet, WiFi, or other local area network ("LAN") connection to the Internet through Internet-connected hardware and software running computer hardware and software hosting all or part of the VR and/or AR environment, in step 2007. If so, again, the control system may utilize that Internet connection to store personal data related to the user, and/or the user's gameplay, onto those cloud-based computers, in step 2009.

In some embodiments of the invention, personal data and/or data related to gameplay, as set forth elsewhere in this application, may be stored according to different protocols, depending on the nature of the network or other connection (e.g., Internet-connected LAN vs. direct Bluetooth connection between users' personal hardware devices), and access and usage of those data will differ, based on those protocols.

For example, returning to step 2001, in some embodiments, the control system determines whether it can establish a Bluetooth, WiFi or another short-distance communications connection between two or more users of the VR and/or AR environment (e.g., in some various embodiments, covering 20, 50 or 100 yards distance between the users), without using the Internet, in step 2011. In some embodiments, the control system will only utilize such a short-distance network connection between users, if available, to communicate and store personal data of those users (such as data related to gameplay of those users). In some such embodiments, proceeding to step 2013, the control system may next award or increase a rating to each of those users (e.g., awarding Coins, as discussed elsewhere in this application) based on their use of the short-distance connection, and/or not using the Internet. As noted in step 2015, the control system may establish such a short-distance communications connection, between those users, and create and allow the users to conduct gameplay within a VR and/or AR environment, without an Internet connection, in step 2017. As that gameplay takes place, each of those users' personal data and data related to gameplay may be altered or increased, and exchanged between those user's personal computer hardware (e.g., a smartphone, VR/AR glasses, or other personal hardware for creating and controlling VR and/or AR environments set forth in the present application.) If so, in step 2019, the control system may store any or all of that data on the users' personal computer hardware (which, as mentioned above, in some embodiments, comprises the control system). In some embodiments, such data is only stored on such personal computer hardware. In some such embodiments, any attempted access to that data originating from the Internet will be blocked by the control system, at least until further pre-conditions have been fulfilled, in step 2021. For example, in some embodiments, such data created with the aid of short-distance connections, as discussed above, will be stored in special locations on the users' personal computer hardware controlled by the control system, separately from data created or recorded over the Internet, in step 2023. In some embodiments, access to those special locations may be provided to third-parties upon a monetary or other payment of value for access to those data. In some such embodiments, the control system may then utilize and/or provide those data in specialized packets, at a different price, to the users and third parties, than other data.

The control system may then restart, in some embodiments.

It should be noted that the order(s) and number(s) of any of the above steps are non-limiting, and exemplary only of the wide variety of practically unlimited number(s), order(s) and arrangement(s) of method steps falling within the scope of the present invention, as will be readily apparent to those of ordinary skill in the prior art. Similarly, the recited arrangement(s), number(s), and instance(s) of any part(s), feature(s), element(s) or other aspect(s) of the invention set forth in this application are non-limiting and exemplary only of the wide variety of practically unlimited arrangement(s), number(s), and instance(s) of any part(s), feature(s), element(s) falling within the scope of the present invention, as will be readily apparent to those of ordinary skill in the prior art.

Figure 21:
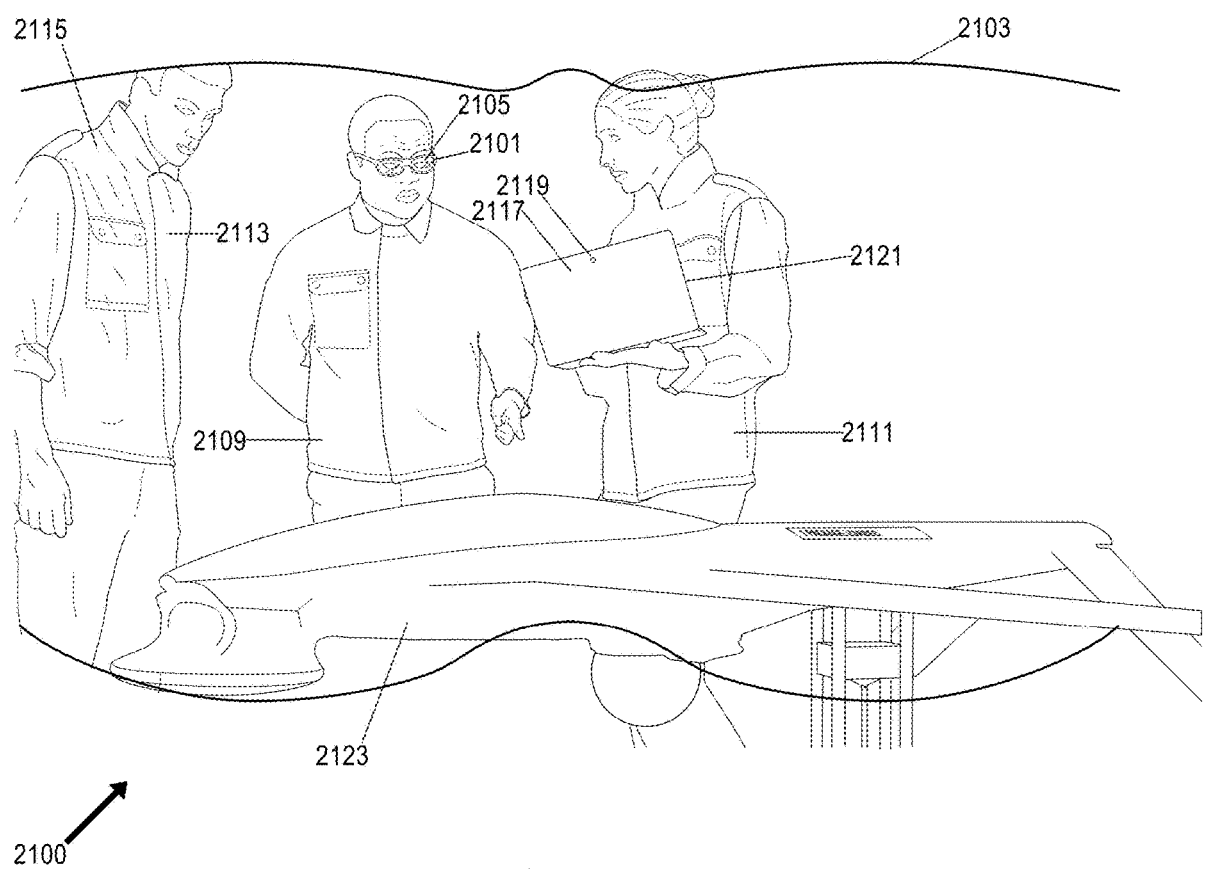
FIG. 21 depicts an example implementation environment, including, but not limited to, an example computer hardware system carrying out example End-to-End encryption techniques in accordance with some embodiments of the present invention.

FIG. 21 depicts an example 3-Dimensional ("3D") AR implementation environment 2100 for an example AR system in accordance with some embodiments, which includes a control system, such as any of the example control systems set forth in the present application (e.g., the example control system set forth above, in reference to FIG. 7). As with other example AR systems set forth in the present application, in some embodiments, the example AR system subject to FIG. 21 includes a control system including specialized computer hardware and software (such as the example control system set forth in reference to FIG. 7). Among some of the example software, in some embodiments, the control system includes a mobile computer (e.g., a smartphone, running a specialized Android or iOS software application ("App")), carrying out steps to implement an AR implementation environment such as example AR implementation environment 2100, while present within that environment, in some embodiments. Among some of the example specialized hardware, one or more specialized AR headset(s), in some embodiments, such as the example set of AR glasses 2101 and/or AR glasses 2103, including a semi-transparent display screen, such as the example semi-transparent display screen 2105 and example semi-transparent display screen 2107, respectively, is/are provided within the control system for enhancing a user's visible environment. Such a semi-transparent display screen may have the capability of creating and overlaying virtual objects and effects for a user wearing them (such as example male user 2109 of the system, pictured wearing example set of AR glasses 2101) such as any of the example types of virtual objects set forth in this application, in some embodiments. The perspective of the figure corresponds with the view of a user (not pictured) wearing example set of glasses 2103, and viewing AR implementation environment 2100. Multiple other users of the example AR system are also pictured, within example AR implementation environment 2100. For example, female user 2111, who is actually present within the AR implementation environment 2100, is shown, as well as a virtually present user 2113, represented as an avatar 2115, and shown only as an overlaid virtual object, assigned to a location within the AR implementation environment 2100. As in other embodiments of the present application, male user 2109, female user 2111 and virtually present user 2113 have particular example specialized hardware, which aid in creating the AR environment 2105 and sensing, capturing, managing and protecting data related to interactions by those users and the AR environment and each other. For example, as mentioned, male user 2109 is shown wearing AR glasses 2101. As another example of such hardware, female user 2111 is shown carrying a portable computerized device—namely, example lap-top computer 2117, which includes one or more cameras, such as example camera 2119, and includes a display portion 2121 (including a display screen, not visible in the figure, but also capable of overlaying virtual objects onto example AR implementation environment 2100), and position determining sensors (not pictured) in some embodiments. As with other such hardware, example lap-top computer 2117 may be comprised within the AR system, comprising wireless or other communications hardware, in some embodiments, for maintaining communications with a remainder of the AR system, including, for example, a remotely located computing system (e.g., a virtual machine located on remote servers). Similarly, either of AR glasses 2101 and/or 2103 may include similar communications and other computer hardware and may comprise, or be comprised within, a control system, such as the example control system set forth above, in reference to FIG. 7. As discussed above, any of the above hardware may include an on-board portable computer system, with a battery or other local power supply (e.g., a smartphone, running a specialized Android or iOS software application ("App")), carrying out steps to implement an AR implementation environment such as example AR implementation environment 2100, while present within that environment.

As with other AR systems set forth in the present application, the AR system controlling AR implementation environment 2100 may monitor interactions between any of the users, and permit the sharing of personal and other forms of private information between them, in some embodiments, using any of the techniques set forth in this application. In some embodiments, such private information includes information about private business information, as opposed to, or in addition to, private personal information. For example, as pictured, the users may each be employed by, or otherwise an agent of, one or more legally recognized entities, such as a business organization or governmental agency, carrying out work for a business or governmental project. For example, and again, as pictured, the users shown in FIG. 21 may be working on a sensitive, technological project, such as the development and testing of an example airworthy drone 2123. As such, information being observed by the users, and recorded by the AR system through hardware, such as example AR glasses 2101, example AR glasses 2103, and example lap-top computer 2117, may be of a confidential, private, and/or classified as secret governmental information, or otherwise sensitive information, in some embodiments. As with other known secure computer systems, the AR system must therefore include particular privacy protections to prevent the inadvertent and unauthorized disclosure of such sensitive information. For example, the AR system may be protected through encryption, password protection (e.g., each user and device being provided with a secure logon challenge) and a firewall, and/or other know methods for securing access to private and sensitive information to authorized users.

However, in some embodiments set forth in the present application, the limited sharing of sensitive information to third parties may also be facilitated by the AR system. For example, in some such embodiments, users may be provided with a GUI for permitting grouping and extrapolation of particular types of such sensitive data, as well as permitting the drawing of derived, inferred data from such sensitive data. In some such embodiments, the AR system creates unique groupings of such data, called "packets" or "authorized packets" of private data. In some such embodiments, the AR system anonymizes and aggregates data based on such authorized packets, and distributes such data to third parties. An AR system with such capabilities may be referred to as a "Black Box" AR system, in this application. In some such embodiments, the such a Black Box AR system manages a marketplace, in which such data is monetized. As discussed below, in some embodiments such a Black Box maintains all private and/or sensitive information of users as encrypted data within a smart contract recorded on one or more blockchains.

Examples of such embodiments are discussed in greater detail below, in reference to FIG. 23.

The exact detailed embodiments provided above, and elsewhere in this application, including the devices, hardware, software, and GUI elements set forth in the figures and discussed in detail in this application are, of course, exemplary, and not limiting. Rather, these embodiments are intended only as a reasonable set of possible example structures, substructures, materials, methods, steps and other aspects of the present invention, among virtually infinite and innumerable possibilities for carrying out the present invention, to ease comprehension of the disclosure, as will be readily apparent to those of ordinary skill in the art. For instance, as mentioned above, the description of one particular order, number or other arrangement of any aspects of the present invention set forth herein is illustrative, not limiting, and all other possible orders, numbers, etc., are also within the scope of the invention, as will be so readily apparent. Any aspect of the invention set forth herein may be included with any other aspect in a particular embodiment, as well as any aspects known in the art, in any number, order, arrangement, or alternative configuration while still carrying out, and falling within, the scope of the invention.

Figure 22:
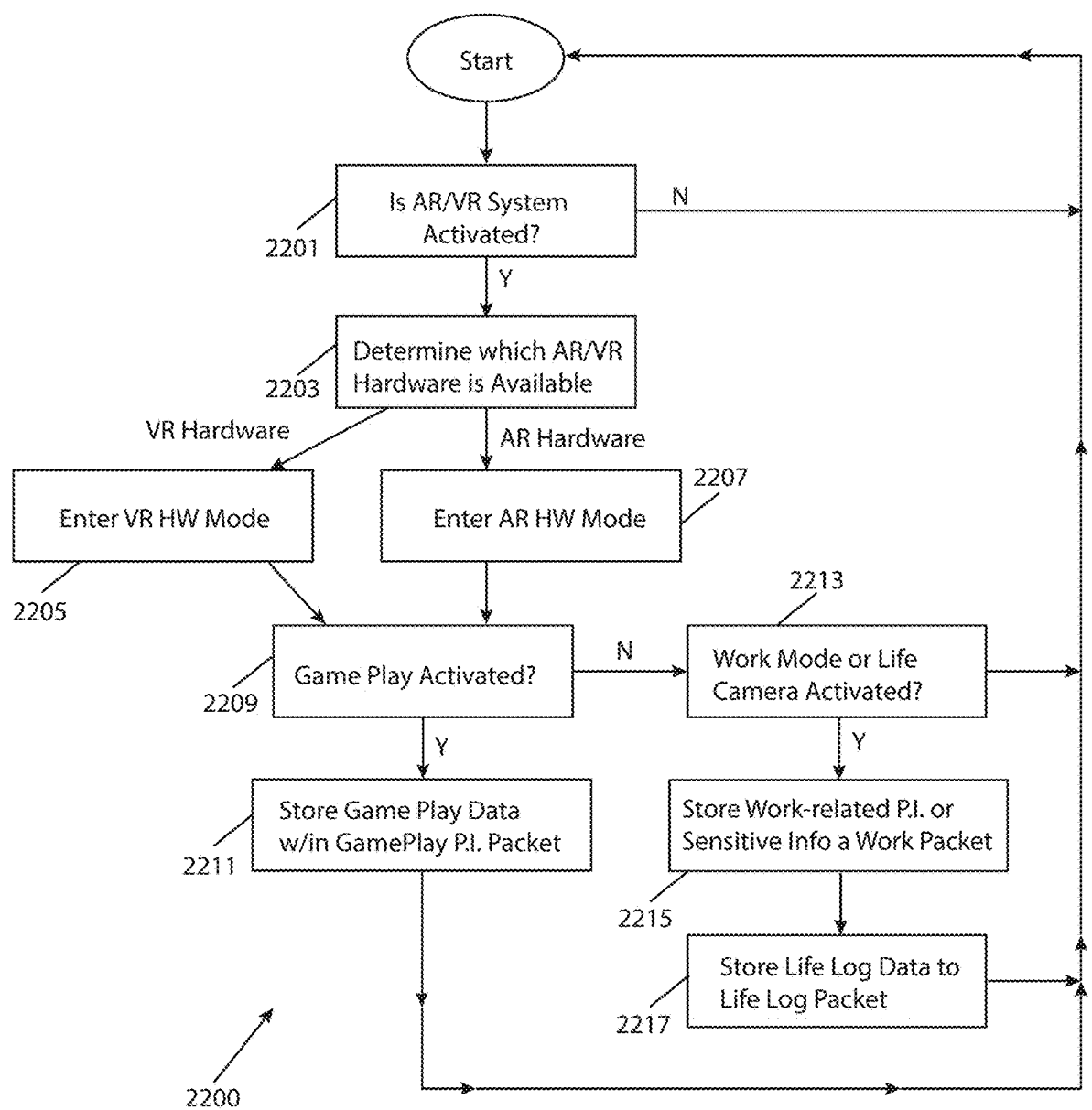
FIG. 22 is a process flow diagram, setting forth several example steps that may be undertaken by a control system (such as the example control system set forth above, in reference to FIG. 7) of an AR system, as discussed elsewhere in this application, in accordance with some embodiments of the present invention.

FIG. 22 is a process flow diagram, setting forth several example steps 2200 that may be undertaken by a control system (such as the example control system set forth above, in reference to FIG. 7) of a VR and/or AR system, as discussed elsewhere in this application, in accordance with some embodiments of the present invention.

Beginning with step 2201, the control system starts and determines whether components of the VR and/or AR system are activated and ready to begin providing VR and/or AR enhancements to a VR or AR implementation environment, such as any of the VR and/or AR environments set forth above, in this application. For example, in some embodiments, the control system may determine whether VR and/or AR hardware, such as an AR display and sensor(s) (e.g., a computer display and camera connected with computer hardware of a local computerized device, connected for communications with the control system) are activated, with a sufficient power supply to create virtual objects and overlay them over a view of the local environment, to create a VR and/or AR implementation environment, as discussed in various embodiments set forth in this application. In some embodiments, the control system may determine whether a network connection is available to computer hardware on or about the user which is capable of delivering a VR and/or AR environment to the user, such as any of the computer hardware set forth in the present application for creating and controlling VR and/or AR environments, which may comprise, or be comprised in, the control system, in accordance with aspects of the invention set forth above. If such hardware is available, activated and powered, and if such a network connection is available, the control system may the proceed to step 2203, in some embodiments, in which it determines the identity, number, location, and orientation of such AR hardware, within the AR implementation environment. If it is VR hardware that is so available, activated and powered, the control system may proceed to step 2205, in which it enters a VR implementation mode, creating virtual objects in a representational environment (e.g., using such a computer display). If it is AR hardware that is so available, activated and powered, the control system may proceed to step 2207, in which it enters an AR implementation mode, creating virtual objects in a representational environment (e.g., using a semitransparent display of AR glasses, as discussed above, within the control system and mounted on a user's head). However, it is within the scope of this application that, in some embodiments, the control system simultaneously enters such a VR implementation mode and an AR implementation mode, e.g., via separate processors and/or virtual machines included within the control system.

As discussed above, a wide variety of personal and other private information related to users of the VR and/or AR system may be stored and created by the control system, in various embodiments. For example, as discussed above, in some embodiments, the control system of the VR and/or AR system may manage gameplay within a VR and/or AR environment, in step 2209 and store private or other sensitive data related to one of more user's gameplay within a specialized private data sharing packet, known as a gameplay private data sharing packet. In some embodiments, such a specialized private data sharing packet may be stored in a separate location within the control system, and separately controlled and shared, apart from other private data sharing packets. For example, in some such embodiments, the control system may store personal data related to the user, and/or the user's gameplay onto locations with separate encryption and/or security protocols than other private data sharing packets managed by the control system, e.g., on separate files of cloud-based computers included within the control system.

As another example, in some embodiments, biometrics, preferences, location data, and work-related data on projects managed with the aid of the control system, may be recorded by the control system, for example, with the aid of VR and/or AR hardware in a work environment. Thus, the control system may enter a work-related mode of operation, in which it records such data, in step 2213. Similarly, in some embodiments, personal or private information related to the user's work activities may be so recorded, in subsequent step 2215, as private or other sensitive data related to such work within a specialized private data sharing packet, known as a work-related private data sharing packet. In some embodiments, such a specialized private data sharing packet may be stored in a separate location within the control system, and separately controlled and shared, apart from other private data sharing packets. For example, in some such embodiments, the control system may store such private data related to work onto locations with separate encryption and/or security protocols than other private data sharing packets managed by the control system, e.g., on separate files of cloud-based computers included within the control system.

Also, in step 2213, in some embodiments, a user may use the control system to aid in logging personal data related to everyday activities. For example, in some embodiments, a body camera may be included within the control system, and carried on or about the person (e.g., clipped to clothing, or otherwise donned, as in the instance of AR glasses, as discussed above). Thus, similarly, biometrics, preferences, location data, and personal life-related data of the user may be recorded and managed with the aid of the control system, may be recorded by the control system, for example, with the aid of VR and/or AR hardware in everyday living environments experienced by the user. Thus, the control system may enter a mode of operation for logging data related to the user's personal life, in which it records such data, in step 2213, as well. Similarly, in some embodiments, personal or private information related to the user's private life activities may be so recorded, in subsequent step 2215, and compile such recordings within a data repository known as a "life log," within specialized private data sharing packets known as a life-log-related private data sharing packet, in step 2217. In some embodiments, such a specialized private data sharing packet may be stored in a separate location within the control system, and separately controlled and shared, apart from other private data sharing packets. For example, in some such embodiments, the control system may store such private data related to everyday activities within locations with separate encryption and/or security protocols than other private data sharing packets managed by the control system, e.g., on separate files of cloud-based computers included within the control system.

The control system may then return to the starting position.

It should be noted that, in some embodiments, specialized private data sharing packets may be stored in a separate location within the control system, and separately controlled and shared, apart from other private data sharing packets, based on the type of data they contain, more specifically, within any of the activity-related categories set forth above. For example, in some such embodiments, the control system may store private biometric data of the user in locations with separate encryption and/or security protocols (e.g., HIPAA compliant protocols) than other private data sharing packets managed by the control system, e.g., on separate files of cloud-based computers included within the control system.

As also discussed above, in some embodiments of the invention, personal data and/or data related to gameplay, as set forth elsewhere in this application, may be stored according to different protocols, depending on the nature of the network or other connection (e.g., Internet-connected LAN vs. direct Bluetooth connection between users' personal hardware devices), and access and usage of those data will differ, based on those protocols. new data-sharing techniques, and privacy protection options for users.

Figure 23:
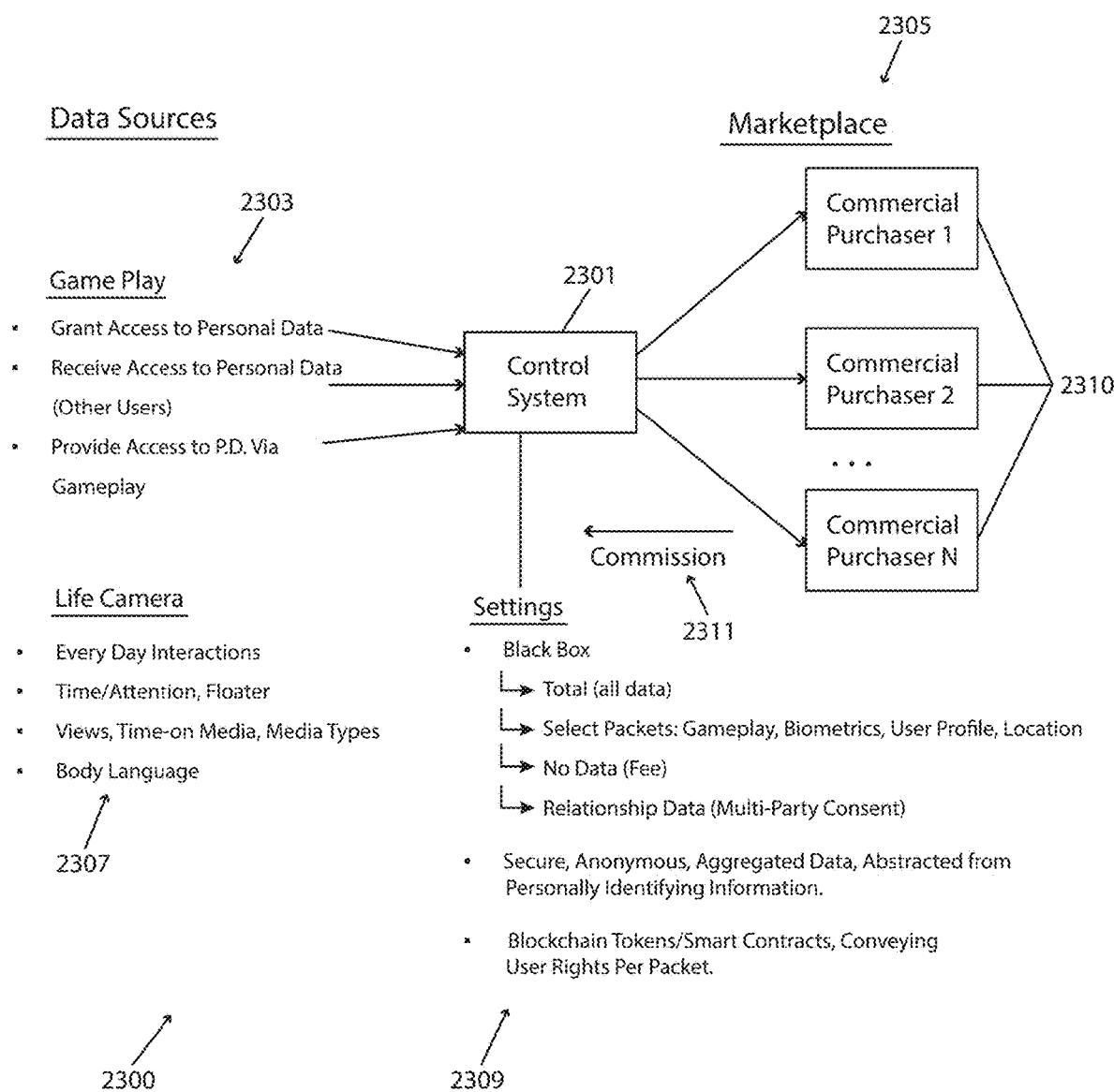
FIG. 23 is a diagram of some example elements of a personal and other private information data management system and marketplace, controlled by a control system of a VR or AR system (such as the example control system set forth above, in reference to FIG. 7, or any other control system set forth in this application.)

FIG. 23 is a diagram of some example elements of a personal and other private information data management system and marketplace 2300, controlled by a control system 2301 of a VR or AR system (such as the example control system set forth above, in reference to FIG. 7, or any other control system set forth in this application.) As discussed above, in some embodiments, a control system in accordance with the present application creates new forms of personal or other private data sharing packets, based on the classification of data-generating activities managed by the control system.

For example, in some embodiments, as discussed above, the control system of the VR and/or AR system may manage gameplay within a VR and/or AR environment, and store private or other sensitive data related to one of more user's gameplay within a specialized private data sharing packet, known as a gameplay private data sharing packet. In some embodiments, such a specialized private data sharing packet may be stored in a separate location within the control system, and separately controlled and shared, apart from other private data sharing packets. For example, in some such embodiments, the control system may store personal data related to the user, and/or the user's gameplay onto locations with separate encryption and/or security protocols than other private data sharing packets managed by the control system, e.g., on separate files of cloud-based computers included within the control system. Furthermore, in some embodiments, the control system may separately obtain authorization from a user owning the private or other sensitive data to sell the gameplay private data sharing packet, and/or others like it, within a marketplace aspect 2305 of the VR and/or AR system, managed by control system 2301.

As another example, in some embodiments, as also discussed above, the control system of the VR and/or AR system may manage a user's(s') workplace or other personal activities within a VR and/or AR environment, and store private or other sensitive data related to one of more user's workplace or personal activities within specialized private data sharing packets, known as a work-related private data sharing packet and a life-log-related private data sharing packet, respectively. Examples of such types of work-related and life-log-related private data are shown in the listing set forth as private data type examples 2307. In some embodiments, such a specialized private data sharing packet also may be stored in a separate location within the control system, and separately controlled and shared, apart from other private data sharing packets. For example, in some such embodiments, the control system may store personal data related to the user, and/or the user's workplace activities onto locations with separate encryption and/or security protocols than other private data sharing packets managed by the control system, e.g., on separate files of cloud-based computers included within the control system. Furthermore, in some embodiments, the control system may separately obtain authorization from a user owning the private or other sensitive data to sell such work-related private data sharing packets and life-log-related private data sharing packet, and/or others like it, within the marketplace aspect 2305 of the VR and/or AR system, managed by control system 2301.

In some embodiments, the control system stores, sells and/or transfers private data sharing packets in accordance with user preference settings, such as any of the user preference settings listed as user preference settings 2309. In some such embodiments, such private data includes both directly-recorded data and inferred information, based on additional factors observed by the system.

In some embodiments, information sharing settings are created based on user behavior (e.g., gameplay data, such as the example gameplay data listed as gameplay data types 2303, through a game managed by the control system). In some embodiments, the system infers relationship statuses and/or interests of a user based on a user's gaze or other attention on an activity, environment or another user.

In some embodiments, the specialized hardware captures data related to emotive interactions by the user, such as emotion-indicating actions, body language, gestures, and expressions of the user when interacting with a VR or AR environment. In some embodiments, the system infers other information based on such emotive interactions by a user. Such emotive interactions may include actions, body language, gestures, and expressions of the user indicating empathy, and/or a degree of empathy, with other users of the VR and/or AR system and/or an environment.

In some embodiments, the VR or AR system aids a user in controlling a level of access to data related to her, his or their emotive interactions. In some embodiments, the VR or AR system aids a user in controlling a level of access to other data relevant to the user and/or her, his or their interactions with the VR or AR system.

In some embodiments, a marketplace is managed by the system, in which users may elect to sell such private data sharing packets, in accordance with such user preference settings, in exchange for a fee (e.g., a monetary credit), to example commercial buyers 2310 (e.g., data vendors). Some embodiments of data sharing packets include anonymized, abstracted components of such private data. In some embodiments, the system obtains a commission, as shown by example commission transfer 2311 comprising a fraction of such a monetary credit, at least in part, for managing the marketplace. In some embodiments, the data sharing packets are exchanged for such a fee and/or monetary credit via a specialized form of smart contract, carried out with the aid of one or more blockchains. In some such embodiments, a commercial buyer user of the system is one party to such a smart contract, and the users are other parties to that smart contract. In some such embodiments, information related to the 1) terms, 2) consummation and 3) performance of such a smart contract are recorded on three separate tokens and/or certificates respectively (at least one such token each) through the blockchain, each being digitally signed by each of the parties. In some embodiments, all private data sharing packets, for all users, are stored on such a blockchain (e.g., maintained on a remote, networked server, or other computer) as a part of a Black Box subsystem of the control system, as discussed above.

What is claimed is:

1. An augmented reality system, comprising a control system providing access to a game, comprising specialized computer hardware and software configured to:
    collect private and/or sensitive information from a first user of the system based on user behavior in interaction with the system;
    store at least some of said private and/or sensitive information within a memory of said system within unique private data sharing packets; and
    define said private and/or sensitive information and/or said private data sharing packets as being of one or more type(s) of private data sharing packets, wherein the one or more type(s) of private data sharing packets is/are defined based on user preference settings, wherein the user preference settings are selected by said first user with the aid of a graphical user interface (GUI) managed by the control system;
    specially protect first type of data sharing packet, which is a gameplay private data sharing packet, comprising data related to said first user's gameplay with respect to said game, and at least part of said private and/or sensitive information held within said first type of data sharing packet, from disclosure to other parties unless said first user specifically authorizes said disclosure to said other parties for monetization.

2. The augmented reality system of claim 1, wherein said control system is configured to monitor and collect data related to emotive interactions by the first user through the system.

3. The augmented reality system of claim 2, wherein said emotive interactions comprise body language.

4. The augmented reality system of claim 2, wherein said emotive interactions comprise hand gestures and/or other gestures.

5. The augmented reality system of claim 2, wherein said emotive interactions comprise facial expressions and/or other expressions.

6. The augmented reality system of claim 2, wherein said authorization of said disclosure is conditioned on a request by said first user monetizing usage of said personal and/or sensitive information and/or said data related to emotive interactions.

7. The augmented reality system of claim 1, wherein said first user authorizes the sharing of said first type of private data sharing packet, based on its being of said defined one or more type(s) of data sharing packets, and based on an increased amount of private information shared by a second user of the system.

8. The augmented reality system of claim 1, wherein said control system provides said access to said game hosted on said computer hardware to said first user and to a second user of the system; and
    wherein said first type of private data sharing packet, which is a gameplay private data sharing packet, comprises data related to said first user's gameplay with respect to said game.

9. The augmented reality system of claim 8, wherein said control system manages an AR implementation environment comprising a real-world workplace of said first user; and wherein said one or more types of private data sharing packets comprise a second type of private data sharing packet, which is a work-related private data sharing packet comprising data related to said first user's carrying out work within said AR implementation environment comprising said workplace of said first user.

10. The augmented reality system of claim 9, wherein said control system manages an AR implementation environment comprising a private environment of said first user; and wherein said one or more types of private data sharing packets comprise a third type of private data sharing packet, which is a life-log-related private data sharing packet, comprising data related to said first user's personal life within said AR implementation environment comprising said private environment of said first user.

11. The augmented reality system of claim 10, wherein said control system comprises and manages a marketplace of anonymized, aggregated private data from a plurality of users comprising said first user of said system, and determines a control-system-managed level of access for a first commercial buyer user of said system to at least some of said anonymized, aggregated private data, based on said first commercial buyer user paying a fee through said system.

12. The augmented reality system of claim 11, wherein:
    said control system and takes a portion of said fee as a commission, and transfers at least part of a remaining amount of said fee, after said taking said commission, to said first user.

13. The augmented reality system of claim 2, wherein the system creates inferred information based on the monitored and collected data related to emotive interactions by said first user.

14. The augmented reality system of claim 13, wherein said private and/or sensitive information and/or said private data sharing packets are defined as being of said one or more type(s) of data sharing packets based on said inferred information.

15. The augmented reality system of claim 13, wherein a pre-defined plurality of types of private data sharing packets are created by the system based on said inferred information.

16. A method for managing private and/or sensitive information from a first user, comprising the following steps:
    collecting said private and/or sensitive information from a first user of the system based on user behavior in interaction with the system;
    storing at least some of said private and/or sensitive information within a memory of said system within unique private data sharing packets; and
    defining said private and/or sensitive information and/or said private data sharing packets as being of one or more type(s) of data sharing packets, wherein the one or more type(s) of private data sharing packets is/are defined based on user preference settings, wherein the user preference settings are selected by said first user with the aid of a graphical user interface (GUI) managed by the control system;
    specially protecting first type of data sharing packet, which is a gameplay private data sharing packet, comprising data related to said first user's gameplay with respect to said game, and at least part of said private and/or sensitive information held within said first type of data sharing packet from disclosure to other parties unless said first user specifically authorizes said disclosure to said other parties for monetization.

* * * * *